United States Patent
Socek et al.

(10) Patent No.: US 10,491,895 B2
(45) Date of Patent: Nov. 26, 2019

(54) FAST AND ROBUST HUMAN SKIN TONE REGION DETECTION FOR IMPROVED VIDEO CODING

(71) Applicant: INTEL CORPORATION, Santa Clara, CA (US)

(72) Inventors: Daniel Socek, Miami, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 15/162,411

(22) Filed: May 23, 2016

(65) Prior Publication Data

US 2017/0339409 A1    Nov. 23, 2017

(51) Int. Cl.
| | |
|---|---|
| *H04N 19/124* | (2014.01) |
| *G06T 7/143* | (2017.01) |
| *G06T 7/11* | (2017.01) |
| *H04N 19/136* | (2014.01) |
| *H04N 19/186* | (2014.01) |
| *H04N 19/80* | (2014.01) |
| *H04N 19/167* | (2014.01) |
| *H04N 19/587* | (2014.01) |
| *H04N 19/85* | (2014.01) |

(52) U.S. Cl.
CPC ............ *H04N 19/124* (2014.11); *G06T 7/11* (2017.01); *G06T 7/143* (2017.01); *H04N 19/136* (2014.11); *H04N 19/167* (2014.11); *H04N 19/186* (2014.11); *H04N 19/587* (2014.11); *H04N 19/80* (2014.11); *H04N 19/85* (2014.11)

(58) Field of Classification Search
None
See application file for complete search history.

(56) References Cited

U.S. PATENT DOCUMENTS

| | | | | |
|---|---|---|---|---|
| 8,290,253 | B1 * | 10/2012 | Wang | G06K 9/4652 382/162 |
| 8,406,482 | B1 * | 3/2013 | Chien | G06K 9/4652 382/115 |
| 2004/0199292 | A1 | 10/2004 | Sakagami et al. | |
| 2011/0142338 | A1 * | 6/2011 | Do | G06K 9/00362 382/165 |
| 2012/0170659 | A1 * | 7/2012 | Chaudhury | G06T 7/194 375/240.16 |
| 2015/0332471 | A1 * | 11/2015 | Heo | G06T 7/11 382/103 |
| 2017/0287137 | A1 * | 10/2017 | Lin | G06K 9/66 |

(Continued)

OTHER PUBLICATIONS

Brown, D. et al., "A SOM based approach to skin detection with application in real time systems", BMVC01, 2001.

(Continued)

*Primary Examiner* — Rebecca A Volentine
(74) *Attorney, Agent, or Firm* — Green, Howard & Mughal LLP.

(57) ABSTRACT

Techniques related to improved video coding based on skin tone detection are discussed. Such techniques may include selecting from static skin probability histograms and/or a dynamic skin probability histogram based on a received video frame, generating a skin tone region based on the selected skin probability histogram and a face region of the video frame, and encoding the video frame based on the skin tone region to generate a coded bitstream.

37 Claims, 36 Drawing Sheets

(56) References Cited

U.S. PATENT DOCUMENTS

2018/0018505 A1* 1/2018 Tan .................. G06T 7/40
2018/0204111 A1 7/2018 Zadeh et al.

OTHER PUBLICATIONS

Cho, K.M. et al., "Adaptive skin-color filter", Pattern Recognition, vol. 34, Issue 5, pp. 1067-1073, 2001.

Dadgostar, F. et al., "An adaptive real-time skin detector based on Hue thresholding: A comparison on two motion tracking methods", Pattern Recognition Letters, vol. 27, pp. 1342-1352, Elsevier Science-Direct, Sep. 2006.

Greenspan, H. et al., "Mixture model for face color modeling and segmentation", Pattern Recognition Letters, vol. 22, Issue 44, pp. 1525-1536, 2001.

Kakumanu, P. et al., "A survey of skin-color modeling and detection methods", 2007 Pattern Recognition, vol. 40, pp. 1106-1122.

Khan, R. et al., "Color based skin classification", 2012 Pattern Recognition Letters, vol. 33 (2), pp. 157-163.

Prema, C. et al., "Survey on Skin Tone Detection using Color Spaces", International Journal of Applied Information Systems (IJAIS), vol. 2, No. 2, pp. 18-26, New York, USA 2012.

Quinlan, Ross, "C4.5: Programs for Machine Learning", Morgan Kauffmann Publishers, San Mateo, CA, 1993.

Sebe, I. et al., "Skin detection: A bayesian network approach", In Pattern Recognition, ICPR 2004, vol. 2, pp. 903-906, IEEE, 2004.

Sharma, C.M. et al., "A Context-aware Approach for Detecting Skin Colored Pixels in Images", International Journal of Computer Applications, vol. 71, pp. 8-13, 2013.

Vezhnevets, V. et al., "A survey on pixel-based skin color detection techniques", Graphicon 2003, pp. 85-92.

Viola, P. et al., "Rapid object Detection using a Boosted Cascade of Simple Features", Accepted Conference on Computer Vision and Pattern Recognition, 2001 (9 pages).

Viola, P. et al., "Robust Real-Time Face Detection", Proceedings of the 8th IEEE International Conference on Computer Vision (ICCV'01), (1 page).

Viola, P. et al., "Robust Real-time Object Detection", Cambridge Research Laboratory Technical Report Series, CRL 2001/01 Feb. 2001, 30 pages.

Viola, P. et al., "Robust Real-Time Face Detection", International Journal of Computer Vision 57(2), 137-154, 2004, (18 pages).

Tan, Wei Ran et al., "A Fusion Approach for Efficient Human Skin Detection", IEEE Trans on Industrial Informatics, vol. 8, Issue 1, pp. 138-147, 2012.

Yang, M.H., "Detecting faces in images: A survey", PAMI, vol. 24, Issue 1; pp. 34-58, 2002.

Yogarajah, P. et al., "A dynamic threshold approach for skin segmentation in color images", in ICIP 2010, pp. 2225-2228.

Zafarifar, B. et al., "Texture-adaptive skin detection for TV and its real-time implementation on DSP and FPGA", IEEE Trans on Consumer Electronics, vol. 58, Issue 1, pp. 161-169, 2012.

Zafarifar, Bahman et al., "Improved Skin Segmentation for TV Image Enhancement, Using Color and Texture Features", IEEE International Conference on Consumer Electronics (ICCE2010), pp. 373-374, Jan. 2010, Las Vegas, NV. USA.

Zhu, X. et al., "Segmenting hands of arbitrary color", AFGR, 2000.

Office Action for U.S. Appl. No. 15/162,401, dated Aug. 22, 2019.

* cited by examiner (i)

(ii)

(i)

(ii)

(iii)

(iv)

(i)　　　　　　　　　　　　(ii)

FIG. 17C　　　　　　　　(iii)

(i)　　　　　　　　　　　　(ii)

1841

1842

(i)                  (ii)

FAST AND ROBUST HUMAN SKIN TONE REGION DETECTION FOR IMPROVED VIDEO CODING

BACKGROUND

In video coding and other contexts, skin tone detection and tracking may be used to determine whether and/or where skin tones appear in a video frame or an image. For example, skin tone detection may be used in human-computer interaction, photo album management, biometrics, video surveillance, automatic focus in camera imaging, image or video search and retrieval, and the like.

Several skin tone detection solutions have been proposed, however such solutions have limitations such as limited accuracy, the inability to run in real-time, high computational demands, and the like. As such, existing techniques do not provide skin tone detection having high accuracy for real-time processing. Such problems may become critical as skin tone detection becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 17C illustrates example feature based classification of segments.

DETAILED DESCRIPTION

Figure 1:
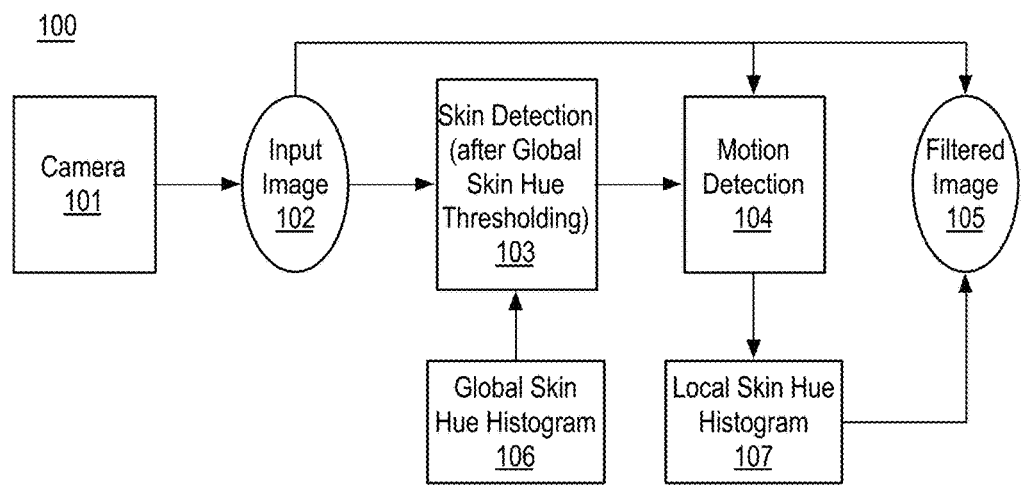
FIG. 1 illustrates an example skin tone detector.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to fast and robust skin tone detection. Such techniques may be used in a variety of contexts such as video coding.

As described above, skin tone detection may be used to determine whether and/or where skin tones appear in a video frame or an image. In some embodiments, a video frame in Yrg color format and YUV color format may be received or generated. One of multiple static skin probability histograms (e.g., pretrained histograms) may be selected based on the Yrg color format video frame and a dynamic skin probability histogram may be generated based on the YUV color format video frame and a face rectangle in the video frame. A determination may be made as to whether the dynamic skin probability histogram is valid or invalid and a skin tone region may be generated based on the dynamic skin probability histogram when the dynamic skin probability histogram is valid or based on the selected static skin probability histogram when the dynamic skin probability histogram is invalid. The video frame may be encoded based on the skin tone region (e.g., by reducing a quantization parameter in the skin tone region or the like) to generate a coded bitstream. For example, the coded bitstream may be a standards compliant bitstream. For example, the coded bitstream may be an Advanced Video Coding (AVC) compliant bitstream, an H.265 High Efficiency Video Coding (HEVC) compliant bitstream, a VP9 compliant bitstream, a VP10 compliant bitstream, or an Alliance for Open Media (AOM) compliant bitstream.

The techniques discussed herein addresses fast and robust detection of human skin tones in video scenes and using detected human skin tone regions (which are subjectively more important from quality point of view for human viewers) to improve coding of such regions in video. As used herein, human skin tone detection includes determining by analysis of image or video frame(s) if one or more human skin tone regions exist in it, and if so, the ability to identify the presence of skin tones on a binary mask for the image and/or frame. When detecting human skin tone regions in a video sequence, it is advantageous that detected regions be consistent from frame to frame without sudden large changes (e.g., appearance, disappearance, or distortions) so that the movement of human skin tone regions can be tracked. For example, human skin tone regions in an image and/or video frame may be caused by skin tone of human face(s), neck(s), arm(s), hand(s), leg(s), feet, or the like. The human skin region may be detected at pixel resolution, or at small block resolution (e.g., to tradeoff computation with accuracy).

Skin tone detection may be challenging as skin tones can be affected by numerous factors including ethnicity, illumination conditions, background, and others. Techniques discussed herein may provide skin tone detection including advances in the color space used for skin modeling and detection, improved modeling and classification approaches, and techniques for adaptation.

For example, the RGB color space may be commonly used to represent digital images as most image/video devices provide an RGB output. In addition, the RGB color space is relatively simple and easy to implement. However, as discussed further herein, RGB may not be advantageous for skin tone detection due to high correlation between color planes, significant perceptual non-uniformity, and mixing of chrominance and luminance information. Other skin detection techniques may use perceptual color spaces such as HSL and HSV (e.g., cylindrical-coordinate representations of points in an RGB color model) due to the perceptual color spaces providing advantages over RGB. Furthermore, orthogonal color spaces having completely separate luminance and chrominance may provide advantages in skin tone detection. For example, in skin detection systems based on a Bayesian network, such orthogonal color spaces may provide advantages. Another color space for use in skin tone detection is the Yrg color space (e.g., a normalized RGB color space that separates luminance). Furthermore, YUV may be the format of choice for raw digital video for encoding.

Skin tone detection quality may improve in processes where luminance is present in contrast to those processes where skin tone detection is performed with luminance absent. However, using 3 color components entirely may require too much system memory during implementation. Solutions to such problems include using chroma histogram maps, one for each quantized luma (e.g. 8 or 16 chroma tables, each being mapped according to quantized luma index) or using perceptual color spaces where luminance is not fully orthogonal to the other two color channels (e.g., HSL).

Furthermore, techniques for modeling skin tones for detection may be based on pixel-level classification or on segment (e.g. a group of pixels) skin classification. In some implementations, segment based skin modeling may provide more accurate detection rates. Such segment based classification may be performed by a Bayesian classifier. A pixel-based initial mapping with post-processing of segment validation may also be performed based on a texture measurement.

Further still, adaptation may improve skin tone detection accuracy. For example, adaptive thresholding techniques may be provided in the HSV color space to separate skin from non-skin pixels. For example, a thresholding box may be updated based on the center of gravity of a color histogram calculated from the color values over 10% of the maximum color value in the box. Clustering techniques may be performed to determine if dominant background color vectors exist in the box and, if so, they may be separated from the skin color vectors by a linear classifier. However, such techniques may perform poorly for people from different races and over a broad range of varying illuminations. Also, Gaussian Mixture Modeling (GMM) may be used for skin modeling in the rg space. Such an adaptive model may perform well for slightly varying indoor illumination conditions but may fail in more difficult environments. Further skin detection techniques may adapt skin color cues based on hints regarding the presence of a facial region. For example, for images, indirect detection of limited facial features such as eyes may be used to capture skin tones of humans in a scene. However, such techniques may not provide robust results for images and applying such techniques to video may be even more challenging due to inconsistencies in detection from frame to frame. Skin tone detection in images and video may offer continuing challenges.

FIG. 1 illustrates an example skin tone detector 100, arranged in accordance with at least some implementations of the present disclosure. As shown in FIG. 1, a camera such as a webcam or the like may attain an input image 102 (e.g., a frame of a video sequence). A global skin detector may be trained offline using a training dataset to specify thresholds of skin color in the Hue color space to provide a global skin hue histogram 106, which may be applied to input image 102 by skin detection module 103. Furthermore, in motion skin pixels may be detected by motion detection module 104. For example, in motion pixels of input image 102 may be detected using a motion detection algorithm and detected pixels may be filtered using the global skin detector. Motion detection module 104 may thereby output those pixels that have a higher probability of belonging to skin regions of the frame. Pixels that were considered as moving pixels belonging to the skin area may then be used for retraining the detector. For example, a histogram of Hue factor may be used as the base for calculating a low (e.g., TL) and a high (e.g., Tu) threshold for filtering the frame. From the in motion skin pixels, another histogram may be extracted, and the second histogram may be merged with the original histogram using Equation (1):

$$H_{n+1} = (1-A) \times H_n + A \times H_M \quad (1)$$

where, $H_{n+1}$ is the new histogram for skin detection (e.g., for the next frame), $H_n$ is the histogram for skin detection in the current frame, $H_M$ is the histogram of the in motion pixels of the skin color (e.g., used as a feedback to provide information about the Hue factor of the skin color of the user), and A is a weight for merging two histograms (e.g., A may be a value between about 0.02 and about 0.05).

Furthermore, for each frame, thresholds of the Hue factor may be recalculated such that they cover about 90% of the area of the new histogram. Filtering for each frame may be described as follows in Pseudocode (1):

Pseudocode (1):

```
if (T_L(H_n) <= I <= T_U(H_n))
    f(I) = true
else
    f(I) = false
``` where I is the Hue factor for each pixel, $H_n$ is the Hue histogram for the skin color, TL is the calculated lower threshold for histogram $H_n$, and Tu is the calculated upper threshold for the histogram $H_n$.

Figure 2:
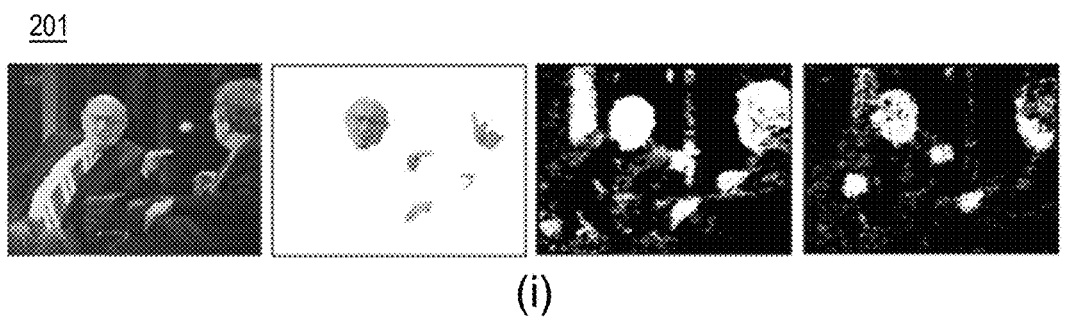
FIG. 2 provides an example conceptual diagram corresponding to skin tone detection system.
Figure 2:
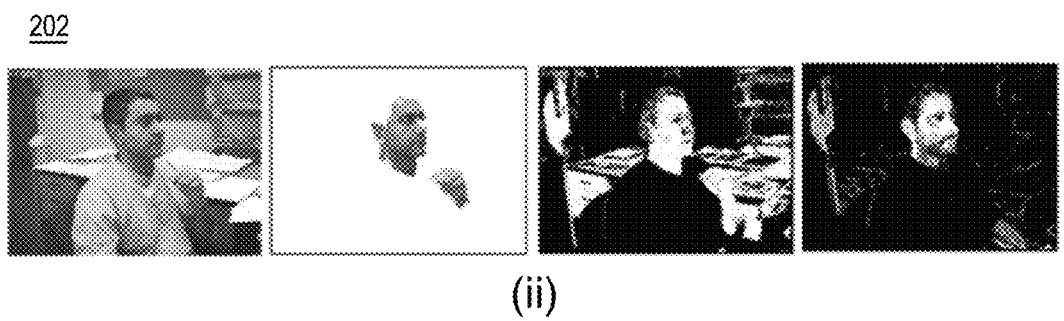

FIG. 2 provides an example conceptual diagram corresponding to skin tone detection system 100, arranged in accordance with at least some implementations of the present disclosure. With reference to FIG. 1, a frame of video (e.g., from camera 101) may be used as input image 102 to determine global skin hue histogram 106, which may be used to determine a hue threshold based on which skin detection is performed. Next, using the input frame and detected skin from the global skin hue thresholding, a moving area may be detected and used for generating local skin hue histogram 107. Based on local skin hue histogram 107, input image 102 may be filtered to generated filtered image 105 having skin tone regions. FIG. 2 illustrates for a sequence 201 and a sequence 202, results of skin tone detection by using skin tone detection system 100. For both FIG. 2(i) and FIG. 2(ii), the first column is an input image/frame (e.g., input image 102), the second column is the ground truth skin tone regions of the input image/frame (e.g., hand segmented), the third column is a skin tone map in a first frame of a sequence, and the last column is a skin tone map in a last frame of the sequence (e.g., showing that the skin tone map gradually gets refined). Although skin tone detection system 100 may provide refined results over time, the operation may be slow in providing such convergence to actual skin tone and may be error prone due to false positives.

For example, the detection of human skin tones in an image or video frame may be adversely impacted by the presence of skin tone colors (e.g. walls, tables, drapes, chairs, carpets, soil, sand, rocks, etc.) in non-skin objects that lead to false detections. In some techniques, the detected presence of human eyes in the image or video frame may be used to determine human skin regions in the scene.

Figure 3:
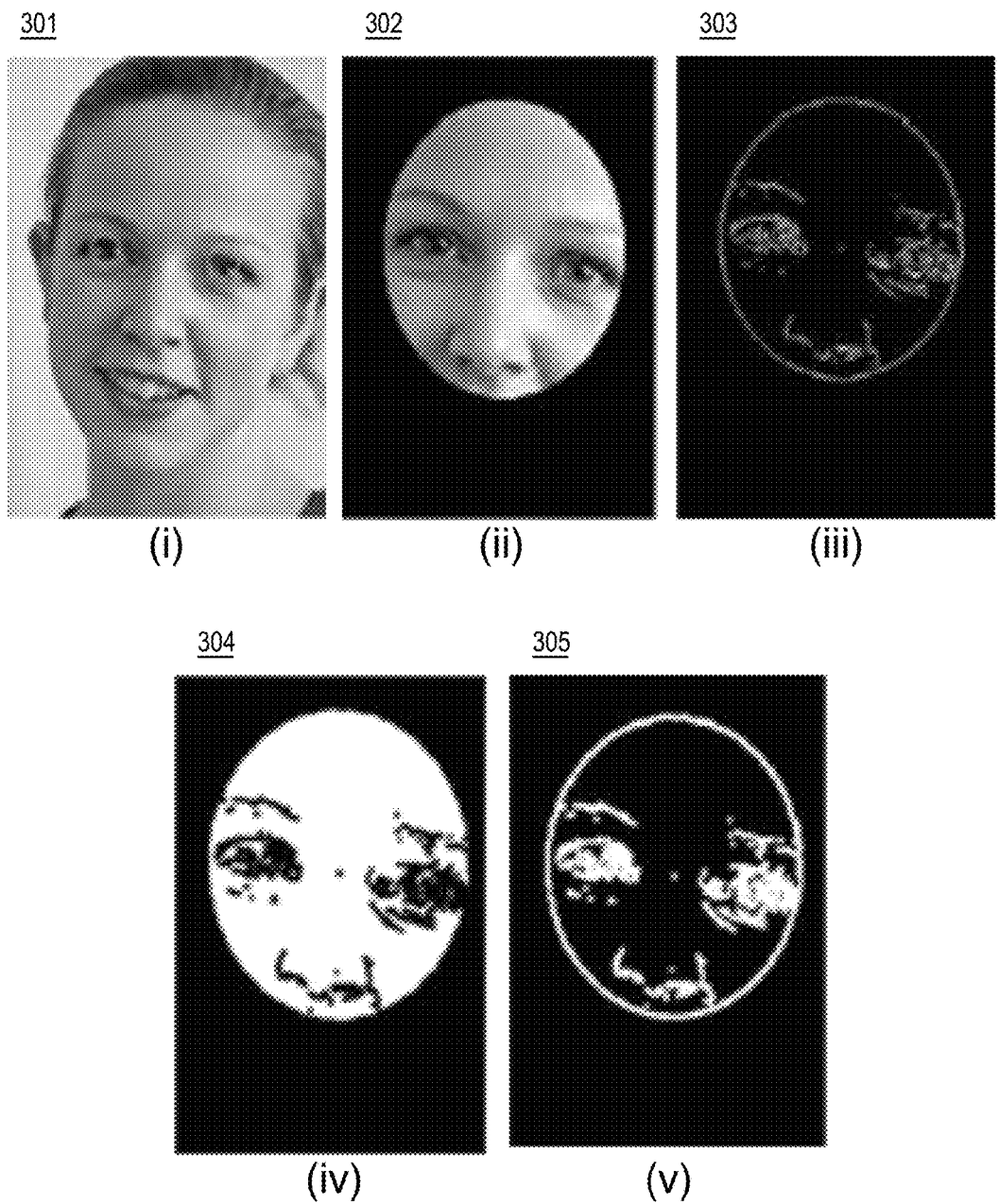
FIG. 3 illustrates example skin tone detection based on eye detection.

FIG. 3 illustrates example skin tone detection based on eye detection, arranged in accordance with at least some implementations of the present disclosure. For example, image 301 of FIG. 3(i) illustrates a detected pair of eyes (e.g., marked by small circles). The detected pair of eyes may be used to determine a suspected human-face region defined by a circle of a diameter given by the distance between the outer edges of the eyes as shown in image 302 of FIG. 3(ii). Edge detection may then be performed to provide image 303 of FIG. 3(iii) and dilation to provide image 304 of FIG. 3(iv) and the smooth skin tone area shown in image 305 of FIG. 3(v). Based on the color of the smooth skin tone area, other human skin area can be found in a scene.

Figure 4A:
FIG. 4A provides an example comparison of results based on skin tone detection based on eye detection techniques.

FIG. 4A provides an example comparison of results based on skin tone detection based on eye detection techniques, arranged in accordance with at least some implementations of the present disclosure. For example, the results shown in FIG. 4A assume that eye detection is successful in the skin tone detection based on eye detection. In FIG. 4A, column of images 401 as provided by FIG. 4A(i) illustrate images/video frames in which skin tone regions and/or human faces need to be detected, column of images 402 as provided by FIG. 4A(ii) illustrate first results of skin tone detection based on eye detection (e.g., with white areas showing skin tones and black areas showing the rest of the image) and column of images 403 as provided by FIG. 4A(iii) illustrate second results of skin tone detection based on eye detection. Column of images 403 appear to exclude edge areas and are better defined column of images 402. It is noted that in video coding centric applications, the separation of edges on the face from skin tones may not be necessary due to block level coding precision.

Figure 4B:
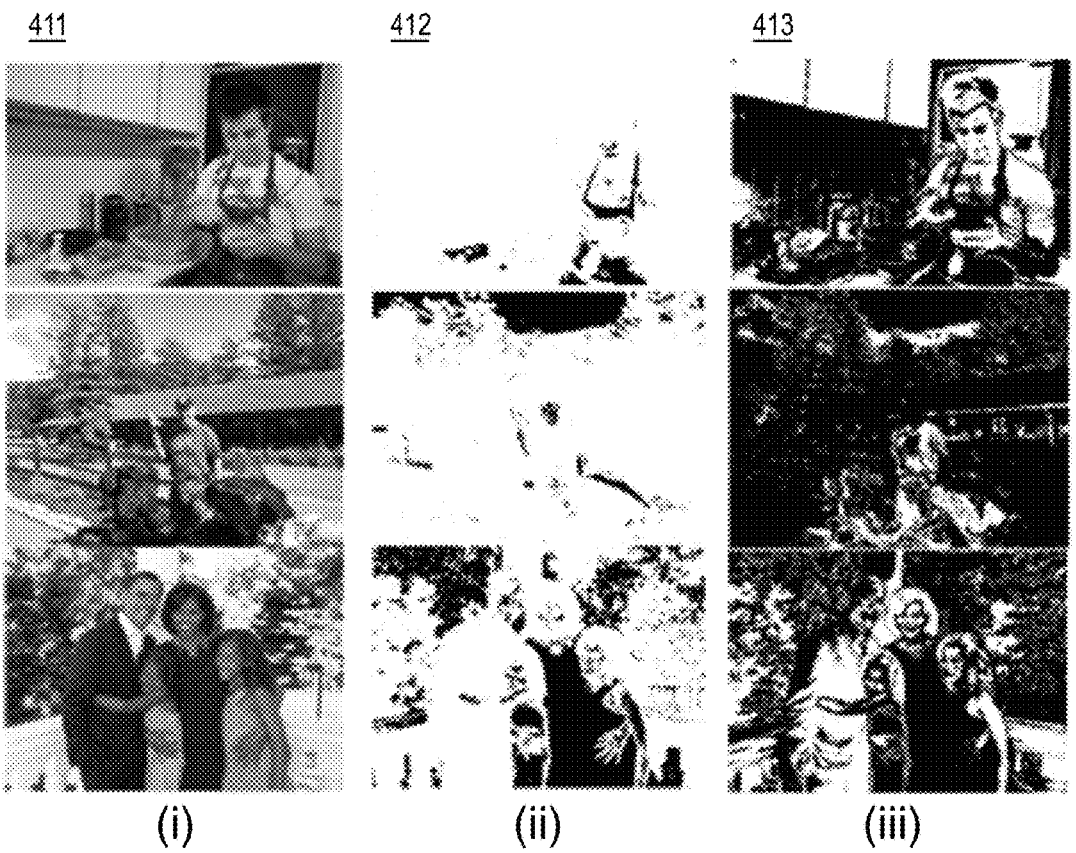
FIG. 4B provides an example comparison of results based on skin tone detection based on eye detection techniques.

FIG. 4B provides an example comparison of results based on skin tone detection based on eye detection techniques, arranged in accordance with at least some implementations of the present disclosure. For example, the results shown in FIG. 4B may be provided when detection of pairs of eyes does not succeed. In FIG. 4B, column of images 411 as provided by FIG. 4B(i) illustrate three different images/video frames on which detection of human skin tones needs to be performed but where eyes based human face region detection fails. In all three scenes, either one or both eyes are falsely detected, or they are falsely matched, resulting in incorrect detection of human face circle. Column of images 412 as provided by FIG. 4B(ii) and column of images 413 as provided by FIG. 4B(iii) illustrate significantly incorrect human skin masks using first and second examples of skin tone detection based on eye detection techniques.

As skin tone detection and implicit or explicit face area detection are closely related, face detection techniques are now discussed.

In some examples, a face detector may use a priori generated template of features produced by a training algorithm that evaluates features such as rectangular Haar-like features on a large number positive and negative face images. Actual face detection (e.g., in an implementation phase) may then be performed by examining a window within the probe frame and evaluating the selected features in a cascade manner: if the window fails at a first stage in the cascade (e.g., a first set of features yield no positive outcome for a face), the window may move to the next area of the frame, and so on. Since only about 0.01% of windows will pass the first stage, detection is fast. A face may be detected if all cascades (e.g., stages) of features pass. For example, four Haar-like rectangular features may be evaluated within the cascade testing. In a test window, there may be many possible sizes and combinations of such features, most of which are discarded during the training so only a small subset of them are selected features organized in a cascade for implementation.

Figure 5A:
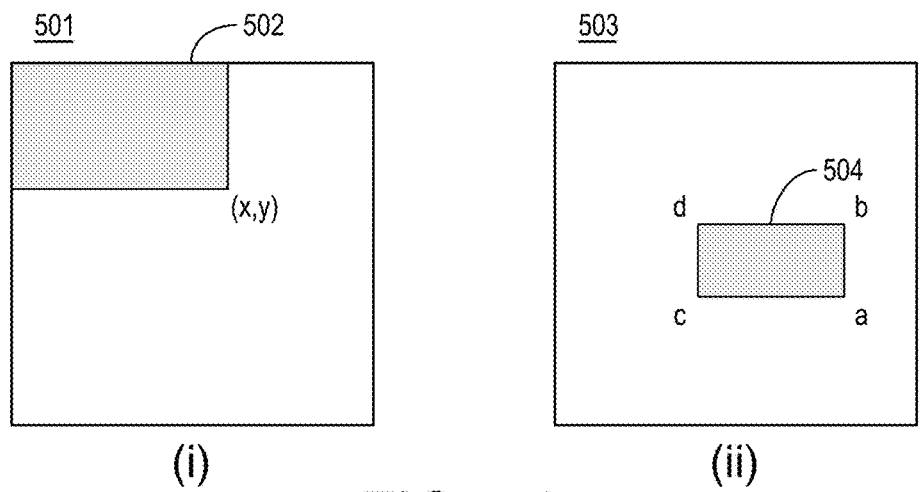
FIG. 5A illustrates an example integral image and an example rectangle sum calculation.

For example, Viola-Jones based face detection techniques may be based on three main concepts: (1) an integral image representation and fast feature computation/evaluation, (2) a learning classifier with adaptive boosting (e.g., Adaboost) training for feature selection/classification, and (3) a cascade of classifiers from training for fast rejection of non-face windows FIG. 5A illustrates an example integral image 501 and an example rectangle sum calculation 503, arranged in accordance with at least some implementations of the present disclosure. For example, FIG. 5A illustrates integral image generation and usage for fast rectangle sum computation. As shown in FIG. 5A, integral image 501 may be a cumulative image formed by the sum of pixels above and to the left of every pixel in the original image. For example, FIG. 5A(i) illustrates the computation of integral image 501 in one pass. In an embodiment, for all points of integral image, each point (x,y) may have a value that is equal to the sum of all points (e.g., all luma values) bounded by (0,0), (x,0), (y,0) and (x,y) (e.g., the sum of all luma values bounded by bounding box 502).

Furthermore, FIG. 5A(ii) illustrates how integral image 501 may be used to determine (quickly) the sum of all luma pixel values within a rectangular area 504. For example, the sum of all luma pixel values within rectangular area 504 may be determined by performing 3 additions. In an embodiment, the sum of all luma pixel values within rectangular area 504 may be determined as shown in Equation (2):

$$\text{Value of Sum of Rectangle } abcd = a-b-c+d \quad (2)$$

wherein a, b, c, and d are integral image values.

By determining an integral image, the sum of pixels of a rectangle may be determined very quickly (e.g., using only 3 additions as discussed). Furthermore, the quick determination of the sum of pixels of rectangles such as rectangular area 504 may be important as face detectors such as a Viola Jones face detector may use rectangular Haar-like features based on such rectangles or rectangular areas, which may be applied (and a response thereto may be) on an image for which faces need to be detected.

Figure 5B:
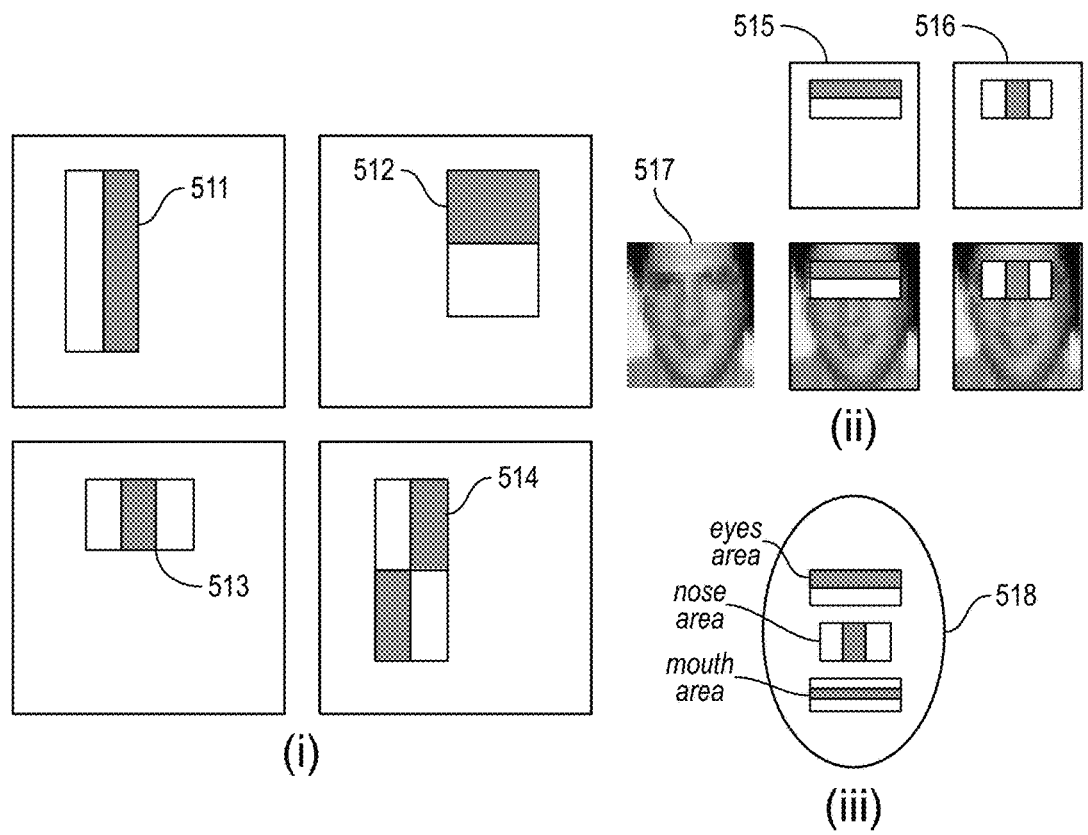
FIG. 5B illustrates example rectangular features.

FIG. 5B illustrates example rectangular features 511-514, arranged in accordance with at least some implementations of the present disclosure. For example, FIG. 5B illustrates Haar-like rectangular features 511-514 used in Viola-Jones face detection such that grey and white indicate different rectangles of a feature. For example, FIG. 5B(i) illustrates four example rectangular features 511-514 (which may also be characterized as filters) such that feature 511 is composed of two (e.g., one white and one grey) vertical rectangles, feature 512 is composed of two (e.g., one white and one grey) horizontal rectangles, feature 513 is composed of three (e.g., two white and one grey) rectangles, and feature 514 is composed of four (e.g., two white and two grey) rectangles. The absolute parity of rectangles in a feature (e.g., grey followed by white or white followed by grey, etc.) is not important. However, the relative parity is important (e.g., alternating of white and grey rectangles). Such Haar-like rectangular features may be applied on an input image (e.g., for which face detection is being performed) at various shifted locations and a response may be examined such that the response may indicate a facial feature in the image has been detected.

For example, for rectangular feature 511 shown in FIG. 5B(i), its value may be determined as shown in Equation (3):

$$\text{value}=\text{sum(pixels in white area rectangle)}-\text{sum(pixels in dark area rectangle)} \quad (3)$$

where value may be the value for rectangular feature 511.

Furthermore, Haar-like features may be selected such that they mimic or respond to actual variations of luminance within a face such as those caused by eyes, a nose, lips etc. For example, for human face detection, an eye area may be relatively darker than the area just spatially below it and a nose area may have different brightness than a cheeks area such that Haar-like rectangular features, if they satisfy certain properties, may signal the presence of a face. In an embodiment, face detection may be performed by sliding a window of features that may, when combined, approximate features of human face resulting in a potential match and detection of a human face. Such implementations may encounter various challenges in practice.

For example, in a typical face detection context, in an input image, a number of faces is typically few (e.g., about zero to ten faces) as compared to non-face areas or regions. Furthermore, searching for faces in an image by moving a window a pixel at a time to perform matching is highly compute intensive due to the large number of pixels in an image (e.g., a high definition, HD, image is 1920×1080 pixels). Also, in an image, faces may exist at any scale, from a very large size such as that a face almost covers an entire image to covering a small area or region such that a face covers only $\frac{1}{200,000}^{th}$ of the size of an image. In addition, any window based matching for face detection may result in false positives that may be significant in number due to the high density of pixels in a typical image. Lastly, using a particular window size of, for example, 24×24 rectangular features may provide too many features (e.g., about 160,000) in the set such that evaluation of the entire set is not feasible.

However, the use of rectangular features may still be quite effective despite such difficulties. For example, two features as shown via features 515, 516 in FIG. 5B(ii) may perform face detection on a target image 517 with high quality such that the combination of features 515, 516 may result in an over 90% (e.g., true positive) face detection rate. However, features 515, 516 may suffer from the limitation that they have a high (e.g., about 50%) false positive rate. Such a high false positive rate may require the use of more complex features (or a sequence of several features). For example, a simple feature set 518 may be used to detect eye areas, a nose area, and a mouth are as shown in FIG. 5B(iii).

As discussed, with relatively simple rectangular features, while successful detection rates of faces may be high, corresponding false detection rates may also be high. In such contexts, multiple features may be used for detection such that while individually the features may be weak learners, with appropriate weighting, collectively they may be combined together into a strong classifier. Such techniques may be characterized as boosting.

For example, boosting may be a classification technique that combines weak learners into an accurate ensemble classifier. Using a training procedure, initially, each sample may be weighted equally. However, in each round of boosting a weak learner sample may be found that reduces the weighted training error, which may be followed by raising the weights of training examples misclassified by a current weak learner. The final classifier may be a linear combination of all weak learners with weight of a learner directly proportional to its accuracy with precise re-weighting and combining weak learners depending on specific boosting (e.g. adaptive boosting (AdaBoost)) techniques employed.

Furthermore, cascading may be used in the context of Viola-Jones face detection to further reduce false positive rates. For example, simple classifiers that detect almost all positive windows while rejecting negative windows may be determined. If the response from a first classifier for a window being evaluated is positive, evaluation of a second more complex classifier may be performed, and so on. On the other hand, a negative outcome at any classifier may provide for rejection of the window. Using such techniques, cascading for face detection such as attentional cascading chains of classifiers that are progressively more complex and have a lower false detection rate may be provided.

Figure 6A:
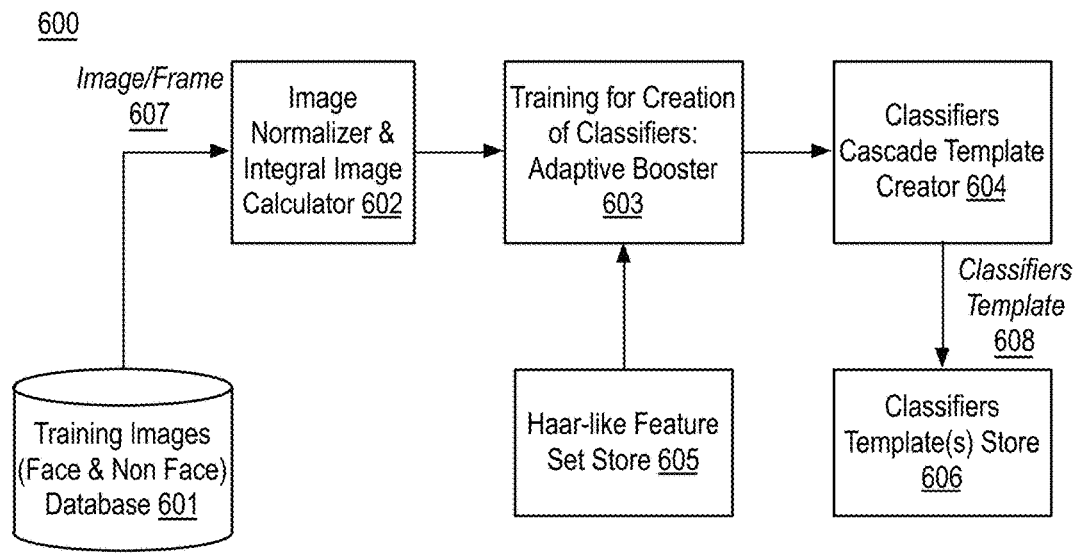
FIG. 6A illustrates a block diagram of an example system for training a face detection system.

FIG. 6A illustrates a block diagram of an example system 600 for training a face detection system, arranged in accordance with at least some implementations of the present disclosure. For example, FIG. 6A illustrates a training phase of a Viola-Jones face detection system. As shown in FIG. 6A, system 600 may receive an image/video frame 607 from a training images (faces and non-faces) database 601 at an image normalizer and integral image calculator 602 that may compute or determine a normalized version of image/video frame 607, which may enhance the contrast within image/video frame 607 and compute or determine an integral image in which a value of any pixel is the sum of all pixels until the line before and up to the pixel to the left of the pixel for image/video frame 607. For example, as discussed, once an integral image is calculated the integral image may allow a sum of all pixels within a rectangle (e.g., a rectangle abcd, please refer to FIG. 1.(ii)) of any size to be calculated quickly by performing three additions of 4 pixels (a, b, c, d) in the integral image (e.g., a−b−c+d) to yield a sum of all pixels bounded by the rectangle abcd. Haar-like rectangular features such as those illustrated in FIG. 5B (e.g., features constructed from a combination of two, three, or four rectangles) may be used as weak learner candidates.

The integral images may be provided to a training for creation of classifiers: adaptive booster 603 that may, based on features received from a Haar-like feature set store 605, use Haar-like features on the normalized and integral training images to learn feature patterns (e.g., classifiers and their cascade) using adaptive boosting. The output of training for creation of classifiers: adaptive booster 603 may be provided to classifiers cascade template creator 604, which may identify the number of features per classifier and create a classifier (e.g., an organized collection of features) for each stage of a cascade. For example, the entire set of classifiers, one for each stage, taken together may represent a template. The output of classifiers cascade template creator 604, classifiers template(s) 608 may be stored in a classifiers template(s) store 306.

Figure 6B:
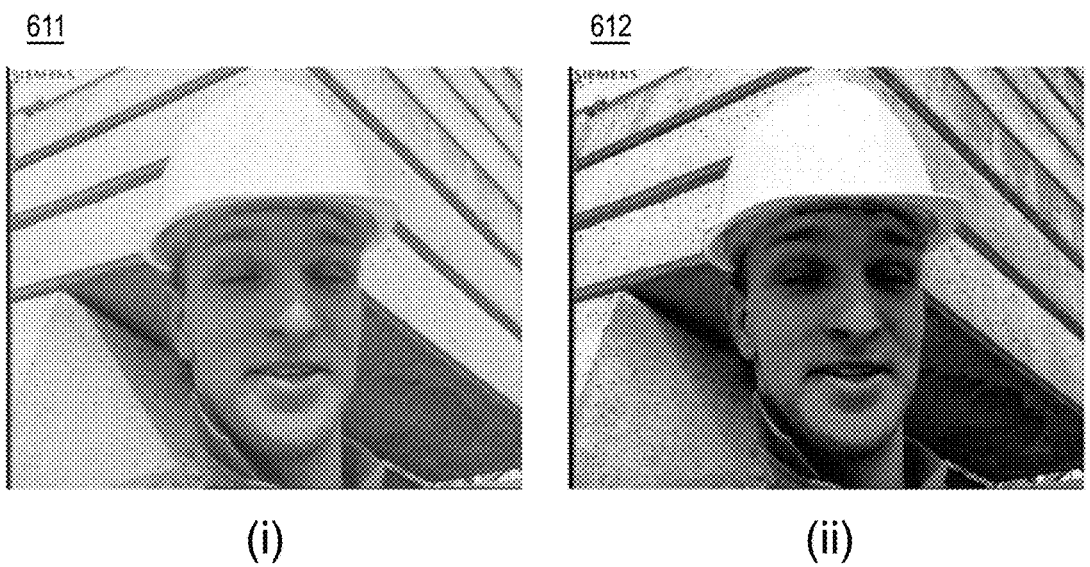
FIG. 6B illustrates an example normalized luma image based on an example luma image.

FIG. 6B illustrates an example normalized luma image 612 based on an example luma image 611, arranged in accordance with at least some implementations of the present disclosure. For example, FIG. 6B illustrates the results of image normalization for a luma signal. As shown, the image normalization process may result in increasing of the contrast of the image (e.g., increasing contrast in normalized luma image 612), which may effectively enhance the luma difference between edge area pixels and low detail area pixels. The increase in contrast may make it easier to obtain improved quality results from feature matching. As discussed, the feature matching using rectangular features may be performed on an integral image which, as discussed, may provide a summation of all pixel values within any given rectangle of the integral image using only 3 addition operations.

Figure 7A:
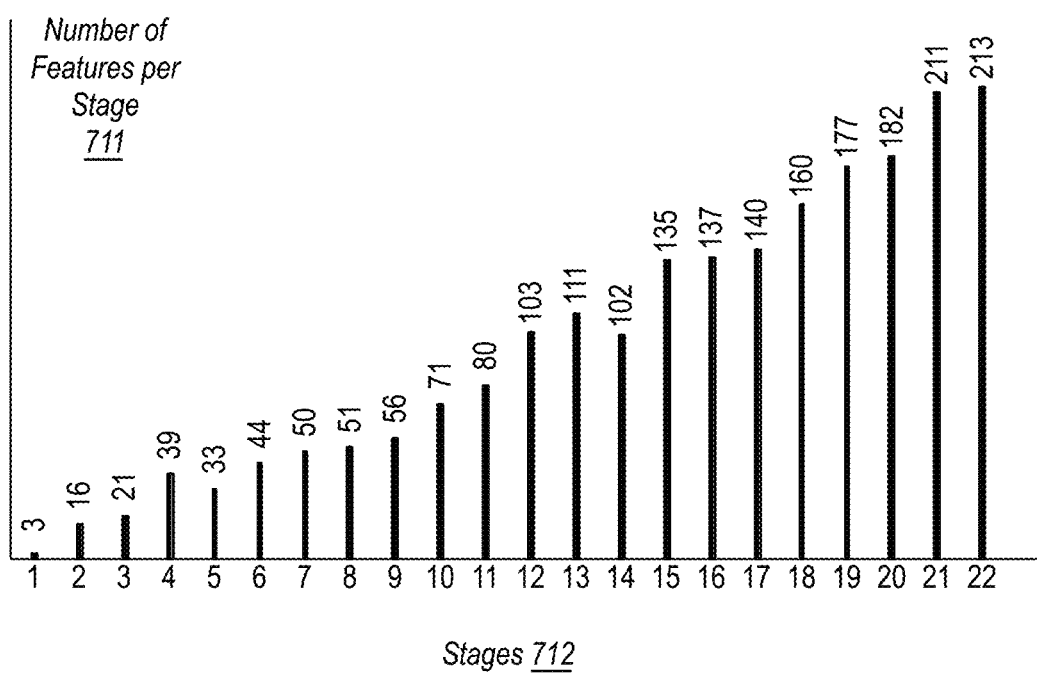
FIG. 7A illustrates an example number of features per classification stage for example classification stages of an example classifier.

FIG. 7A illustrates an example number of features per classification stage 711 for example classification stages 712 of an example classifier 710, arranged in accordance with at least some implementations of the present disclosure. As shown in FIG. 7A, classifier 710 has a total of 22 stages 712 with the classifier for each stage of stages 712 typically being more complex (e.g., in terms of number of features) as compared to its previous stage. For example, the first stage of stages 712 uses a classifier composed of 3 features (e.g., those shown in FIG. 7B(i)), the second stage of stages 712 uses a classifier composed of 16 features (e.g., those shown in FIG. 7B(ii)), and the third, fourth, fifth sixth, and seventh stages use classifiers composed of 21, 39, 33, 44, and 50 features, respectively. Also as shown, the last stage (e.g., stage 22) of states 612 uses a classifier composed of 213 features.

Figure 7B:
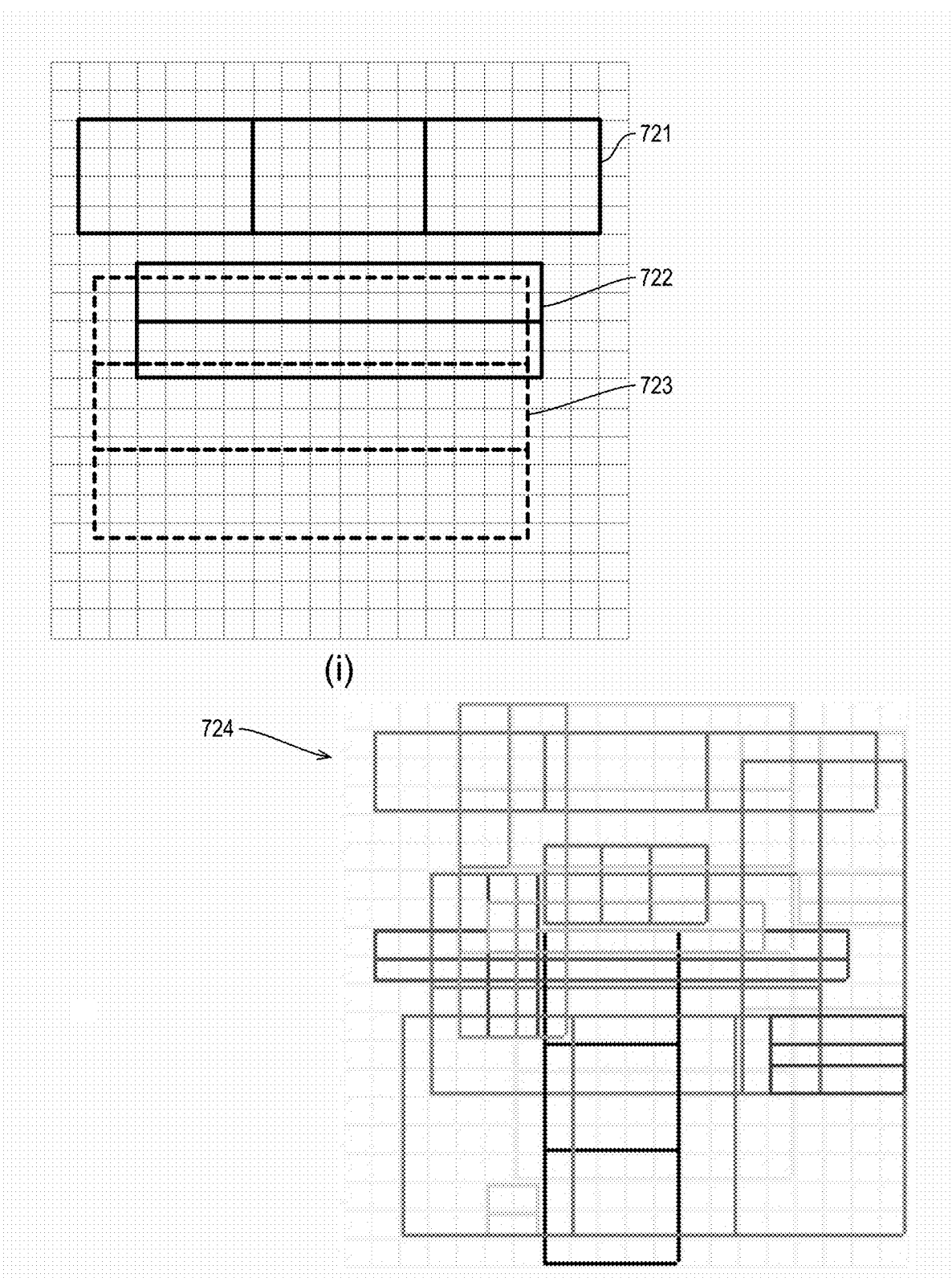
FIG. 7B illustrates example features of stages of an example classifier.

FIG. 7B illustrates example features of stages of an example classifier, arranged in accordance with at least some implementations of the present disclosure. As shown in FIG. 7B(i), a first stage of a classifier may have three features 721, 722, 723 (e.g., though shown in a 20×20 window, features 721, 722, 723 may be scaled to any suitable window size). As shown in FIG. 7B(ii), a second stage of a classifier may have 16 features 724. Although example stages, feature numbers per stage, and features are presented, any suitable number of stages, features per stage, and features may be provided.

Figure 7C:
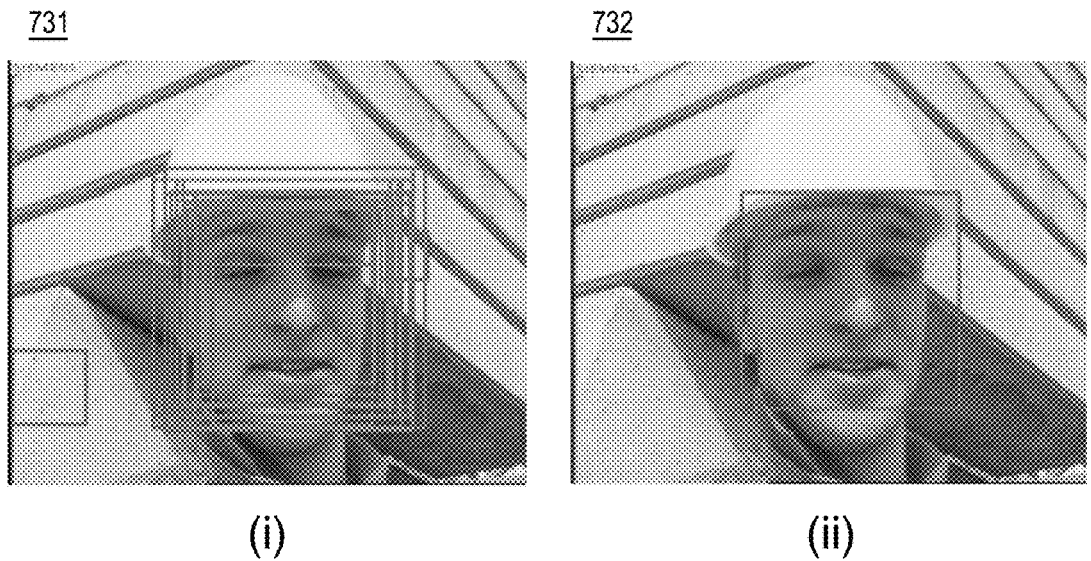
FIG. 7C illustrates example face detection results.

FIG. 7C illustrates example face detection results, arranged in accordance with at least some implementations of the present disclosure. For example, FIG. 7C illustrates results of face detection on the Foreman video sequence at CIF (e.g., 352×288) resolution and 30 frames/sec. As shown in FIG. 7C(i), image 731 may include all windows that passed the test of all stages of the face classifier cascade including false positives (e.g., the separate window on bottom left). FIG. 7C(ii) illustrates isolated positive windows removed and other strong positive overlapping windows solidified, merged, and replaced by a single representative window in image 732. For example, image 731 may include all windows that passed matching and image 732 may provide windows (e.g., a single window in image 822) after pruning and/or combining the passing windows.

Figure 8:
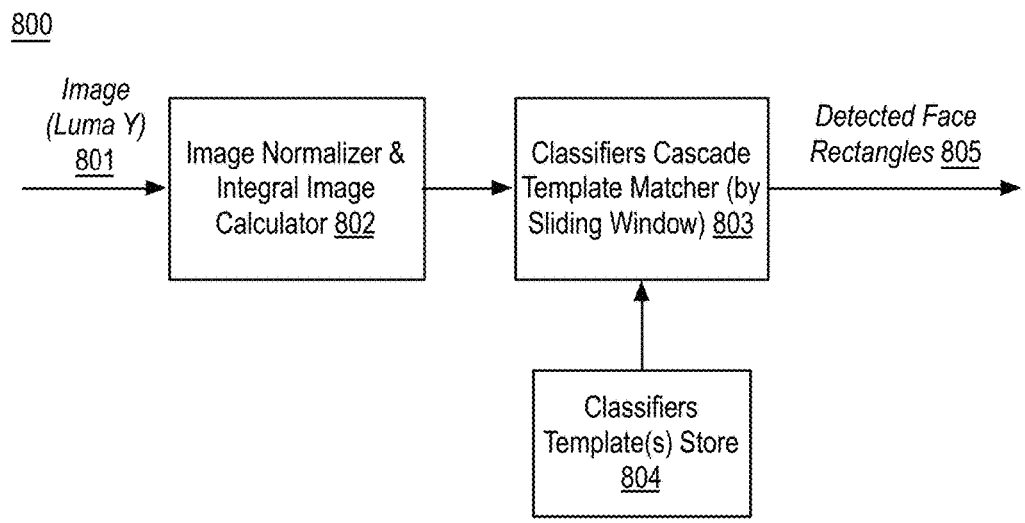
FIG. 8 illustrates an example face detection system.

FIG. 8 illustrates an example face detection system 800, arranged in accordance with at least some implementations of the present disclosure. For example, face detection system 800 may provide a Viola-Jones face detection system for images or frames. As shown in FIG. 8, face detection system 800 may include a normalizer and integral image calculator 802, a classifiers cascade template matcher (by sliding window) 803, and a classifiers template(s) store 804.

Also as shown, an image 801 (or images image or frames) on which face detection is to be performed may be input image normalizer and integral image calculator 802, which may normalize the contrast of image 801 and determine an integral image. Normalizer and integral image calculator 802 may operate in the same manner as image normalizer and integral image calculator 602 (please refer to FIG. 6A). Such operations will not be repeated for the sake of brevity. The normalized image output by image normalizer and integral image calculator 802 may be provided to classifiers cascade template matcher 803 that may search within the normalized luma image using classifiers from the discussed offline training and stored in classifiers template(s) store 804 for potential matches of windows with face like properties. As shown, classifiers cascade template matcher 803 may output final detected face windows in image 801 by overlaying passing windows on classifiers cascade template matcher 803 and/or identifying the position and the size of such windows. In the example of FIG. 8, classifiers cascade template matcher 803 provides an image with overlaid face rectangles 805 with such windows overlaid over 801.

Current approaches to skin tone detection suffer from the following limitations. First, current techniques are thresholding based and intended for detection of skin tones in images. Therefore, they are often simplistic and not robust for detecting faces in video where frame to frame consistency is highly desirable. Second, current techniques use a single color space for skin tone detection that does not allow for good adaptation to dynamic properties of the content, which may result in false or missed detection. Third, current techniques are not designed for independent operation but are often a supplemental technique to assist in face detection. Fourth, in current techniques, detection of skin tones is sensitive to changes in hue and brightness resulting in non-robust frame to frame detection of skin tones. Finally, current techniques typically attempt to use limited information about human faces such as detection of eyes for improved detection. However eye detection itself is often not robust as one or both eyes may be mis-detected or missed due to occlusion, multiple people in scene, small size-faces, eyeglasses, sunglasses, or the like.

Furthermore, current face detectors such as Viola-Jones face detectors have shortcomings such as those that follow. First, current face detectors may be effective on frontal images of faces only. Second, current face detectors may have low detection rates/lower robustness for instances where faces are rotated beyond 45 degrees around horizontal or vertical axis. Third, current face detectors may be sensitive to changes in lighting conditions. Fourth, current face detectors may provide multiple detections of the same face due to overlapping sub-windows.

Also, attempts to combine skin tone detection and aspects of face detection have not been successful as limited detection of facial features such as eyes is not a robust solution and full detection of faces in video is relatively a complex operation such that the resulting complexity is too high to be practical for high resolution video content.

Such shortcomings are addressed using the techniques discussed herein. For example, the techniques discussed herein provide highly robust and fast skin region detection and tracking in video scenes. Such techniques may provide faster processing and better accuracy as compared to traditional techniques in terms of detection rate and in terms of detected face area boundaries.

For example, the techniques discussed herein may implement principles to provide corresponding benefits as follows. First, the skin tone detection techniques discussed herein may use the Yrg color space as the basic color space the YUV color space as a supplement. Specifically, the skin tone detection techniques discussed herein may use multiple skin probability histograms in the Yrg space and a dynamically generated skin probability histogram in the YUV color space. The use of the YUV space for a dynamically generated probability histogram may provide the advantage that a smaller set of samples in the UV space can successfully cover larger skin color ranges as needed for determining all skin related areas in the frame. Second the skin tone detection techniques discussed herein may use the fully orthogonal rg color map and an adaptive luma histogram which may be used to update the rg histogram values dynamically based on luma levels in the actual content. Such techniques may retain the high quality detection rate of orthogonal color spaces and include luminance levels that may successfully skew (e.g., weigh) the skin probabilities accordingly. Third, the skin tone detection techniques discussed herein may use modeling that is targeted for detection in video (e.g., rather than detection an image) that combines elements of pixel based and segment based skin detection and motion information. Fourth, the skin tone detection techniques discussed herein may use a mechanism of skin tone capture from faces that uses a pixel skin probability measure based on a skin probability UV histogram and an adaptive luma histogram to assign skin probability weights to the face detected area. Furthermore, facial areas may also be used to test the reliability of a segmented skin mask. Also an adaptation based on face regions may be used if the mask is not found to be reliable. The adaption may use non-weighted sampling such that samples are taken from an inner elliptical area of a face region.

The skin tone detection techniques discussed herein allow for a real-time, high-accuracy skin tone detection in high-definition video content. Such techniques provide advanced multistage color based skin detection, use motion cue and a face detector (e.g., a Viola Jones face detector) to assist the detection process and improve the overall detection rate.

Figure 9A:
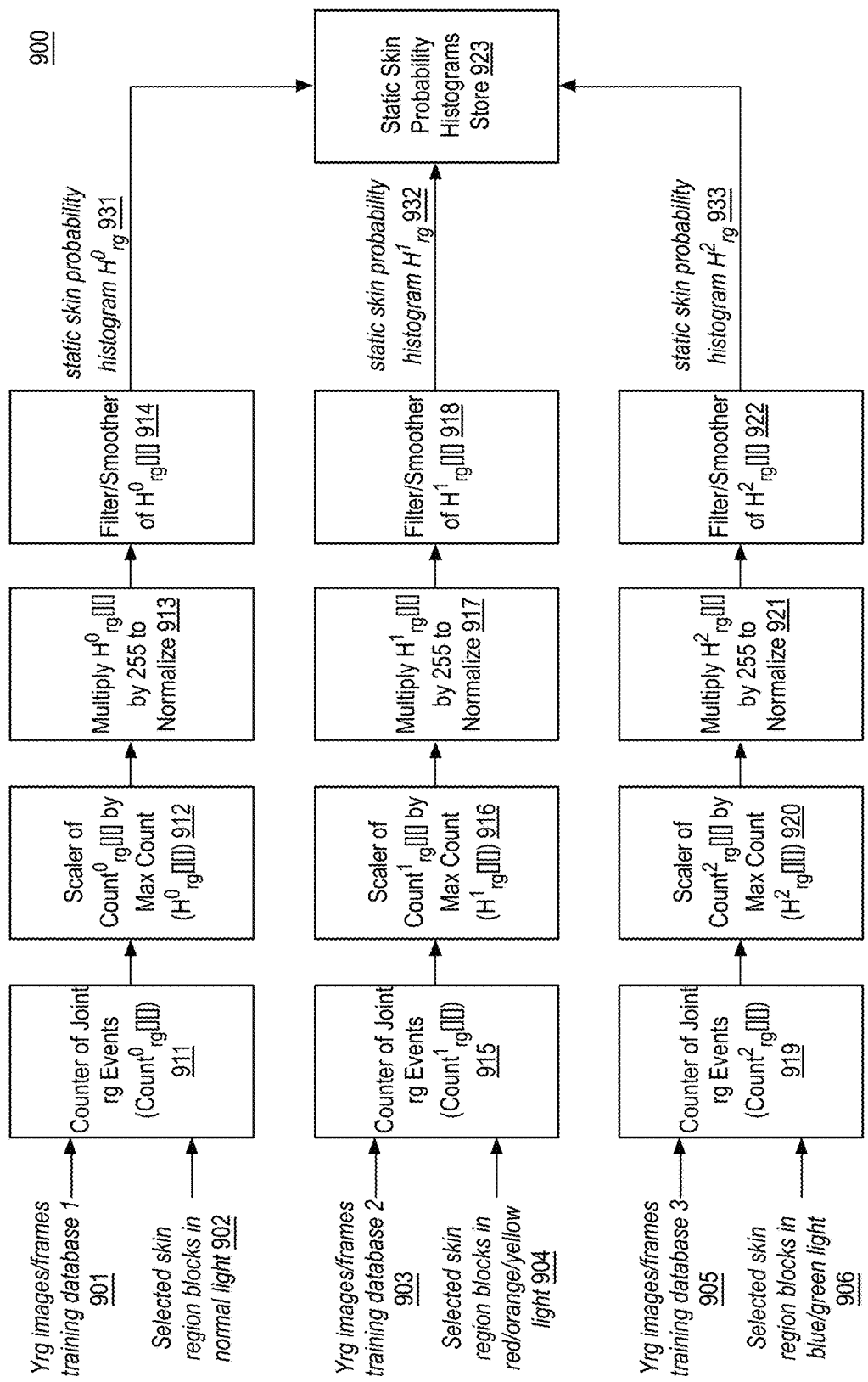
FIG. 9A illustrates a block diagram of an example system for offline training of skin probability histograms.

FIG. 9A illustrates a block diagram of an example system 900 for offline training of skin probability histograms, arranged in accordance with at least some implementations of the present disclosure. For example, system 900 may provide an offline training phase to generate skin probability histograms referred to as static skin probability histograms. As shown in FIG. 9, system 900 may include a counter of joint rg events 911, a counter of joint rg events 915, a counter of joint rg events 919, a scaler by max count 912, a scaler by max count 916, a scaler by max count 920, a normalizer 913, a normalizer 917, a normalizer 921, a filter/smoother 914, a filter/smoother 918, a filter/smoother 922, and a static skin probability histograms store 923.

Also as shown, system 900 may generate skin probability histograms referred to as static skin probability histograms 931, 932, 933. In the illustrated example, three such histograms are generated. However, any number of such histograms may be generated. As shown, images/frames available for use in training are divided into three categories based on whether they contain skin tones in normal illumination, red/orange/yellow illumination as is the case for sun-rise or sun-set scenes, or blue/green light as is the case for indoor scenes at lower brightness level. The three categories of content are referred to here as training database 1 (e.g., Yrg images/frames training database 901), training database 2 (e.g., Yrg images/frames training database 903), and training database 3 (e.g., Yrg images/frames training database 905).

As shown, for each of the three databases of image/frames, sample blocks of skin region areas are selected for calculation of corresponding type of skin probability histogram. For example, as shown, Yrg images/frames training database 901 are input with selected skin region blocks in normal light 902 (e.g., maps for each image/frame) counter of joint rg events 911 (e.g., to provide $Count^0_{rg}[\ ][\ ]$). The output of counter of joint rg events 911 may be input to scaler (e.g., scaler of $Count^0_{rg}[\ ][\ ]$ by max count) 912 that may scale the count by a maximum value of the count (e.g., to provide $H^0_{rg}[\ ][\ ]$). The output of scaler 912 may be provided to normalizer (e.g., multiply $H^0_{rg}[\ ][\ ]$ by 255 to normalize) 913 that may normalize by 255 to generate a normalized histogram. The normalized histogram may be provided to filter/smoother (e.g., filter/smoother of $H^0_{rg}[\ ][\ ]$) 914, which may filter and/or smooth the histogram to provide static probability histogram $H^0_{rg}$ 931, which may be stored in static skin probability histograms store 923.

Similar processing may be provided for Yrg images/frames training database 903 and selected skin region blocks in red/orange/yellow light 904 (e.g., maps for each image/frame) via counter of joint rg events 915, scaler by max count 916, normalizer 917, and filter/smoother 918 to generate static probability histogram $H^1_{rg}$ 932, which may be stored in static skin probability histograms store 923. Furthermore, similar processing may be provided for Yrg images/frames training database 905 and selected skin region blocks in blue/green light 906 (e.g., maps for each image/frame) via counter of joint rg events 919, scaler by max count 920, normalizer 921, and filter/smoother 922 to generate static probability histogram $H^2_{rg}$ 933, which again may be stored in static skin probability histograms store 923.

Figure 9B:
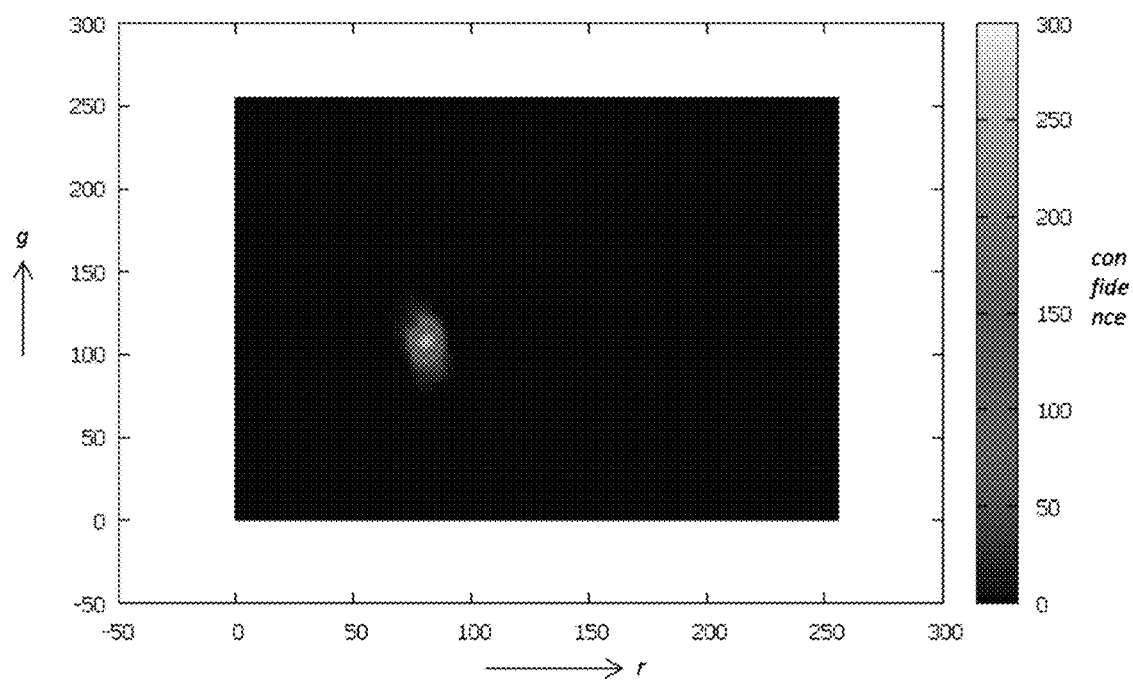
FIG. 9B illustrates an example skin tones rg color histogram for skin tones in normal light.
Figure 9C:
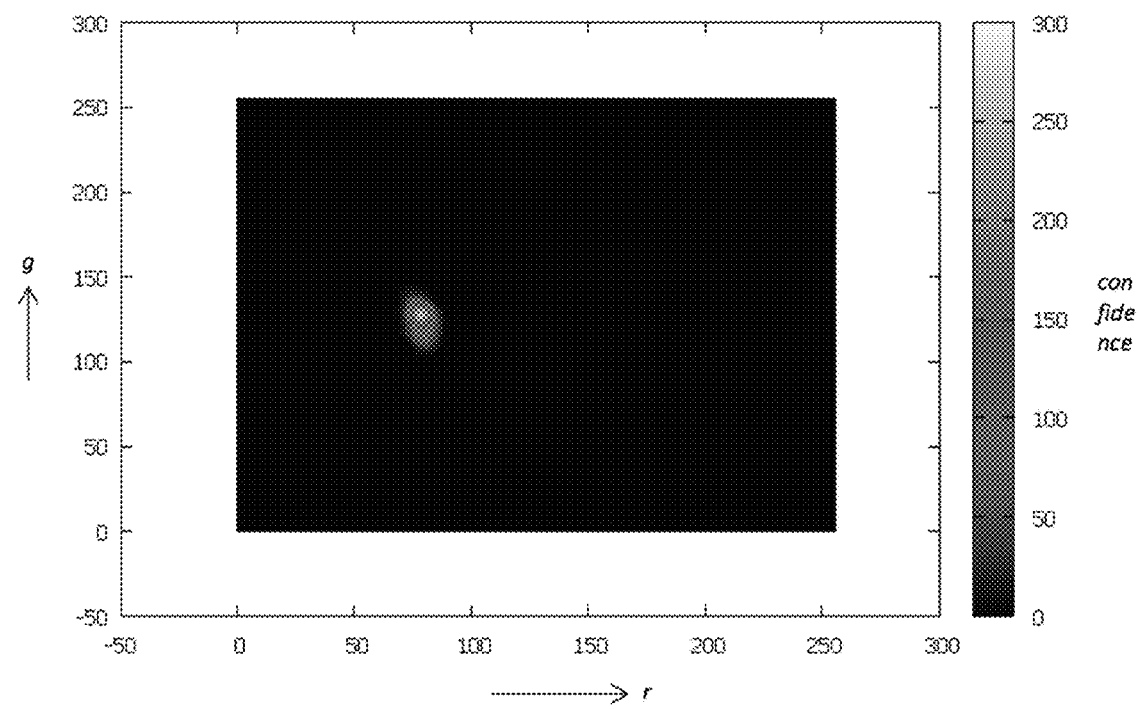
FIG. 9C illustrates an example skin tones rg color histogram for skin tones in red/orange/yellow light.
Figure 9D:
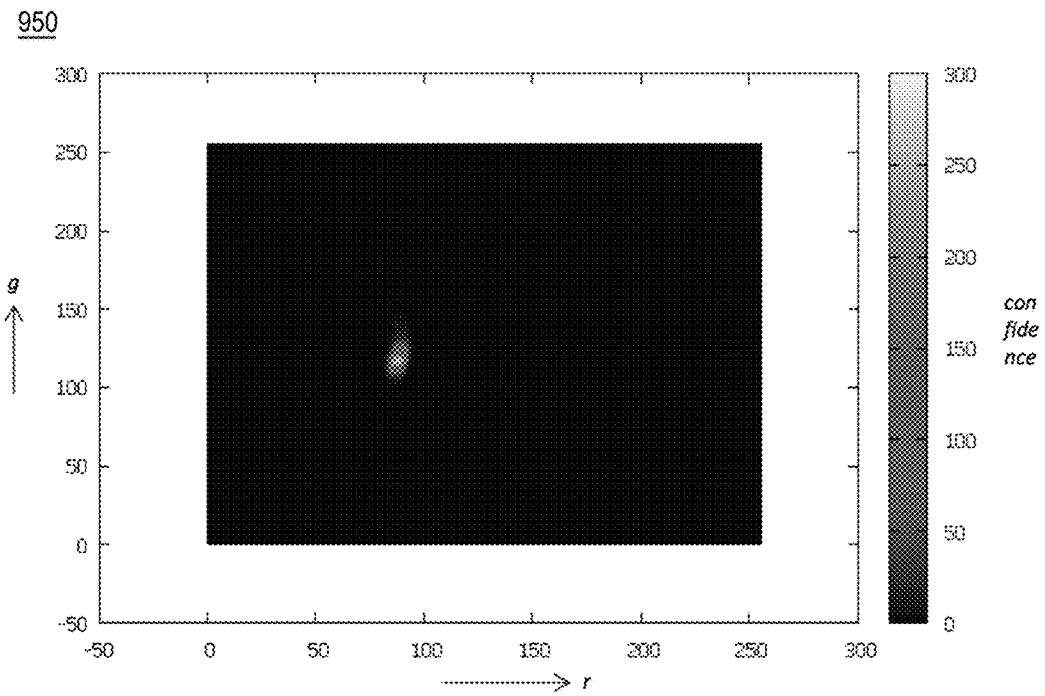
FIG. 9D illustrates an example skin tones rg color histogram for skin tones in blue/green light.

FIG. 9B illustrates an example skin tones rg color histogram 930 for skin tones in normal light, arranged in accordance with at least some implementations of the present disclosure. FIG. 9C illustrates an example skin tones rg color histogram 940 for skin tones in red/orange/yellow light, arranged in accordance with at least some implementations of the present disclosure. FIG. 9D illustrates an example skin tones rg color histogram 940 for skin tones in blue/green light, arranged in accordance with at least some implementations of the present disclosure. As shown in FIG. 9B, skin tones rg color histograms 930, 940, 950 show high probability events in rg color space normalized to value of 255. The x-axis of the skin-tones rg color histograms represents the value of the 'r' component, the y-axis represents the value of the 'g' component, and the z-axis (not shown) represents the frequency of joint rg events. For example, the dark areas of the skin-tones rg color histograms represent joint rg events of low probability while the lighter areas represent high probability events.

Figure 9E:
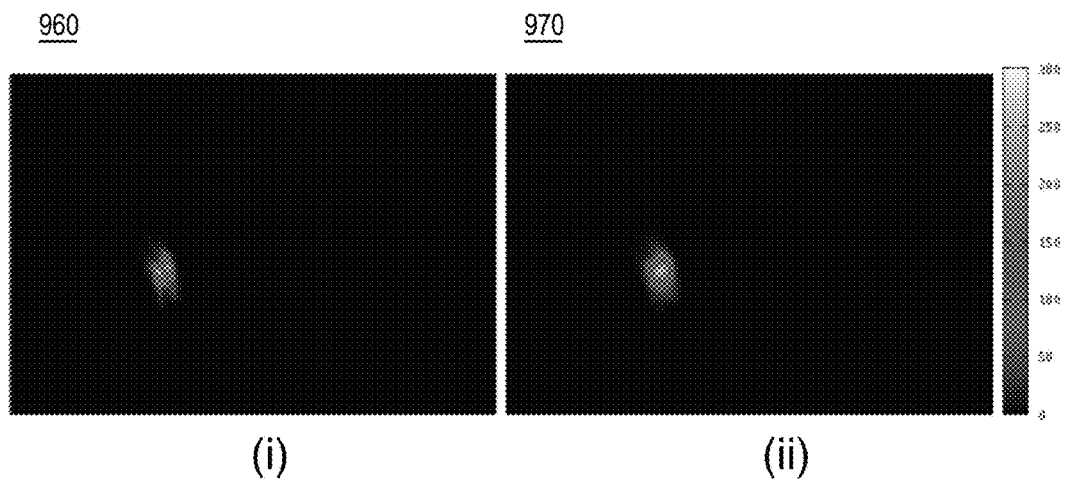
FIG. 9E illustrates example results of filtering a skin probability histogram.

FIG. 9E illustrates example results of filtering a skin probability histogram, arranged in accordance with at least some implementations of the present disclosure. For example, FIG. 9E(i) illustrates an example of computed skin probability histogram in rg space 960 that is to be smoothed and FIG. 9E(ii) illustrates, also in rg color space, a smoothed histogram 970 resulting from filtering by a 7×7 averaging filter. Although discussed with respect to a 7×7 averaging filter any suitable filter and/or smoother may be applied.

As discussed, skin probability histograms may be trained offline. Discussion no turns to operation (e.g., in an implementation phase) of a skin tone detection system. The skin tone detection techniques may process input YUV 4:2:0 frames without buffering delay. Such techniques may also use a memory buffer that may keep the current luma (Y) frame and up to 8 previous Y frames in order to perform motion analysis. The memory buffer may also buffer up to 8 computed block accurate motion measure frames that may also be used for motion cue computation.

Figure 10:
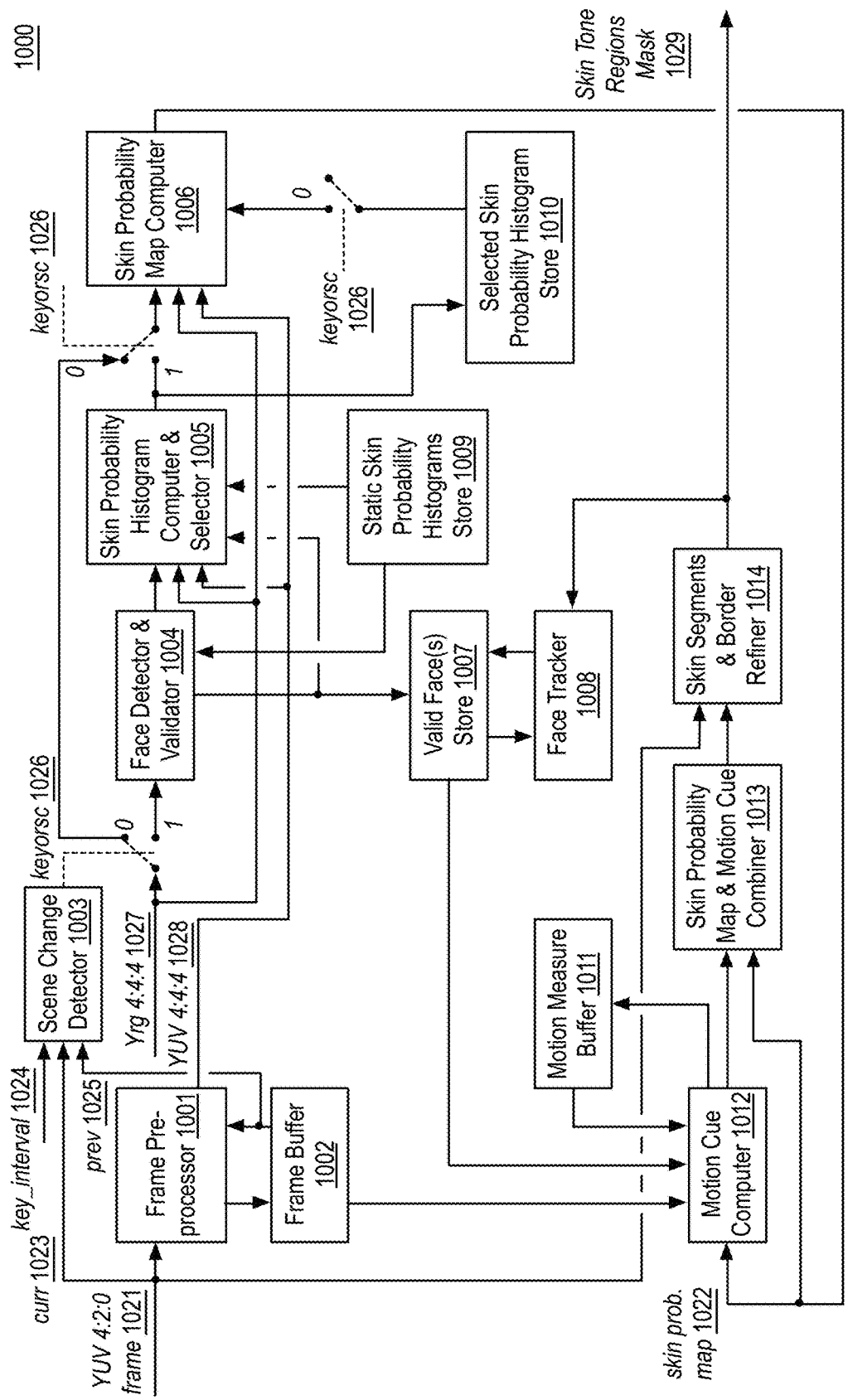
FIG. 10 illustrates a block diagram of an example system for skin tone region detection.

FIG. 10 illustrates a block diagram of an example system 1000 for skin tone region detection, arranged in accordance with at least some implementations of the present disclosure. As shown in FIG. 10, system 1000 may include a frame preprocessor 1001, a frame buffer 1002, a scene change detector 1003, a face detector and validator 1004, a skin probability histogram computer and selector 1005, a skin probability map computer 1006, a valid face(s) store 1007, a face tracker 1008, a static skin probability histograms store 1009, a selected skin probability histogram store 1010, a motion measure buffer 1011, a motion cue computer 1012, a skin probability map and motion cue combiner 1013, and a skin segments and border refiner 1014.

Also as shown, a video frame 1021 such as a YUV 4:2:0 video frame may be received by system 1000. Although discussed with respect to a YUV 4:2:0 video frame, any suitable video frame may be received. For example, video frame 1021 may be a video frame of a sequence of video frames. For example, each frame of video in full YUV 4:2:0 resolution may be input to frame preprocessor 1001. As shown, frame preprocessor 1001 may generate and output a Yrg 4:4:4 frame 1027 (e.g., converted and downsampled Yrg 4:4:4 frames) and a YUV 4:4:4 frame 1028 (e.g., downsampled YUV 4:4:4 frames). Furthermore, optionally in parallel, video frame 1021 (e.g., current frame 1023) may be input to scene change detector 1003 along with a past YUV 4:2:0 frame (e.g., previous frame 1025) to be used for scene change detection. Also, a key_interval 1024 may be input to scene change detector 1003. As shown, scene change detector 1003 may output a signal (e.g. keyorsc 1026) that may provide a signal for key change frames. For example, keyorsc 1026 may provide value of 1 at scene changes or when key_interval 1024 is reached.

Yrg 4:4:4 frame 1027 generated by frame preprocessor 1001 is input to face detector and validator 1004, which may search for presence of faces in key frames (e.g., in response to keyorsc 1026) and mark face rectangles and validate them for presence of actual faces (e.g., instead of false positives). Such valid rectangles may be stored in valid face(s) store 1007. Also, the valid face rectangles (e.g., windows) are input, along with Yrg 4:4:4 frame 1027, YUV 4:4:4 frames 1027, and static skin probability histograms (e.g., from pre-training as stored in static skin probability histograms store 1009) to skin probability histogram computer and selector 1005. When the frame is a key frame or scene change frame (e.g., keyorsc 1026 is 1), the selected skin probability histogram can be stored, otherwise (e.g., for a non key or no scene change case such that keyorsc 1026 is 0) the stored values of histogram from selected skin probability histogram store 1010 is used.

As shown, Yrg 4:4:4 frame 1027, YUV 4:4:4 frame 1028, and a selected skin probability histogram are provided to skin probability map computer 1006. The skin probability map at the output of skin probability map computer 1006, frames in frame buffer 1002, valid face rectangles from valid face(s) store 1007 (e.g., as detected for key frames or scene change frames and as tracked by face tracker 1008 for non key and non scene change frames), and contents of motion measure buffer 1011 are input to motion cue computer 1012. Motion cues from motion cue computer 1012 and the skin probability map from skin probability map computer 1006 are input to skin probability map and motion cue combiner 1013, which may output one or more motion cues that may be provided to skin segments and border refiner 1014. Skin segments and border refiner 1014 may receive the motion cues and the Y plane of video frame 1021 (e.g., the current frame). After optional post-processing, the output of skin segments and border refiner 1014 may provide a final skin tone regions mask indicating skin tone regions in video frame 1021. As discussed further herein, such a skin tone regions mask (e.g., skin tone regions) may be used to provide improved video coding of the video sequence including video frame 1021.

For example, frame preprocessor 1001 may perform block based subsampling, color space conversion, and luma frame buffering. Scene change detector 1003 may perform detection of scene changes in video sequences. In addition, scene change detector 1003 may also keep track of key_interval frequency and output a signal with value of 1 at scene changes or when key_interval is reached (e.g., as provided by keyorsc 1026). Face detector and validator 1004 may perform face detection (e.g., based on a Viola-Jones method) and face rectangle(s) validation based on an initial skin probability map. Skin probability histogram computer and selector 1005 may determine the skin probability histogram from the detected face regions (e.g., a dynamic histogram) and select a suitable skin probability histogram between the dynamic and multiple (e.g., three) static (e.g., offline computed) histograms. Skin probability map computer 1006 may determine the skin probability map of the current frame (e.g., at block accuracy) using the selected skin probability histogram. Motion cue computer 1012 may determine motion measurements such as sum of absolute differences (SAD) based motion measures, determine motion measure buffer updates, and determine motion cues (e.g., using the computed motion measures and buffered motion data). Skin probability map and motion cue combiner 1013 may merge the skin probability mask with the motion cues to produce a combined skin tone segments mask. Skin segments and border refiner 1014 may re-classify skin segments, fix the border of the existing skin regions and output skin tone regions mask 1029. Face tracker 1008 (or a face segments tracker) may track (e.g., update the position) of face rectangles from frame to frame. Discussion now turns to a more detailed description of such components of system 1000 and the operations performed by them.

Figure 11A:
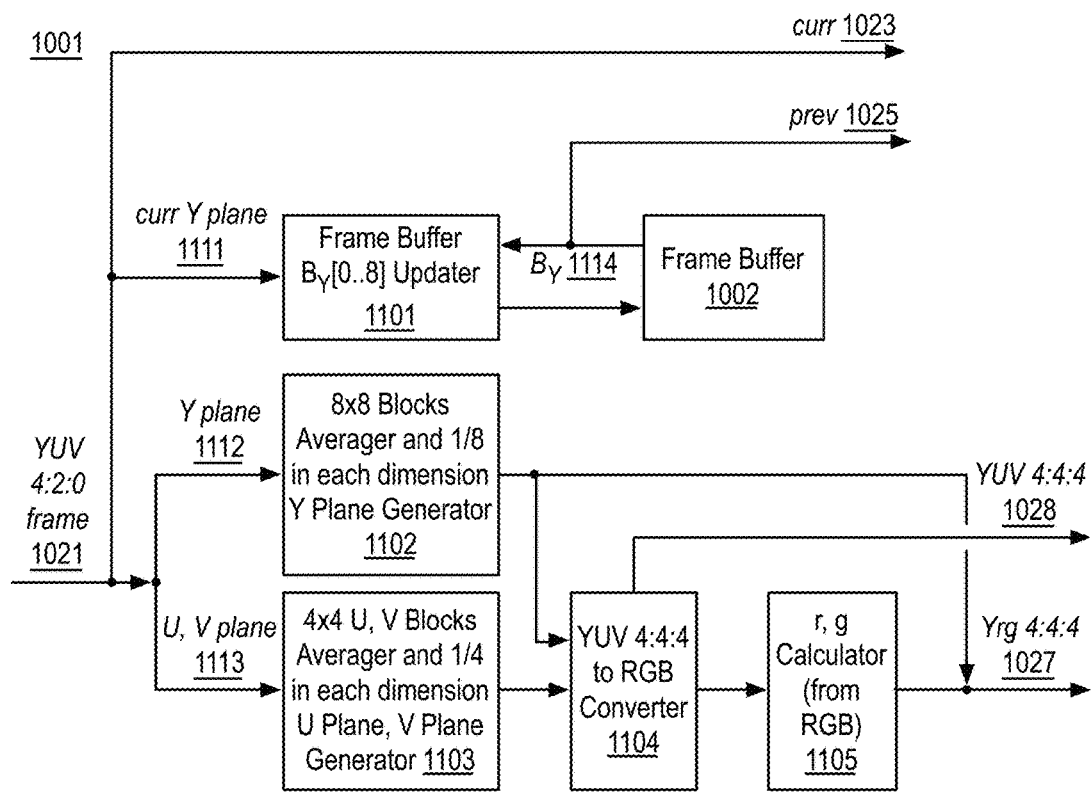
FIG. 11A illustrates an example frame preprocessor.

FIG. 11A illustrates an example frame preprocessor 1001, arranged in accordance with at least some implementations of the present disclosure. For example, frame preprocessor 1001 may perform luma/chroma downsampling, color space conversion, and updating of the frame buffer store. As shown, frame preprocessor 1001 may include a frame buffer updater 1101, a Y plane generator 1102, a U plane, V plane generator 1103, a YUV to RGB converter 1104, and a r, g calculator 1105.

Also as shown, downsampling may be performed to down convert a pixel based YUV 4:2:0 frame (e.g., video frame 1021) into a downsized YUV 4:4:4 frame. For example, down scaling may be performed by computing the average value of each block (e.g., 8×8 block size is used for luma while 4×4 block size is used for chroma) for luma and chroma based on Y plane generator 1102 averaging Y plane 1112 and U plane, V plane generator 1103 averaging U, V planes 1113.

Figure 11B:
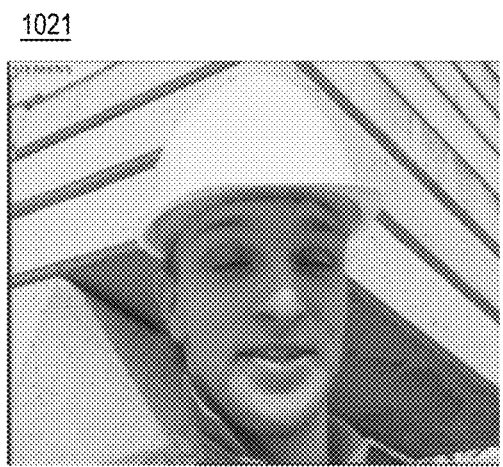
FIG. 11B illustrates an example subsampling of a YUV 4:2:0 frame.
Figure 11B:
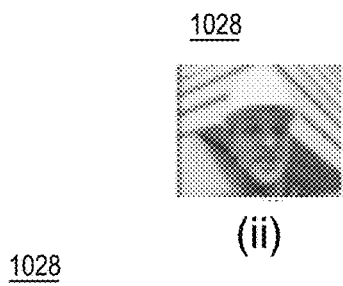
Figure 11B:

FIG. 11B illustrates an example subsampling of a YUV 4:2:0 frame, arranged in accordance with at least some implementations of the present disclosure. For example, FIG. 11B(i) illustrates an example YUV 4:2:0 frame 1021, FIG. 11B(ii) illustrates an example averaged YUV frame 1028 (e.g., a YUV 4:4:4 frame) generated by averaging YUV 4:2:0 frame 1021, and FIG. 11B(iii) illustrates a pixel repeated upsampled version of YUV frame 1028.

Returning to FIG. 11A, in a color conversion operation, downsampled YUV 4:4:4 frame 1028 (which is also provided as an output) may be converted to a RGB24 format frame YUV to RGB converter 1104. Such a conversion may be performed based on the following set of conversions (with the results rounded to the nearest integer and clipped to [0,255] range) as provided by Equations (4), (5), and (6):

$$R = Y + 1.14 \times (V-128) \quad (4)$$

$$G = Y - 0.395 \times (U-128) - 0.581 \times (V-128) \quad (5)$$

$$B = Y + 2.032 \times (U-128) \quad (6)$$

As shown, the RGB24 format frame may be converted to Yrg 4:4:4 frame 1027 (e.g., a Yrg format frame) (with the results rounded to the nearest integer and clipped to [0,255] range) by r, g calculator (from RGB) module 1105 that may implement the following conversion matrix to generate Y, r, and g planes as provided by Equations (7), (8), and (9) below. In some examples, since it is almost identical to the Y plane of YUV 4:4:4 frame 1208, the Y plane from YUV 4:4:4 frame 1208 may be used to saving additional computations.

$$Y = (R \times 306 + G \times 601 + B \times 117)/1024 \quad (7)$$

$$r = (R \times 255)/(R+G+B+1) \quad (8)$$

$$g = (G \times 255)/(R+G+B+1) \quad (9)$$

As shown, such conversions may provide Yrg 4:4:4 frame 1027, which may be provided as output. For example, Yrg 4:4:4 frame 1027 and YUV Yrg 4:4:4 frame 1027 may provide block accurate resolution.

The previously discussed frame buffer 1002 may hold up to the last 9 Luma frames (e.g., $B_Y[0 \ldots 8]$). For example, frame buffer 1002 may be updated by frame buffer updater 1101 and frame buffer 1002 may operate as a stack such that the current Y frame is stored on the top (e.g., at location 0) while last frame in the stack gets pushed out as shown in Equation (10). As shown, frame buffer updater 1101 may receive frames 1114 from frame buffer 1002. For example, the index of each frame shows how long the frame has been in the frame buffer 1002.

$$B_Y[8]=B_Y[7]; B_Y[7]=B_Y[6]; \ldots B_Y[1]=B_Y[0]; B_Y[0]=Y; \qquad (10)$$

For example FIG. 11A illustrates a current YUV 4:2:0 frame 1021 being input to frame preprocessor 1001 and a number of different outputs such as the same current YUV 4:2:0 frame 1023, an immediately previous YUV 4:2:0 frame 1025, current YUV 4:4:4 frame 1028 (e.g., as generated by the YUV to RGB converter 1104), and Yrg 4:4:4 frame 1027 (e.g., as generated by r, g calculator 1105). In order to keep complexity low, each of Yrg 4:4:4 frame 1027 and YUV 4:4:4 frame 1028 are kept at 1/64th the size of the luma plane of the original image/frame.

Returning to FIG. 10, scene change detector 1003 may include any suitable scene change detector. For example, a scene change detector may be a standard component in a video processing chain or pipeline. For example, scene change detector 1003 may be any suitable scene change detector that receives, as input, two YUV 4:2:0 frames (e.g., either current frame 1023 and previous frame 1025 or a current frame and a future frame) and determines if there has been a scene change between the two received frames. For example, depending on a complexity versus quality of detection tradeoff, the received frames may be full resolution or lower resolution. Furthermore, scene change detector 1003 may also receive, as input, key_interval 1024 that may provide a signal that depends on how often a forced intra (e.g., breaking temporal dependencies) is to be injected in the video sequence. As shown, the output of scene change detector 1003 is keyorsc 1026, a signal that has a signal indicating whether a frame is a key frame or a scene change frame. For example, keyorsc may have a value of 1 when a frame is either a key frame or a scene change frame and a value of 0 otherwise.

Figure 12A:
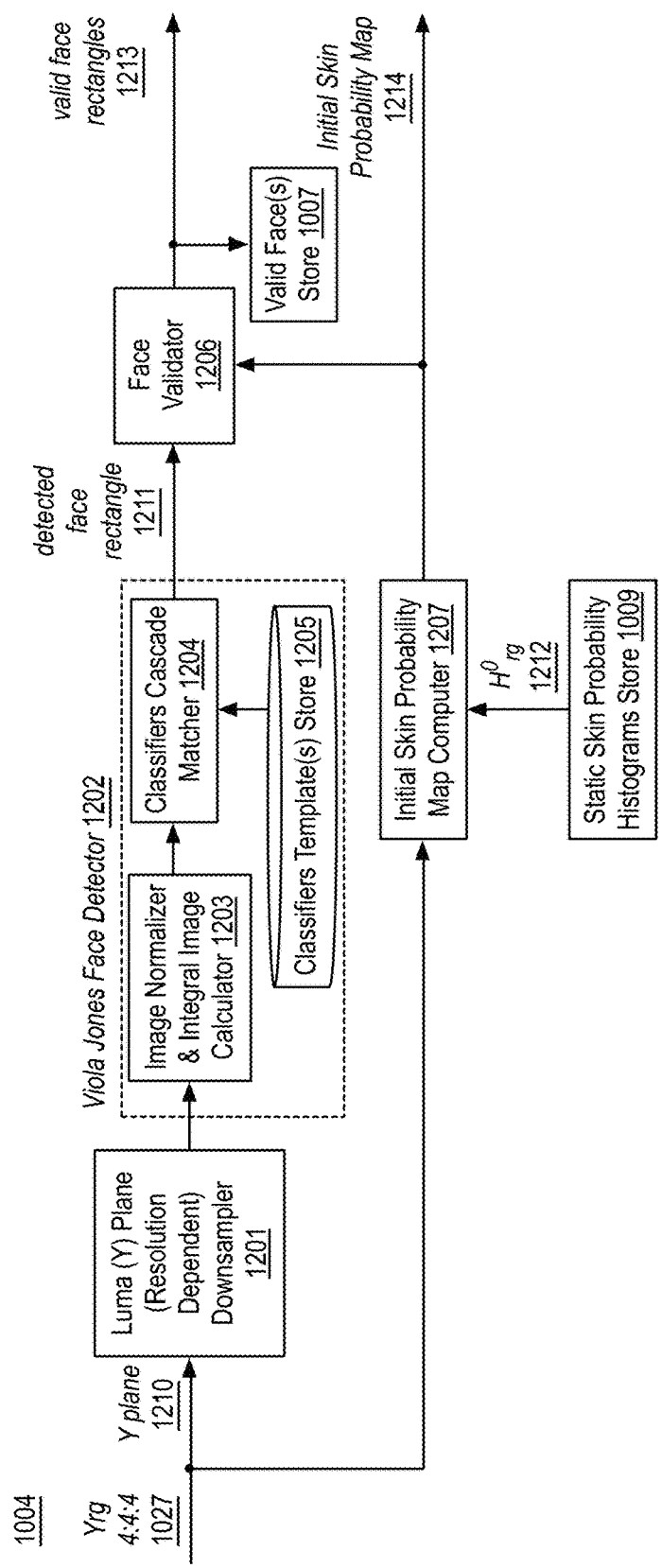
FIG. 12A illustrates an example face detector and validator.

FIG. 12A illustrates an example face detector and validator 1004, arranged in accordance with at least some implementations of the present disclosure. As shown, face detector and validator 1004 may include a luma plane downsampler 1201, a Viola Jones face detector 1202 including an image normalizer and integral image calculator 1203, a classifiers cascade matcher 1204, and a classifiers template(s) store 1205, a face validator 1206, and an initial skin probability map computer 1207.

For example, the accuracy of the skin probability mask or map directly affects the final quality of the skin detection method and is a crucial steps in the process discussed herein. Face detection may be performed at key frames (only) to aid the accuracy of the skin probability mask or map. For example, if faces are successfully detected, an analysis of skin tone within the detected face areas may reveal a more accurate and more specific skin color pertinent to the group of frames or entire scene of which the frame is a member, which would improve quality of the final skin map. As discussed, face detection itself may be limited in quality and accuracy (e.g., at times detecting non-faces as faces, detecting partial faces, etc.) and validation of detected faces and validation of derived skin colors may be advantageous.

As shown in FIG. 12A, Yrg 4:4:4 frame 1027 (e.g., a Y plane 1210 thereof) may be input to luma plane downsampler 1201 (e.g., a resolution dependent downsampler), which may provide a downsampled luma plane. The downsampled output of luma plane downsampler 1201 may be provided to Viola Jones face detector 1202, which may detect presence of one or more faces to output detected face rectangle(s) 1211. Detected face rectangle(s) 1211 (e.g., window(s)) may be input to face validator 1206, which may also receive an initial skin probability map 1214 (e.g., which also may be output) as determined by initial skin probability map computer 1207 based on Yrg 4:4:4 frame 1027 and a static skin probability histogram 1212 from previously discussed static skin probability histograms store 1009. As shown, face validator 1206 may provide, as an output, valid face rectangles 1213, which may also be stored as valid face rectangles in previously discussed valid face(s) store 1007.

For example, luma plane downsampler 1201 may be used to downsample an input luma plane according to the resolution thereof. Such resolution dependent downsampling may reduce the processing time of face detection by applying higher downsampling factors for higher resolutions. Furthermore, low resolution sequences may not be downsampled.

Viola Jones face detector 1202 may provide basic face detection capability. It may use a frontal face Haar cascades-based template for detection such as those shown and discussed with respect to FIG. 5B. The output of Viola Jones face detector 1202 may provide a set of rectangular windows within the frame that indicate face areas (or an empty set if no faces were detected). For example, a feature template may contain a cascade of stages and features that are tested for face regions. Each sliding window being tested for face area must pass all features in all stages of the cascade classifier for a face region to be declared. In an embodiment, the frontal face template may contain 22 stages, each having a number of features (e.g., as discussed with respect to FIGS. 7A and 7B). The probe window may be tested in terms of sums of pixels in the rectangle areas of a Haar-like feature, which may be computed quickly from an integral image as discussed with respect to FIG. 5A. The resulting sum may be compared to a feature threshold and it either passes or fails. When all features pass in a stage, a cumulative stage sum then must also pass the corresponding stage threshold. Once all probe windows are tested, the windows that pass may undergo a pruning stage in which isolated windows are removed and strongly overlapping ones are merged into a single representative window that is declared as a detected face region.

Initial skin probability map computer 1207 may be used to create an initial general skin probability map used for two purposes (a) for face area validation (e.g., to reduce false positive results from Viola Jones face detector 1202) and (b) to create weights used in dynamic skin probability histogram generation. Initial skin probability map 1214 may be determined based on static skin probability histogram 1212 (e.g., a predetermined general Static Skin Probability Histogram $H^0_{rg}$) that may have been pre-generated from a large hand segmented skin dataset.

Face validator 1206 may validate the output from Viola Jones face detector 1202. For example, face validator 1206 (e.g., a current stage) may use initial skin probability map 1214 (e.g., from previous stage) to measure the reliability of each face region being validated. For example, a face area may be validated only if the average skin percentage on a per pixel bais (e.g., from the region) exceeds 40%. Otherwise, the face region may be declared invalid and removed from the set of detected faces. Discussion now turns to a more detailed discussion of the components of face detector and validator 1004.

Figure 12B:
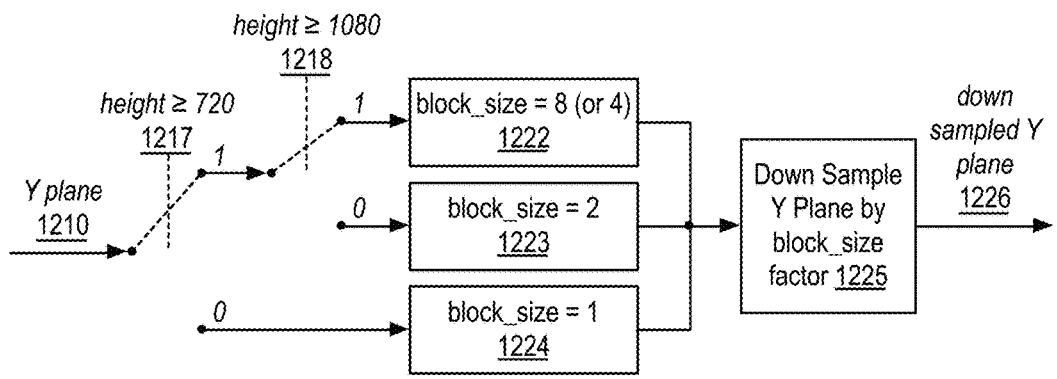
FIG. 12B illustrates an example luma plane downsampler.

FIG. 12B illustrates an example luma plane downsampler 1201, arranged in accordance with at least some implementations of the present disclosure. For example, luma (Y) plane downsampler 1201 may provide a resolution dependent luma plane downsampler. For example, the input luma plane may be subsampled according to its resolution, which may reduce face detection processing time by applying higher downsampling factors to higher resolution content and not downsampling low resolution content. As shown in FIG. 12B, luma plane downsampler 1201 may include a block_size=8 (or 4) module 1222, a block_size=2 module 1223, a block_size=1 module 1224, and a downsample Y plane by block_size factor module 1225.

Luma (Y) plane downsampler 1201 may subsample the input luma plane (e.g., Y plane 1210) responsive to the resolution of the input luma plane. As shown, a resolution of Y plane 1210 may be examined and used to select the downsampling performed (e.g., based on selection of block size for downsampling). For example, if an image/frame height is less than 720 pixels (as controlled by height ≥720 signal 1217 being false or 0), the chosen downsampling factor is 1, as set by block_size=1 module 1224. If the image/frame height is ≥720 but <1080 (as controlled by height ≥720 signal 1217 being true or 1 and height ≥1080 signal 1218 being false or 0), the chosen downsampling factor is 2, as set by block_size=2 module 1223. If the image/frame height is ≥1080 (as controlled by height ≥720 signal 1217 being true or 1 and height ≥1080 signal 1217 being true or 1), the chosen downsampling factor is 8 (or 4), as set by block_size=8 (or 4) module 1222. As shown, the arrangement of two switches (as controlled by height ≥720 signal 1217 and height ≥1080 signal 1218) and the corresponding 3 block_size selection modules 1222, 1223, 1224, allow the aforementioned choice of downsampling factors. As shown, downsample Y plane by block_size factor module 1225 may perform downsampling to generate a downsampled Y plane 1226. Such downsampling may include filtering prior to subsampling or direct subsampling.

Returning to FIG. 12A, the down sampled output of FIG. 12B is used by Viola Jones face detector 1202. For example, image normalizer and integral image calculator 1203 may normalize values of the input luma frame (e.g., downsampled Y plane 1226). First, a histogram may be generated, from which a normalization lookup table may be constructed, which is used to create a normalized luma frame. The normalized frame may have an increased contrast to provide improved detection rates as the Haar features are more distinctive as shown in FIG. 6B. Then, an integral image calculator of image normalizer and integral image calculator 1203 may determine the integral frame of the normalized luma plane. An integral image is an image where each point (x, y) has a value that is equal to the sum of all points bounded by (0, 0), (x, 0), (y, 0) and (x, y). For example, representing the image in integral form may allow for fast feature calculation since by having the image in this form, computing the sum of the pixels in any rectangle in the image may be performed with only 3 additions. With reference to FIG. 5A, the sum of all pixels in rectangle abcd may be accomplished by 3 additions: a−b−c+d.

Classifiers cascade matcher 1204 may move (or slide) a window across the integral image in search of an area that resembles face like features. At each window, classifiers cascade matcher 1204 tests Haar-like features in a cascade manner such that a number of features are tested at each stage of the cascade and, only if all of the stage features pass the threshold test, classifiers cascade matcher 1204 moves to the next stage, otherwise the window is moved and the previous window is not labeled as a face region. The number of stages and features are pre-loaded at start from a feature template. The feature template is pre-generated from a large sample of frontal faces (and the same number of negative faces). Such a template generation process may be referred to as pretraining. To speed up training, a classifier booster may be applied (e.g., Ada-Boost). Once all potential windows that resemble face areas are found, pruning may be applied. Such pruning may remove isolated positives and merge all windows that significantly overlap into one common face region. Example results of such pruning were illustrated in FIG. 7C. A limitation of Viola Jones face detector 1202 is that it only operates on luma (Y) and does not make use of the color information. Such techniques may provide false positives for areas that contain little or no skin tone like colors. Face validator 1206 may remove false positives that do not contain enough skin tone colors. For example, face validator 1206 determines an initial skin probability map and validates detected face rectangles based on the initial skin probability map as discussed below.

Figure 12C:
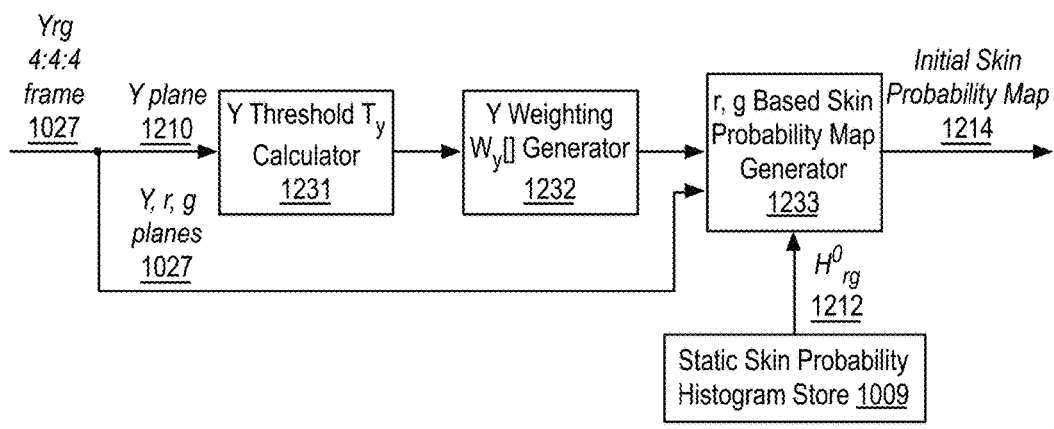
FIG. 12C illustrates an example initial skin probability map computer.

FIG. 12C illustrates an example initial skin probability map computer 1207, arranged in accordance with at least some implementations of the present disclosure. For example, initial skin probability map computer 1207 may be used for generation of skin probability maps in key frames. As shown in FIG. 12C, initial skin probability map computer 1207 may include a luma (Y) threshold ($T_y$) calculator 1231, a luma (Y) weighting ($W_y$[ ]) generator 1232, and an r, g based skin probability map generator 1233.

Also as shown, Y plane 1210 of Yrg 4:4:4 frame 1027 may be input to luma (Y) threshold ($T_y$) calculator 1231, which may generate and output a computed threshold to luma (Y) weighting ($W_y$[ ]) generator 1232. Luma (Y) weighting ($W_y$[ ]) generator 1232 may generate a luma weighting map. The luma weighting map and static skin probability histogram 1212 (e.g., the general static skin probability histogram $H^0_{rg}$ (from storage)) may be input to r, g based skin probability map generator 1233, which may generate initial skin probability map 1214.

Figure 12D:
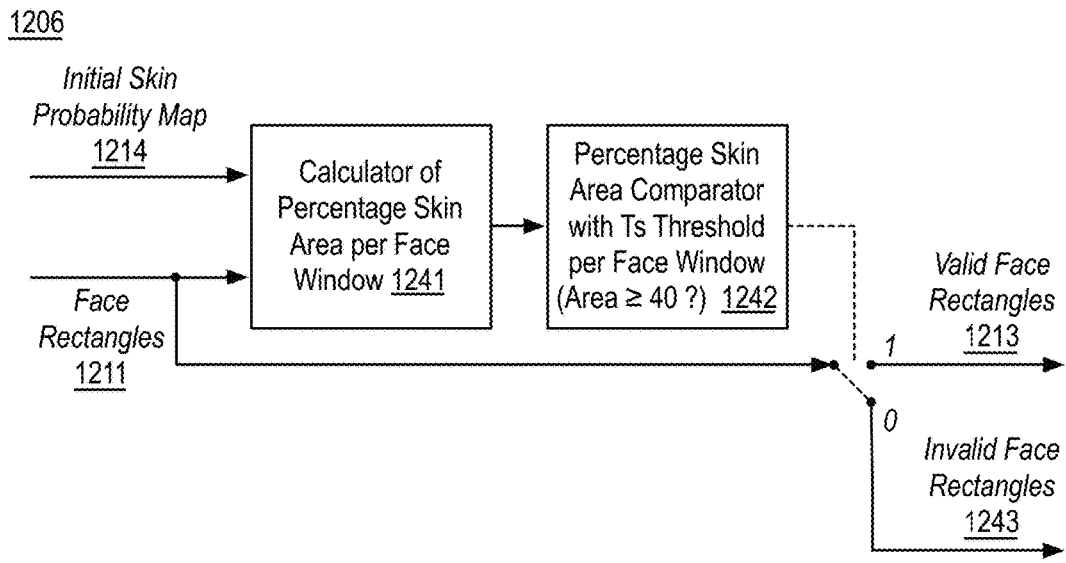
FIG. 12D illustrates an example face validator.

FIG. 12D illustrates an example face validator 1206, arranged in accordance with at least some implementations of the present disclosure. For example, face validator 1206 may validate "raw" face rectangles detected by face detector 1202 based on an initial skin probability map from the previous stage used to measure the reliability of each face area being validated. As shown in FIG. 12D, face validator 1206 may include a calculator of percentage skin area per face window 1241 and a percentage skin area comparator with $T_s$ threshold per face window 1242.

For example, initial skin probability map 1214 and detected face rectangle(s) 1211 may be input to calculator of percentage skin area per face window 1241, the output of which may be provided to percentage skin area comparator with $T_s$ threshold per face window 1242, which outputs a binary signal per face window that indicates if a face rectangle is valid or invalid. Invalid face rectangles 1243 may be discarded and valid face rectangles 1213 may be kept for further processing.

Figure 12E:
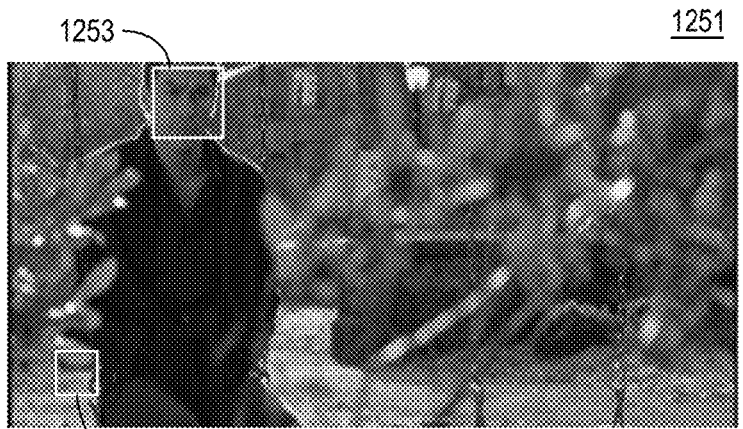
FIG. 12E illustrates example face rectangles of a frame.
Figure 12E:
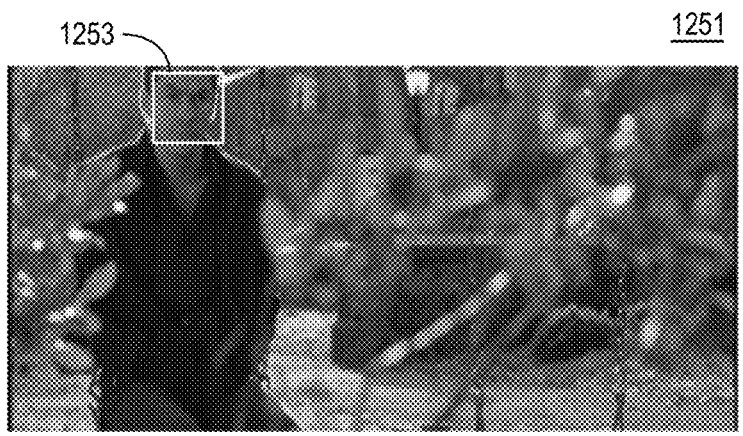

FIG. 12E illustrates example face rectangles 1253, 1254 of a frame 1251, arranged in accordance with at least some implementations of the present disclosure. As shown in FIG.

12E(i), frame 1251 of an outdoor scene from a movie may, after face detection, have associated therewith face rectangles 1253, 1254. Furthermore, with reference to FIG. 12A, face validator 1206 may analyzes both face rectangles 1253, 1254 (e.g., claimed face windows) for presence of skin tones to determine if either are valid. As shown in FIG. 12E(ii), the resultant processing may concludes that face rectangle 1253 has a sufficient skin-tone region to qualify as a valid face window whereas face rectangle 1254 does not include any notable skin tone region and is deemed to be an invalid face window and should be deleted or discarded from the list of valid face windows.

Returning to FIG. 12C, initial skin probability map 1214 may be determined as follows. $T_y$ may be a value [0 . . . 255] for which 30% of all Y values in the frame are smaller (this can be computed from the cumulative Luma histogram. Furthermore, the value of $T_y$ may be clipped to [10 . . . 50] interval. In an embodiment, luma (Y) threshold ($T_y$) calculator 1231 may determine Y threshold $T_y$ subject to the following rules: lo≤$T_y$<hi (e.g., lo=10, hi=50). The reason luma values in the [0 . . . 9] range are not used in the Y histogram is because these values represent very dark areas often not related to scene objects. Furthermore, the value of $T_y$ may be limited to 50. Furthermore, luma threshold $T_y$ may be computed by luma (Y) threshold ($T_y$) calculator 1304 as per the following steps as provided by Pseudocode (2):

Pseudocode (2):

```
Calculate Luma Histogram H_y[0..255]
Initialize Luma threshold T_y = 10 and sum=0
Set threshold thr = 0.3*(w*h - Σ_{i=0}^9 H_y[i])  //30%
   of total number of pixels that have value
   >= 10
while (T_y<50 && sum < thr) {
    sum += H_y[T_y]
    T_y++
}
```

Once $T_y$ is determined by luma (Y) threshold ($T_y$) calculator 1231, it may be used to determine Y weighting function $W_y[x]$ by luma (Y) weighting ($W_y[\ ]$) generator 1232.

For example, weighting function, $W_y[x]$, may be used to enhance a skin probability map. For example, weighting function, $W_y[x]$, may have three states such that when input values are between 0 and a×$T_y$, weighting function, $W_y[x]$, may output a value of zero, when the input value is greater than a×$T_y$ and less than $T_y$, weighting function, $W_y[x]$, may output a linearly adjusted value based on the input, and, when the input value is greater than or equal to $T_y$, weighting function, $W_y[x]$, may output a value of 255. For example, a may be a predetermined multiplier such that a may have any suitable value. In an embodiment, a may have a value of ⅞.

For example, weighting function, $W_y[x]$, may be expressed by the following relationship as provided by Equation (11):

$$W_y(x) = \begin{cases} 0, & x \leq \lfloor a \times T_y \rfloor \\ (x - \lfloor a \times T_y \rfloor) \times \lfloor \frac{255}{T_y - \lfloor a \times T_y \rfloor} \rfloor, & \lfloor a \times T_y \rfloor < x < T_y \\ 255, & x \geq T_y \end{cases} \quad (11)$$

Given the input Yrg frame (e.g., Yrg frame 1027), the following may be used by r, g based skin probability map generator 1306 to compute initial pixel-accurate skin probability map 1307 as provided by Equation (12):

$$\text{SkinProb}[i] = H^0_{rg}[r_i][g_i] \times W_y[Y_i]/255 \quad (12)$$

where $H^0_{rg}[y][x]$ is the static skin probability histogram value corresponding to index (x, y), $W_y(x)$ is the Luma-based weight value corresponding to index x, Y[x] is pixel x in Y plane of the input Yrg frame, r[x] is pixel x in r plane of the input Yrg frame, and g[x] is pixel x in g plane of the input Yrg frame.

Returning to FIG. 12D, initial skin probability map 1214 may be used to validate detected face rectangles from Viola Jones face detector 1202. For example, a face rectangle may be validated if the average skin percentage per pixel from the face area bounded by the rectangle exceeds 40%. Otherwise, the face rectangle may be declared invalid and removed from the set of detected faces.

Figure 13A:
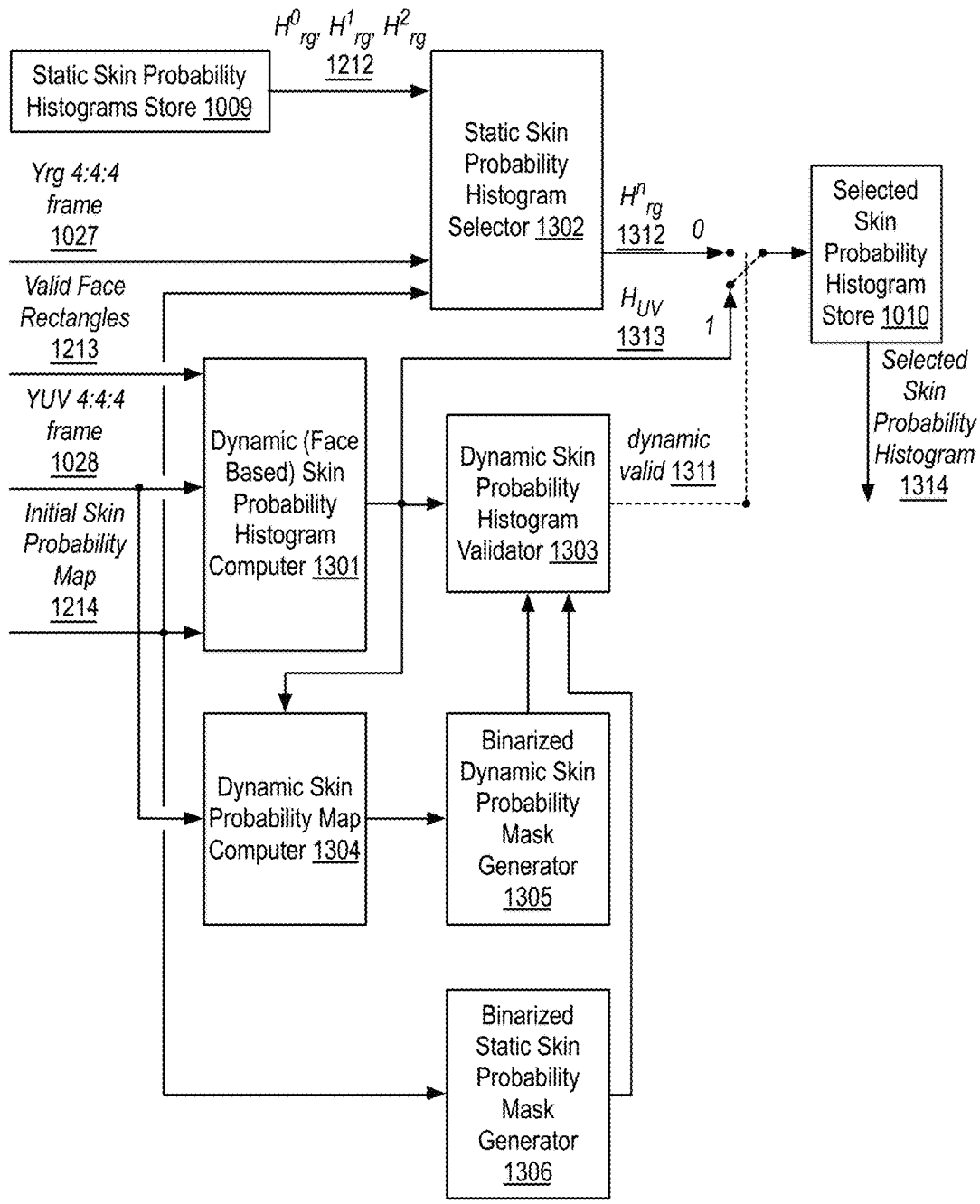
FIG. 13A illustrates an example skin probability histogram computer and selector.

FIG. 13A illustrates an example skin probability histogram computer and selector 1005, arranged in accordance with at least some implementations of the present disclosure. For example, skin probability histogram computer and selector 1005 may determine the best skin probability histogram for a given scene. Initially, skin probability histogram computer and selector 1005 may attempt to dynamically create a skin probability histogram using detected facial areas. As shown, skin probability histogram computer and selector 1005 may include a dynamic skin probability histogram computer 1301, a static skin probability histogram selector 1302, a dynamic skin probability histogram validator 1303, a dynamic skin probability map computer 1304, a binarized dynamic skin probability mask generator 1305, and a binarized static skin probability mask generator 1306.

Also as shown, multiple static skin probability histograms 1212 (e.g., three in the example of FIG. 13A including a first for normal illumination ($H^0_{rg}$), a second for red/orange/yellow illumination ($H^1_{rg}$), and a third for green/blue illumination ($H^2_{rg}$)) determined and saved in the training phase and saved are input from previously discussed static skin probability histograms store 1009 to static skin probability histogram selector 1302. Also input static skin probability histogram selector 1302 are Yrg 4:4:4 frame 1027 and initial skin probability map 1214. Static skin probability histogram selector 1302 may analyze the input histograms (e.g., static skin probability histograms 1212), Yrg frames (e.g., Yrg 4:4:4 frame 1027), and probability map (e.g., initial skin probability map 1214) to select a best static histogram ($H^n_{rg}$) 1312 that, as shown, provides an input to a switch under control of a signal dynamic valid 1303.

Furthermore, optionally in parallel, initial skin probability map 1214, Yrg 4:4:4 frames 1027, and valid face rectangles 1213 are input to dynamic skin probability histogram computer 1301 (e.g., a face based dynamic skin probability histogram computer) that may determine a dynamic skin probability histogram ($H_{UV}$) 1313 that, as shown, provides the second input to the switch under control of a signal dynamic valid 1303. Also, optionally in parallel, initial skin probability map 1214 and the dynamic skin probability histogram from dynamic skin probability histogram computer 1301 are input to dynamic skin probability map computer 1304 that may determine a dynamic skin probability map and provide it, for binarizing, to binarized dynamic skin probability mask generator 1305. Binarized dynamic skin probability mask generator 1305 may generate a binarized dynamic skin probability mask based on the received dynamic skin probability map. In addition, optionally in parallel, initial skin probability map 1214 may be binarized by binarized static skin probability mask generator 1306. As shown, dynamic skin probability histogram validator 1303 may receive as input the dynamic skin probability histogram from dynamic skin probability histogram computer 1301, the binarized dynamic skin probability mask from binarized dynamic skin probability mask generator 1305, and the binarized static skin probability mask from binarized static skin probability mask generator 1306 and dynamic skin probability histogram validator 1303 may generate and output a selection signal dynamic valid 1311 that provides for a selection of the optimal histogram from of static histogram ($H''_{rg}$) 1312 and dynamic skin probability histogram ($H_{UV}$) 1313 that is stored in previously discussed selected skin probability histogram store 1010 and output as selected skin probability histogram 1314.

Figure 13B:
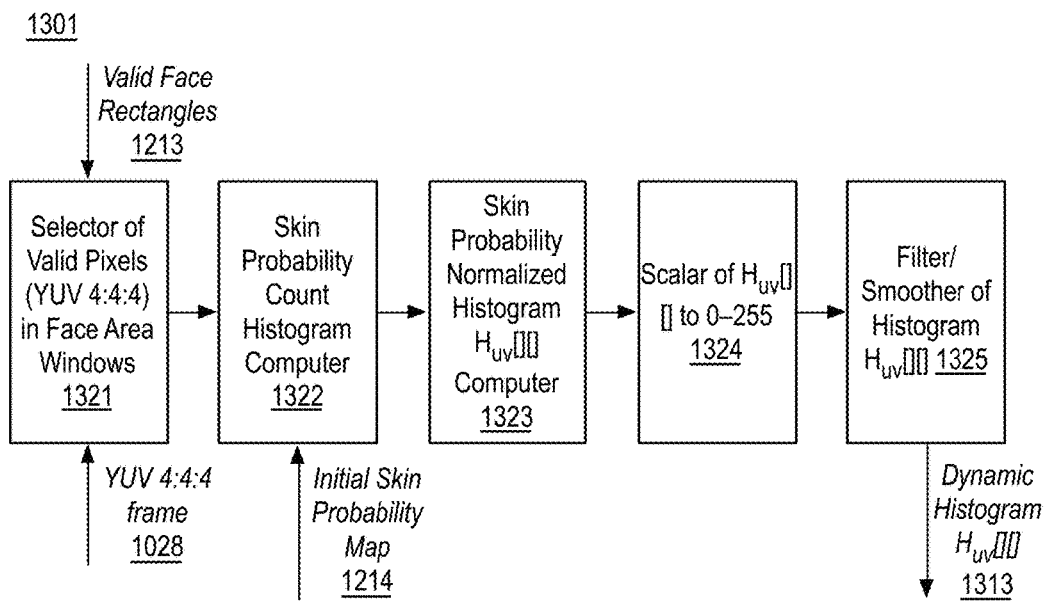
FIG. 13B illustrates an example dynamic skin probability histogram computer.

FIG. 13B illustrates an example dynamic skin probability histogram computer 1301, arranged in accordance with at least some implementations of the present disclosure. As shown, dynamic skin probability histogram computer 1301 may include a selector of valid pixels 1321, a skin probability count histogram computer 1322, a skin probability normalized histogram $H_{UV}[\ ][\ ]$ computer 1323, a scaler 1324, and a filter/smoother of histogram $H_{UV}[\ ][\ ]$ 1325.

Also as shown, selector of valid pixels 1321 (e.g., a selector of valid pixels in YUV 4:4:4 frame in face regions or area windows) may receive valid face rectangles and YUV 4:4:4 frame 1028. Selector of valid pixels 1321 may determine and output selected valid pixels for use by skin probability count histogram computer 1322, which may determine a skin probability count histogram. The skin probability count histogram may be provided to skin probability normalized histogram $H_{UV}[\ ][\ ]$ computer 1323, which may receive and normalize the skin probability count histogram to provide a normalized skin probability count histogram. The normalized skin probability count histogram may be provided to scaler 1324 (e.g., scaler of $H_{UV}[\ ][\ ]$ to 0-255), which may scale the normalized skin probability count histogram to produce a scaled histogram with values in the 0-255 range. As shown, the scaled histogram may be filtered by filter/smoother of histogram $H_{UV}[\ ][\ ]$ 1325, which may filter and/or smooth the scaled histogram and output dynamic skin probability histogram ($H_{UV}$) 1313.

Discussion now turns to a description of the components and operations performed by skin probability histogram computer and selector 1005. Returning to FIG. 13A, dynamic skin probability histogram computer 1301 (e.g., a face based dynamic skin probability histogram computer) may determine a dynamic face based skin probability histogram $H_{UV}$ (e.g., dynamic skin probability histogram ($H_{UV}$) 1313) based on validated face areas (e.g., valid face rectangles 1213). For example, the histogram may be initialized to zero and then weighted U and V planes of each pixel from the validated face areas may be collected into it. As discussed, the U and V planes used in this process are the U and V planes from the YUV 4:4:4 frame (e.g., YUV 4:4:4 frame 1028). The values from the initial skin probability map (e.g., from stage 1) may be used as weights for each pixel count in the histogram.

Dynamic skin probability histogram validator 1303 (e.g., a dynamic face based skin probability histogram validator) may be used to validate dynamic skin probability histogram 1313. For example, dynamic skin probability histogram validator 1303 may use statistics (e.g., two statistical measurements) to measure stability of the resulting probability map. For example the statistical measurements may include measurement $P_1$ as the percentage of the strong skin probability (e.g., over 30%) within the faces regions (e.g., valid face rectangles 1213) and measurement $P_2$ as the percentage of strong skin probability in the block accurate frame (e.g., YUV 4:4:4 frame 1028). $P_1$ and $P_2$ may be compared to the corresponding statistics of the general static probability histogram $S_1$ and $S_2$. If $(S_1-P_1)-3\times(S_2-P_2) \leq 0$, the face based histogram (e.g., dynamic skin probability histogram 1313) is validated (e.g., dynamic valid 1311 is true or 1). Otherwise, the face based histogram (e.g., dynamic skin probability histogram 1313) is determined to be unreliable or invalid and a flag is set (e.g., dynamic valid 1311 is false or 0) that provided for use of a static look up table selector (e.g., as discussed below). A validated face based histogram (e.g., dynamic skin probability histogram 1313) may be further checked for shape complexity with respect to the static histogram (e.g., static histogram 1312). The two probability maps (e.g., static and dynamic) may be binarized based on a threshold (e.g., 30). A size of the difference map, SZD, may be determined based on a number of different pixels. Furthermore, a shape complexity measure, SHC, of the binary mask may be determined as follows: (total number of vertical and horizontal transitions from 0 to 1 within the mask)/(mask width+mask height). For example, the valid face based histogram (e.g., dynamic skin probability histogram 1313) may then be invalidated if SHC>1.5 and SZD<20% of the mask. Although discussed with respect to invalidation thresholds of 1.5 and 20%, any suitable thresholds may be used.

With continued reference to FIG. 13A, static skin probability histogram selector 1302 may select one of multiple static skin probability histograms 1212 (e.g., the static skin probability histograms—$H^0_{rg}$, $H^1_{rg}$, or $H^2_{rg}$—as discussed). If the dynamic histogram (e.g., dynamic skin probability histogram 1313) was not validated as discussed (e.g., in a previous stage), then a static histogram is be selected. As discussed, the multiple static skin probability histograms 1212 may include three offline generated static histograms: a general purpose histogram, $H^0_{rg}$, generated from a large number of hand segmented skin areas from scenes with normal light conditions and specific histograms, $H^1_{rg}$ and $H^2_{rg}$, generated from hand segmented skin areas captured at different types of sun light such as red/orange/yellow and blue/green illuminations. Such color histograms may be collected using a large sample of skin colors of various illuminations applied to different human races. Also, the static histograms may be collected within the Yrg color space and only the r and g components may be used resulting in 2-dimensional histograms. For example, the histograms may have a of size 256×256 with probability values normalized to a 0-255 integer range and smoothed with a 7×7 averaging filter (e.g., with a radius 3 around each pixel). Please refer to FIGS. 9B, 9C, and 9D for a depiction of example static histograms and to FIG. 9E for an example of histogram smoothing.

Static skin probability histogram selector 1302 may measure several statistics or statistical measurements that may be used to determine which of multiple static skin probability histograms 1212 histograms is the most suitable for the given scene as follows. For example, a map significance score may be determined that measures the sum of significant skin pixels (e.g., pixels whose probability of being skin is over 40%).

Furthermore, a map spread may be determined that measures how fragmented a resulting skin mask is. For example, the map spread measure may be from 0 to 32, where 32 is a highest spread (e.g., typically an unreliable mask), mid values indicate a normal spread (e.g., reliable mask), and 0 indicates an empty mask. The map spread may be computed as follows. First, the probe skin probability mask, may be divided to 16×16 areas. Then, an average probability in each of 256 areas may be computed and binarized resulting in a 16×16 mask with 0 values assigned to areas with a majority of low probabilities and 1 values assigned to areas with a majority of high probabilities (e.g., using a threshold of about 6.25%). Then, the map spread may count how many lines of 16×16 areas contain all 1s. Thus, if all lines horizontally and vertically have all 1s, the value is 32. Such a measurement may indicate the strong skin probability is spread in each part of the frame, which is not typical, and likely means that the skin probability histogram in question is marking the background area as skin (e.g., such a very high map spread is not a sign of a reliable skin probability histogram for the given frame). Furthermore, a map spread of 0 also indicates an unreliable skin probability histogram since no area in the frame has strong skin probability. As discussed further herein, the map spread statistic measurement may be used with other measurements to determine which static skin probability histogram is the most suitable for the current scene.

Lastly, a map solidity may be determined that searches for a solid 2D area of strong probabilities. For example, if a mask is created that has no solid areas (e.g., such as faces and patches of skin) but instead has a salt and pepper type of noise, the map solidity flag is set to 0. If a mask contains at least one 3×3 solid patch of skin (e.g., in the 16×16 binary representation mask), the map solidity solidity is set to 1.

The discussed three statistics (e.g., map score=Msc, map spread=Msp, and map solidity=Mso) may be used to select the most reliable static skin probability histogram to be used for the current scene in the skin probability computation step. For example, if Mso flag is off or 0, the corresponding histogram is excluded from the selection. Also, if Msp is too large, the corresponding histogram is excluded from the selection (e.g., the thresholds may be set to 30 for general histogram $H^0_{rg}$ and 24 for specific histograms $H^1_{rg}$ and $H^2_{rg}$). If the discussed conditions are satisfied then the histogram having the largest Msc selected. If no histogram passes the above criteria, static skin probability histogram selector 1302 may default to the normal illumination histogram, $H^0_{rg}$.

Figure 13C:
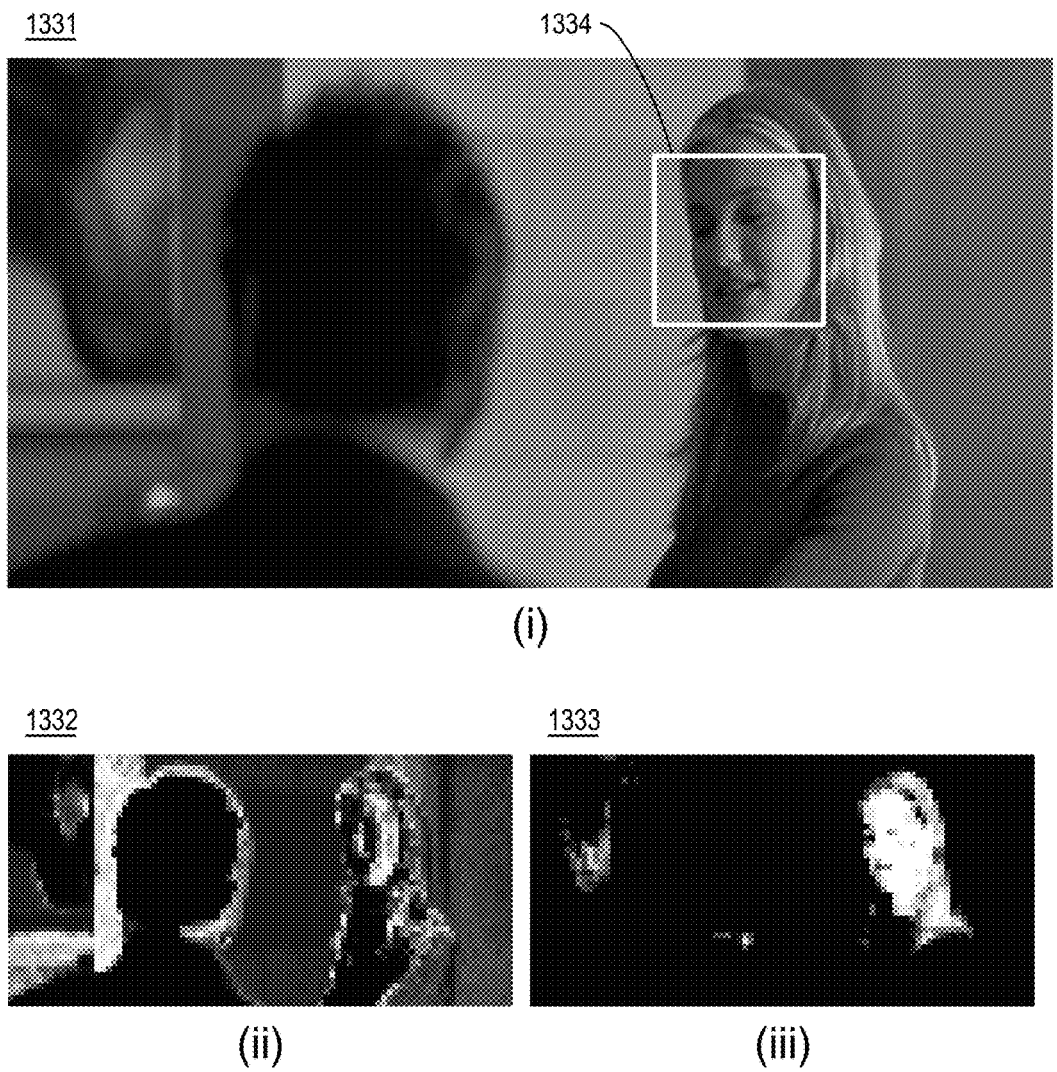
FIG. 13C illustrates example advantages of using a face based dynamic skin probability histogram map.

FIG. 13C illustrates example advantages of using a face based dynamic skin probability histogram map, arranged in accordance with at least some implementations of the present disclosure. As shown in FIG. 13C(i) with respect to frame 1331, face detection and validation may be used to obtain a valid face rectangle 1334. A dynamic histogram (not shown) may be determined and used to generate a skin probability mask 1333 as shown in FIG. 13C(iii). Furthermore, a skin probability map 1332 generated based on the best static skin probability histogram is illustrated in FIG. 13C(ii). As shown, after applying the dynamic skin probability histogram, the skin probability map is visibly improved as non skin regions have been removed and skin regions are more accurate.

Figure 14A:
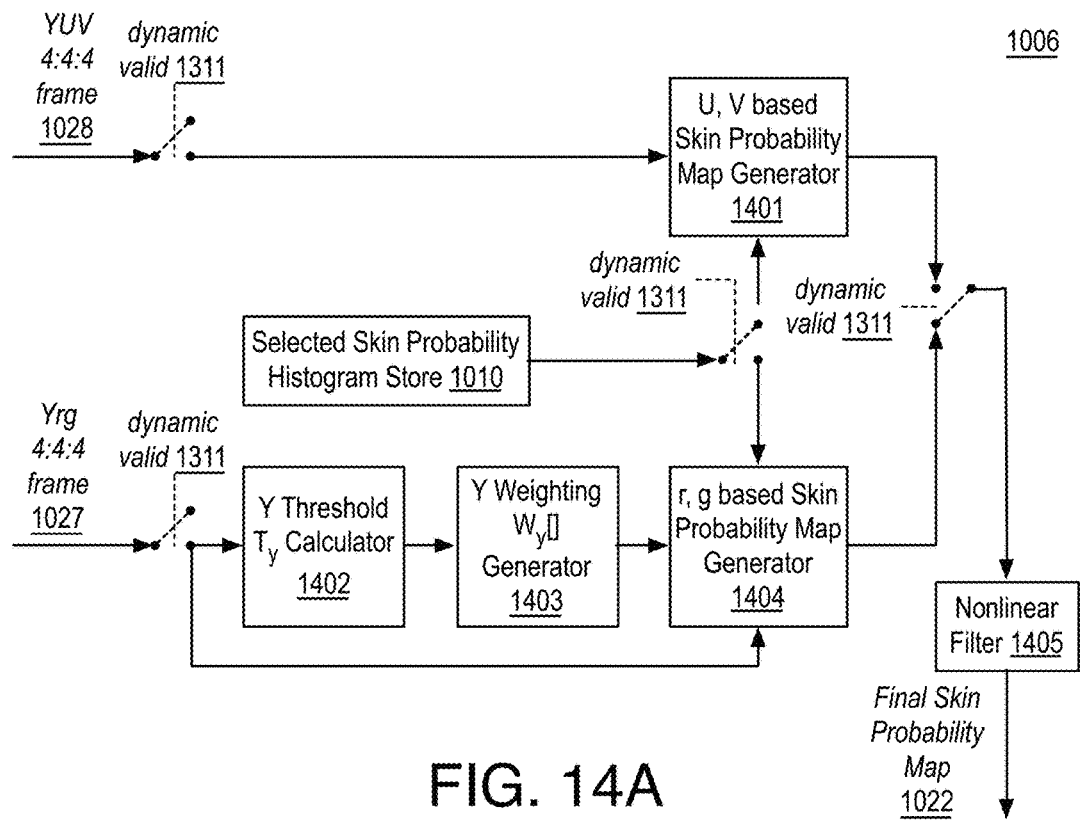
FIG. 14A illustrates an example skin probability map computer.

FIG. 14A illustrates an example skin probability map computer 1006, arranged in accordance with at least some implementations of the present disclosure. For example, skin probability map computer 1006 may determine the skin probability map for a current frame from the selected skin probability histogram. For example, details of the operation of skin probability map computer 1006 depend on whether a static or dynamic histogram was previously selected. As shown, skin probability map computer 1006 may include a U,V based skin probability map generator 1401, a Y threshold $T_y$ calculator 1402, a Y weighting map $W_y$[ ] generator 1403, an r,g based skin probability map generator 1404, and a nonlinear filter 1405.

Also as shown, skin probability map computer 1006 may receive both YUV4:4:4 frame 1028 and Yrg 4:4:4 frame 1027 and skin probability map computer 1006 may receive or access the contents of selected skin probability histogram store 1010 that, as previously discussed, may contain a predetermined histogram. Furthermore, skin probability map computer 1006 may receive or access control signal dynamic valid 1311 that indicates the type (e.g., dynamic or static) of the histogram stored in selected skin probability histogram store 1010.

For example, if dynamic valid 1311 is true or 1, YUV 4:4:4 frame 1028 is input to U,V based skin probability map generator 1401 that, for each pixel indexed by i, uses the values of $U_i$, $V_i$ to lookup values stored in the $H_{uv}$[ ][ ] histogram (e.g., dynamic skin probability histogram 1313) in selected skin probability histogram store 1010 to generate a skin probability map.

If dynamic valid 1311 is false or 0, Yrg 4:4:4 frame 1027 (e.g., the Y plane of Yrg 4:4:4 frame 1027) is input to Y threshold $T_y$ calculator 1402 that may generate and output a Y threshold, $T_y$. As shown, the Y threshold may be provided to Y weighting map $W_y$[ ] generator 1403, which may generate a Y weighting map, $W_y$[ ]. As shown, the Y weighting map from Y weighting map $W_y$[ ] generator 1403 and Yrg 4:4:4 frame 1027 are input to r,g based skin probability map generator 1404 that, for each pixel indexed by i, uses the values of $r_i$, $g_i$ to lookup values stored in the $H_{rg}$[ ][ ] (e.g., static histogram 1312) and weight them by $W_y$[ ]/255 to generate a skin probability map.

As shown, the skin probability map that is output from skin probability map computer 1006 depends on the value of dynamic valid 1311. When dynamic valid 1311 is true or 1, the skin probability map from skin probability map generator 1401 is provided to a nonlinear filter 1405 and, when the value of dynamic valid 1311 is false or 0, the skin probability map from r,g based skin probability map generator 1404 is provided to a nonlinear filter 1405. In either event, the skin probability map may be filtered by nonlinear filter 1405 to generate final skin probability map 1022. Discussion now turns to a more detailed description of the operations performed by skin probability map computer 1006.

In the case of use of a dynamic skin probability histogram, skin probability map computer 1006 uses YUV 4:4:4 frame 1028 as input and determines a skin probability map via U,V based skin probability map generator 1401. Such a skin probability map may determined as shown in Equation (13):

$$\text{skin\_prob\_map}[i]=H_{UV}[U[i]][V[i]] \quad (13)$$

where $H_{UV}$[y][x] provides dynamic skin probability histogram value corresponding to index (x, y), U[x] is a pixel x in U plane of the input YUV frame, and V[x] is a pixel x in V plane of the input YUV frame.

In cases where a static skin probability histogram ($H''_{rg}$) was selected, skin probability map computer 1006 uses Yrg 4:4:4 frame 1027 as input and determines a skin probability map as follows. First, an adaptive set of weights $W_y$ may be generated based on a Luma (Y) plane of Yrg 4:4:4 frame 1027. To generate the $W_y$ map, a threshold (e.g., referred to as $T_y$) may be determined using the following rules: $T_y$ is the value [0 . . . 255] for which 30% of all Y values in the frame are smaller (this can be computed from the cumulative Luma histogram). Furthermore, the value of $T_y$ is clipped to [10 . . . 50] interval. Once $T_y$ is determined, the map $W_y$ may be defined as discussed above with respect to Equation (11)

with selected static skin probability histogram ($H''_{rg}$) replacing histogram $H^0_{rg}$ (please refer also to FIG. 12D). Finally, Equation (12) may be used to determine the skin probability map as discussed above.

After the skin probability map is determined, nonlinear filtering may be applied by nonlinear filter 1405 to reduce errors. For example, 5×5 median like filter may be used to reduce visible noise in the skin probability map and to solidify the skin segments. For example, at each pixel, nonlinear filter 1405 may first determine the average of the pixels in a 5×5 window surrounding the current pixel and then nonlinear filter 1405 may select the pixel value from the values within the window closest to the average.

Figure 14B:
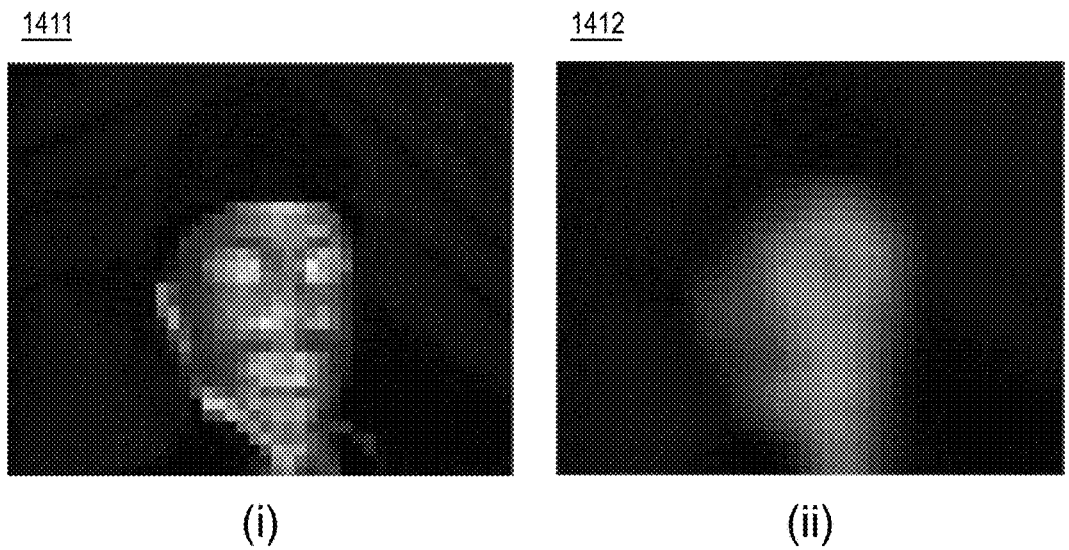
FIG. 14B illustrates example results of applying a non-linear filtering to a skin probability map.

FIG. 14B illustrates example results of applying a non-linear filtering to a skin probability map, arranged in accordance with at least some implementations of the present disclosure. As illustrated in FIG. 14B(i), a skin probability map 1411 may be filtered to generate a filtered or final skin probability map 1412 illustrated in FIG. 14B(ii)

With reference to FIG. 10, discussion now turns to detailed descriptions of motion cue computer 1012, skin probability map and motion cue combiner 1013, skin segments and border refiner 1014, and face tracker 1008.

Figure 15A:
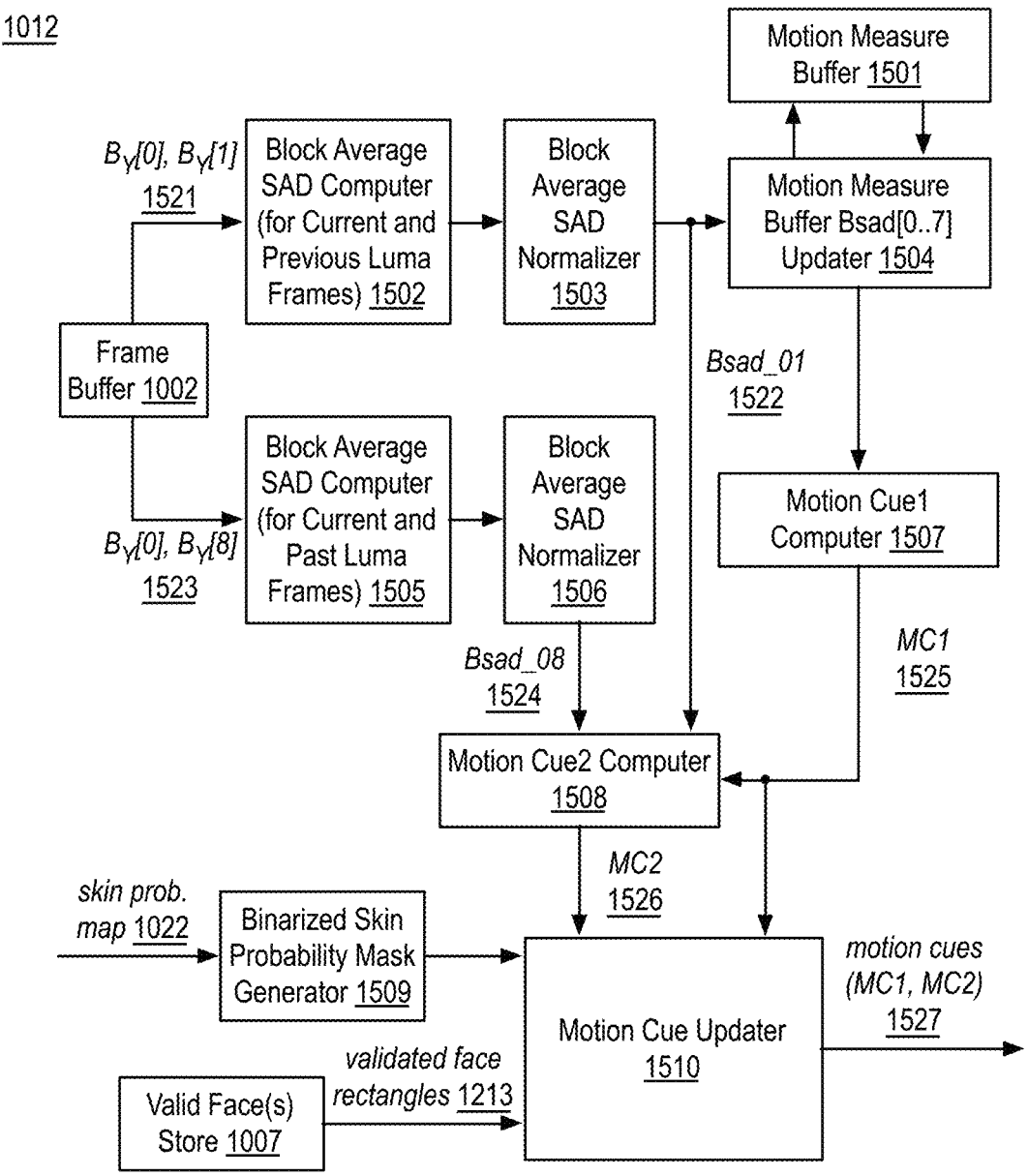
FIG. 15A illustrates an example motion cue computer.

FIG. 15A illustrates an example motion cue computer 1012, arranged in accordance with at least some implementations of the present disclosure. For example, motion cue computer 1012 may determine motion measures (e.g., SAD based motion measures), provide motion measure buffer updates, and provide motion cues (e.g., using computed motion measures and buffered motion data). As shown, motion cue computer 1012 may include a motion measure buffer 1501, a block average SAD computer 1502, a block average SAD normalizer 1503, a motion measure buffer updater 1504, a block average SAD computer 1505, block average SAD normalizer 1506, a motion cue1 computer 1507, a motion cue2 computer 1508, a binarized skin probability mask generator 1509, and a motion cue updater 1510.

Also as shown, motion cue computer 1012 may receive, as input, validated face rectangles 1213 from previously discussed valid face(s) store 1007, skin probability map 1022 that may be used to generate a binarized skin probability map by binarized skin probability mask generator 1509, and contents of a previously discussed frame buffer 1002 that may be used to calculate block based SADs that may be normalized and used in calculation of motion cue1 (MC1) 1507 and motion cue2 (MC2) by the motion cue1 computer 1507 and motion cue2 computer 1508, respectively. Furthermore, determination of motion cue1 may require use of motion measure buffer 1501 that is updated by motion measure buffer updater 1504. As shown, final motion cues 1527 are available at the output of motion cue updater 1510.

Discussion now turns to the detailed operation of motion cue computer 1012 as will be described as a set of processing operations in the specified order. For each new frame, block based SAD computations are performed between the new (e.g., current) frame and two other frames: the first frame and the last frame of the frame buffer stack. Differences between the frames (e.g., block based SAD) provide for the determination or detection of fast and slow motion for the current frame. Block based motion estimation is not used due to complexity reasons. For example, the block SAD frame may be determined by computing the average block SAD of each block. The block size may be any suitable size such as 8.

For example, block average SAD computer 1502 may receive the current frame ($B_Y[0]$) and the immediately previous frame ($B_Y[1]$) and determine a block based SAD frame. Similarly, block average SAD computer 1505 may receive the current frame ($B_Y[0]$) and a past previous frame (such as 8 frames previous: $B_Y[8]$) and determine a block based SAD frame. Furthermore, the SAD blocks values may be normalized and kept in a block SAD buffer (not shown). For example, the SAD blocks between the current frame and the immediately previous frame may be normalized by block average SAD normalizer 1503 and the SAD blocks between the current frame and the past previous frame may be normalized by block average SAD normalizer 1506 as follows in Equation (14):

$$B\text{sad}[i]=\min(8\times A\text{sad}[i],255) \quad (14)$$

where Asad[i] is the block average SAD for the i-th block and Bsad[i] is the normalized block average SAD for the i-th block.

Using such techniques, two block SAD (Bsad) maps are obtained: (1) Bsad_01 1522, the block based SAD map between the current frame (frame 0 in the frame buffer) and the frame 1 from the frame buffer (e.g., as provided by block average SAD normalizer 1503), and (2) Bsad_08 1524, the block based SAD map between the current frame (frame 0 in the frame buffer) and the frame 8 from the frame buffer (e.g., as provided by block average SAD normalizer 1506).

When Bsad_01 1522 is calculated, it is pushed into motion measure buffer 1501 as the top element in the buffer. For example, motion measure buffer 1501 may use the same stack principles and numeration as frame buffer 1002 and it may contain block accurate SAD frames (e.g., instead of pixel accurate actual Y frames). Furthermore, motion measure buffer 1501 (e.g., containing up to last 8 block SAD frames) may be used in computing motion cues.

Such motion cues may include the following two maps: (1) MC1, the maximal block SAD map during the last 8 frames and (2) MC2, a block SAD map obtained by the mixing of three SAD values for each block: two SAD values of the top frame and a maximal SAD for block.

For example, the MC1 block map may provide a motion intensity determination or estimation. The MC1 block map is determined using the block SAD buffer as follows in Equation (15):

$$MC1[i] = \max_{t \in [0,7]} (B\text{sad}[t][i]) \quad (15)$$

where Bsad[t][i] is the i-th element (block) of the t-th frame from motion measure buffer 1501.

The MC2 map is determined by mixing 3 block SAD maps as follows in Equation (16):

$$MC2[i]=\min(\max(B\text{sad\_}08[i]-MC1[i],0)+2\times B\text{sad\_}01[i],255) \quad (16)$$

where Bsad_08[$i$] is the i-th element (block) of the SAD map between buffer frame 0 and buffer frame 8, Bsad_01[$i$] is the i-th element (block) of the SAD map between buffer frame 0 and buffer frame 1, and MC1[$i$] is the i-th element (block) of the maximal SAD block map.

Once the motion cues (e.g., motion cue1 1525 and motion cue2 1526) are determined, motion cue updater 1510 may be used to enhance the motion cue maps based on validated face rectangles 1213 (e.g., face areas). For example, the motion cues (e.g., MC1 and MC2) may be used to distinguish moving humans in a scene and eliminate static background noise skin like areas, it may be advantageous to mark known face areas as high motion (e.g., even though the faces may be static) to increase the accuracy of the final skin tone map.

Such a motion cue enhancement operation may mark the motion probability masks MC1 and MC2 (e.g., which range from 0 to 255) with a maximal probability value of 255 at all pixels of the face area for which values of the corresponding initial spatial skin probability mask are high (e.g., over 30 or the like). In addition or in the alternative, all pixels that are neighboring the face region to the top and bottom that correspond to values of the initial spatial skin probability mask that are high (e.g., over 30 or the like) may also be assigned maximum probability value in the motion cue masks.

Figure 15B:
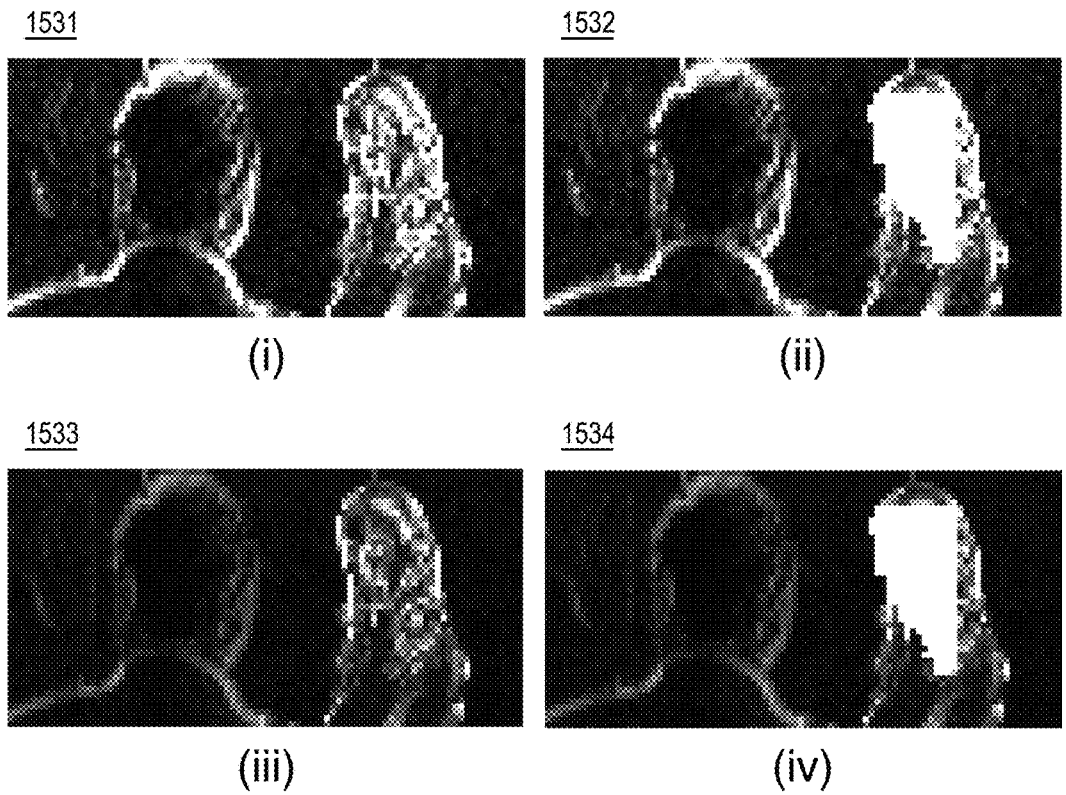
FIG. 15B illustrates example advantages of the motion cue updating process.

FIG. 15B illustrates example advantages of the motion cue updating process, arranged in accordance with at least some implementations of the present disclosure. FIG. 15B(i) illustrates an example MC2 motion cue map 1531 before update, FIG. 15B(ii) illustrates an example MC1 motion cue map 1532 after update (e.g., with pixels of face areas and above and below face areas having high skin likelihoods set to a maximal probability value), FIG. 15B(iii) illustrates an example MC1 motion cue map 1533 before update, and FIG. 15B(iv) illustrates an example MC1 motion cue map 1534 after update (e.g., with pixels of face areas and above and below face areas having high skin likelihoods set to a maximal probability value).

Figure 16A:
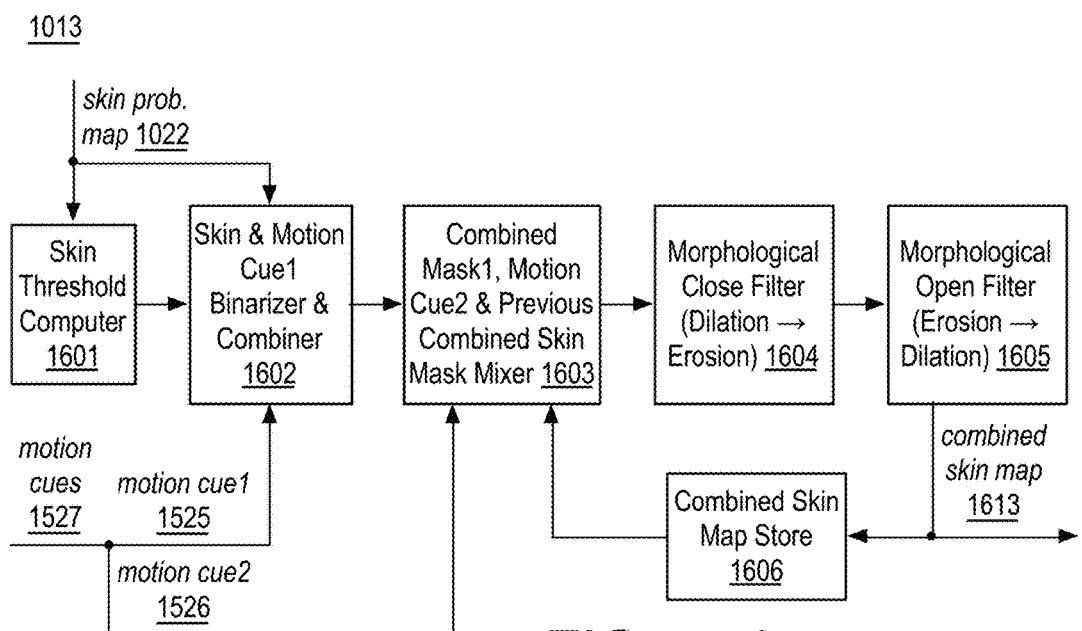
FIG. 16A illustrates an example skin probability map and motion cue combiner.

FIG. 16A illustrates an example skin probability map and motion cue combiner 1013, arranged in accordance with at least some implementations of the present disclosure. For example, skin tone probability and motion cue mixing may merge spatial skin tone information with estimated motion information to refine detection accuracy and create a spatiotemporal skin tone probability map. In addition, post processing may smooth the final mask and drop all segments that are either too small or too sparse to be skin-tone regions. As shown, skin probability map and motion cue combiner 1013 may include a skin threshold computer 1601, a skin and motion cue1 binarizer and combiner 1602, a combined mask1, motion cue2 and previous combined skin mask mixer 1603, a morphological close filter 1604, a morphological open filter 1605, and a combined skin map store 1606.

Also as shown, skin probability map 1022 may be input to skin threshold computer 1601, which may determine a threshold, sTh, and provide it to skin and motion cue1 binarizer and combiner 1602. Skin and motion cue1 binarizer and combiner 1602 may receive threshold, sTh, and motion cue1 1525 (MC1) and skin and motion cue1 binarizer and combiner 1602 may generate a map combining skin probability map 1022 and motion cue1 1525. The output of skin and motion cue1 binarizer and combiner 1602 may be provided, as input, to combined mask1, motion cue2 and previous combined skin mask mixer 1603, which may also receive motion cue2 1526 (MC2). Combined mask1, motion cue2 and previous combined skin mask mixer 1603 may produce a combined mixed output that may undergo two stages of morphological processing. The first stage of processing may be performed by morphological close filter 1604 (e.g., dilation to erosion) and the second stage of processing may be performed by morphological open filter 1605 (e.g., erosion to dilation). A final combined skin map 1613 may be output from skin probability map and motion cue combiner 1013 and saved in combined skin map store 1606 for later use such as feeding it back as an input to combined mask1, motion cue2 and previous combined skin mask mixer 1603.

Discussion now turns to a detailed description of the operations performed by skin probability map and motion cue combiner 1013, which are described via the following processing operations. As discussed, there are three maps available: (1) the skin probability map (e.g., spatial only, skin probability map 1022), SB, and (2) two motion cue masks: motion cue2 1526 (MC2) and motion cue1 1525 (MC1). Before combining these maps, an adaptive skin threshold sTh is first determined by skin threshold computer 1601. For example, skin and motion probability mixing may be done using the following steps: skin probability threshold determination, mixing of two probabilities using corresponding thresholds, temporal smoothing of overall probability map using probability map for previous frame and information obtained at the motion detection step, and value based morphological filtering of obtained probabilities.

The discussed skin probability threshold, sTh, may be determined as a value such that to total size of the frame with less skin probability is about 60% of the total frame size. As discussed the discussed skin probability threshold, sTh, may be determined by 1601. The purpose of threshold, sTh, is not to take into account areas with the smallest skin color probability (e.g., noise). Mixing of probabilities may then be performed as follows in Equations (17), (18), and (19):

$$s = |SBN[i], SB[i] > sTh$$

$$|0, \text{otherwise} \quad (17)$$

$$m = MC2[i] \quad (18)$$

$$MSB[i] = \min(s, m) \quad (19)$$

where SB[i] is the skin probability map of at position i, MC2[i] is the mixed block SAD probability map at position i, sTh is the skin probability threshold, and MSB[i] is the resulting combined motion and skin probability map at position i. For example, when the resulting probability is equal to a minimal probability, moving areas with color different to skin color and motionless background areas with the color of skin tone may be discarded.

Temporal smoothing may be performed for protection from undesirable influence of noise and to increase stability of slow moving regions. For example, previously obtained values of overall probability in areas with slow motion and currently obtained probability for fast moving objects may be used. Such techniques may provide a fast reaction for fast objects and a slow reaction to slow objects (e.g., the weight of slow objects will be increased and decreased slowly preventing temporal flickering of slow objects and enhancing the stability of slow objects while other objects can move faster).

For example, weight smoothing may be provided as shown in Equation (20):

$$MSB[i] = (MSB[i] \times MC1[i] + MSB\_\text{prev}[i] \times (256 - MC1[i]))/256 \quad (20)$$

where, MSB[i] is the combined motion and skin probability map of the current frame in position i, MSB_prev[i] is the combined motion and skin probability map of the previous frame in position i, and MC1[i] is the i-th element of the maximal SAD block map from the motion cue.

In addition, post processing using morphological close and open operations may be applied to the mixed block SAD map to reduce noise.

Figure 16B:
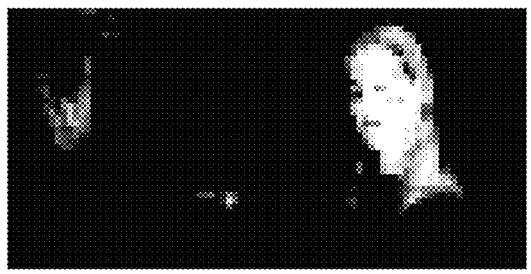
FIG. 16B illustrates an example skin probability map and motion cue combining.
Figure 16B:
Figure 16B:
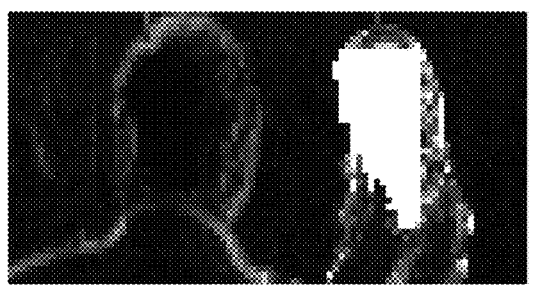
Figure 16B:
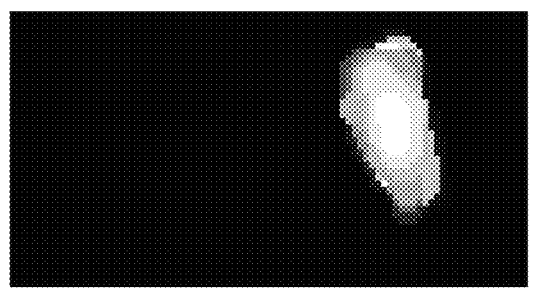

FIG. 16B illustrates an example skin probability map and motion cue combining, arranged in accordance with at least some implementations of the present disclosure. FIG. 16B(i) illustrates an example skin probability map 1621, FIG. 16B(ii) illustrates an example motion cue1 map (MC1) 1622, FIG. 16B(ii) illustrates an example motion cue2 map (MC2) 1623, and FIG. 16B(iv) illustrates an example combined skin probability map 1624.

Figure 17A:
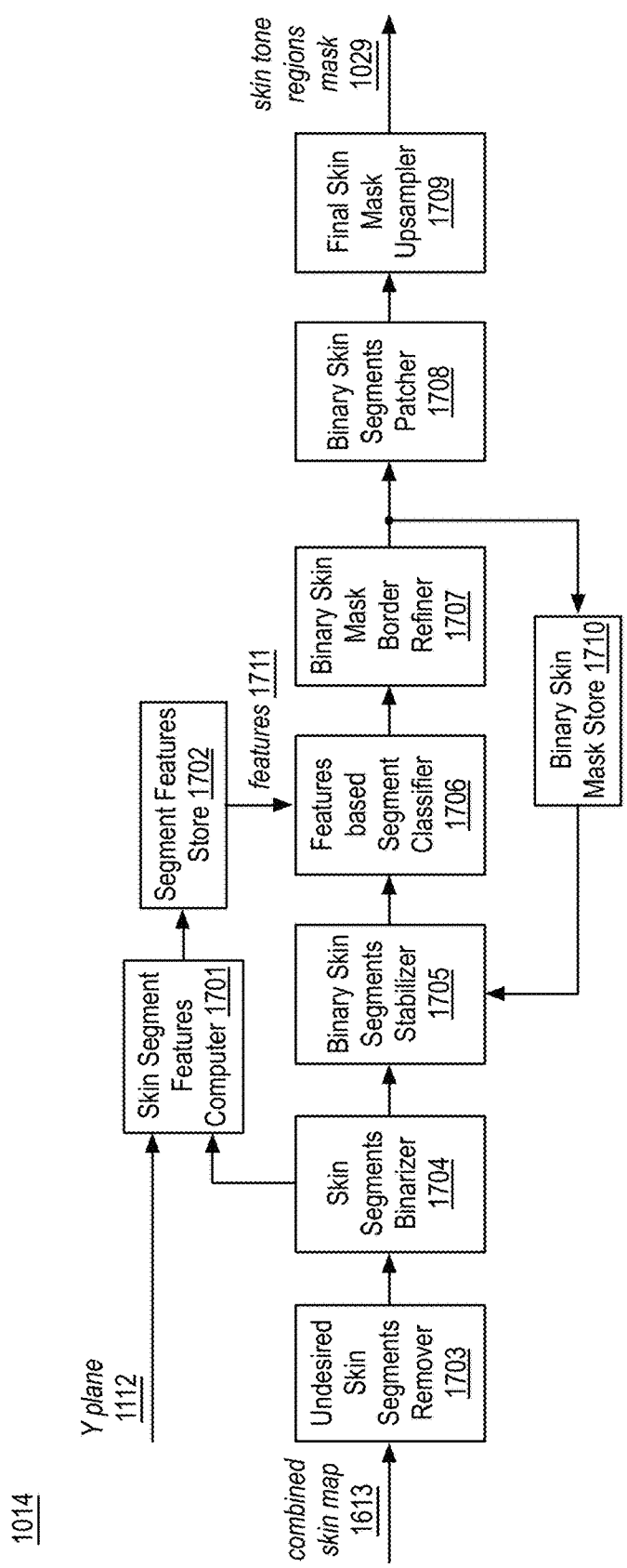
FIG. 17A illustrates an example skin segments and border refiner.

FIG. 17A illustrates an example skin segments and border refiner 1014, arranged in accordance with at least some implementations of the present disclosure. For example, skin segments and border refiner 1014 may allow re-classification of the final skin segments and for fixing the border of the existing skin regions that contain false positive and/or false negative areas. For example, skin segments and border refiner 1014 may use a previous frame's mask and a current skin probability map to reclassify patches that are different from frame to frame. In addition or in the alternative, a set of features may be determined for each skin segment and, based on a decision tree classifier, false positive segments may be refined. For example, skin segments and border refiner 1014 may provide a final mask fix and cleanup before output. As shown, skin segments and border refiner 1014 may include a skin segment features computer 1701, a segment features store 1702, an undesired skin segments remover 1703, a skin segments binarizer 1704, a binary skin segments stabilizer 1705, a features based segment classifier 1706, a binary skin mask border refiner 1707, a binary skin segments patcher 1708, a final skin mask upsampler 1709, and a binary skin mask store 1710.

Also as shown, undesired skin segments remover 1703 and skin segments binarizer 1704 may remove undesired objects (e.g., skin segments) from combined skin map 1613 (e.g., from the frame). For example, undesired skin segments remover 1703 and skin segments binarizer 1704 may use a single criterion to classify undesired objects. The criterion for undesirability may depend on the position of the object position relative to the frame border. For example, areas very close to the frame border are prone to false positives due to motion related changes (e.g., uncovered background, etc.). For example, if the majority of an object body is too close to the frame border, the object is marked as undesired and is removed. For example, undesired skin segments remover 1703 and skin segments binarizer 1704 and perform operations as follows. First, initialize, at block resolution, a frame of the size of the video frame with object's probability centers (e.g., probCenters) representing skin probability weights to be used to weigh object closeness to the frame border.

For example, skin probability weights to weigh an object center to a frame border may include weights close to the frame may being less that those than weights at or near the center of the frame.

Returning to FIG. 17A and discussion of the operation of undesired skin segments remover 1703 and skin segments binarizer 1704, after initializing, at block resolution, a frame of the size of the video frame with object's probability centers (e.g., probCenters) representing skin probability weights to be used to weigh object closeness to the frame border, the following may be performed. For each skin segment S (e.g., object), determine a center of its bounding box, CB, at block resolution. Then, determine an average skin probability of segment S, avgP(s). Next, determine a center weight, w, which is the value of probCenters at point CB. Lastly, if avgP(s)×w is less than 30 (e.g., if the weighted average skin probability of a segment is less than 30% or other suitable threshold), the object set to 0 in the output binary mask (e.g., discarded). Otherwise, the object set to 1 (e.g., the object is kept).

With continued reference to FIG. 17A, skin segment features computer 1701 may determine a set of features for each skin segment that may be used for reclassification (e.g., removing of false positive segments). For example, at the end of classification, each segment is assigned a binary flag indicating whether it is a skin segment (e.g., skin value set to 1) or it is a non skin segment (e.g., skin value set to 0). For example, skin segment features computer 1701 may receive Y plane 1112 of YUV 4:2:0 frame 1021 and valid objects or segments based on processing by undesired skin segments remover 1703 and skin segments binarizer 1704. For each segment in the binary skin mask (e.g., as provided by skin segments binarizer 170), the following features may be determined. First, a segment size (e.g., Size) may be determined that provides a percentage of the frame occupied by the segment (e.g., the value of segment size may be an integer in the range [0,100]). Second, a segment orientation (e.g., Orient) may be determined as a ratio between horizontal and vertical edges of a bounding box of the segment. (e.g., the value of segment orientation may be a floating point number determined by: (bounding box width)/(bounding box height)). Third, an average skin probability (e.g., AvgProb) may be determined as an average probability of skin in the segment rounded to the nearest integer. Fourth, a segment bounding box may be determined as coordinates of the bounding box of a segment. Furthermore, the segment bounding box feature may be kept for all segments in the last 8 frames in segment features store 1702. Furthermore, segment features store 1702 may store a skin value (e.g., a binary flag indicating if segment was classified as a skin-tone segment or not) for last 8 frames.

After such features are determined for a segment, that segment may be tracked using segment features store 1702. If there are segments in previous frames (e.g., up to one in each frame) whose bounding box overlaps with the bounding box of the current segment by more than 50%, then segment tracking is established. Before computing additional features (e.g., texture) having high computation cost, the segment tracking may be used to determine if a segment has been previously always or almost always classified the same. If so, the segment may be classified as in previous frames and no computation of advanced features takes place. For example, such tracking and classification may be performed by binary skin segments stabilizer 1705.

If no segment tracking is available, the segment may be classified using a full decision tree based classifier such that additional (e.g., advanced) features may be determined for the segment. For example, texture features may be determined for segments by skin segment features computer 1701. The texture features may be based on Rs,Cs (e.g., row and column activity averaged over a block) measurement. For example, Rs,Cs may be computed for all 8×8 blocks in the pixel domain which correspond to the segment. RsCs of an 8×8 block may be determined as follows in Equations (21), (22), and (23):

$$Rs = \sum_{i=1}^{7}\sum_{j=1}^{7} \text{abs}(B(i, j) - B(i, j-1)) \quad (21)$$

$$Cs = \sum_{i=1}^{7}\sum_{j=1}^{7} \text{abs}(B(i, j) - B(i-1, j)) \quad (22)$$

$$RsCs = \max(Rs, Cs) \quad (23)$$

where B(x,y) is a pixel accurate block value at location (x,y).

Furthermore, a small histogram (e.g., of size 4) may be determined for all RsCs values of a segment by skin segment features computer 1701 as follows. First, the following counts may be determined: (1) a count of all RsCs values within the segment which are less than 100 or another threshold (e.g., RsCs_H0), (2) a count of all RsCs values within the segment which are less than 400 or another threshold (e.g., RsCs_H1), (3) a count of all RsCs values within the segment which are less than 800 or another threshold (e.g., RsCs_H2), and (4) a count of all RsCs values within the segment which are greater than or equal to 800 (e.g., RsCs_H3). Then, the texture features of a segment may be determined as follows based on the RsCs. A flat blocks of a segment texture feature (e.g., RsCs0) may be determined as a percentage of RsCs_H0 out of segment size. A low texture blocks of a segment texture feature (e.g., RsCs1) may be determined as a percentage of RsCs_H1 out of segment size. A medium texture blocks of a segment texture feature (e.g., RsCs2) may be determined as a percentage of RsCs_H2 out of segment size. And a high texture blocks of a segment texture feature (e.g., RsCs3) may be determined as a percentage of RsCs_H3 out of segment size.

Once such texture features are determined, a segment shape complexity may be determined as a last feature. For example, shape complexity of a segment may use the total number of vertical and horizontal transitions from 0 to 1 within a segment bounding box, SHP. Based on the SHP count, the segment shape complexity feature may be determined as follows. A segment shape complexity feature (e.g., Shape) may be a floating point value obtained by the following ratio: SHP/(bounding box width+bounding box height).

As shown in FIG. 17A, binary skin segments stabilizer 1704 may evaluates a current binary skin mask for stability of segments. For example, binary skin segments stabilizer 1704 may compare the current mask with the mask from a previous frame and determine if there are any sudden large segment differences created. If a segment changes a lot from frame to frame (e.g., a large part of the current object is suddenly removed), binary skin segments stabilizer 1704 may fix the detected instability by filling the suddenly deleted portion of object.

Feature based segment classifier 1706 (e.g., a decision tree classifier) may use the previously computed segment features to classify segments in the current frame as skin tone or not. If the advanced or additional features (e.g., texture features) were not computed for a segment, feature based segment classifier 1706 may be skipped as the skin tone flag is already set for that segment. However, if the flag is not yet set decision tree implemented by feature based segment classifier 1706 may be is implemented such that the decision tree takes all features (e.g., basic and advanced) and performs a decision tree classification using a priori preset decision tree. For example the decision tree may be determined in pretraining using a large number of training blobs (e.g., segments). The output of feature based segment classifier 1706 is either true or 1 (e.g., the segment is a skin tone segment) or false or 0 (e.g., the segment is not skin tone such that the segment was a false positive blob). If the output is true, the segment is kept and if the output is false, the segment is deleted from the skin-tone mask.

Figure 17B:
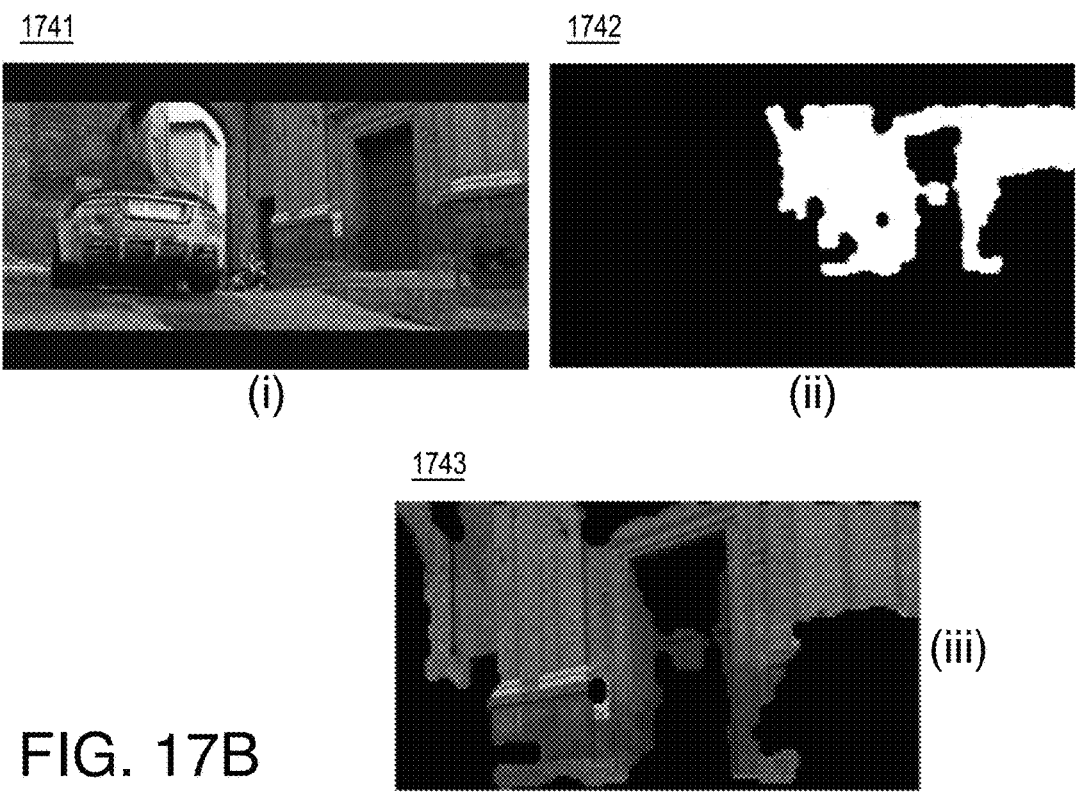
FIG. 17B illustrates example feature based classification of segments.

FIG. 17B illustrates example feature based classification of segments, arranged in accordance with at least some implementations of the present disclosure. FIG. 17B(i) illustrates an example original frame 1741, FIG. 17B(ii) illustrates an example skin mask 1742 (e.g., with false positives), and FIG. 17B(iii) illustrates an example extracted segment 1743 (e.g., with false positives). Using the discussed techniques, extracted segment 1743 may be classified as a false skin segment and removed. For example, the features for extracted segment may be as follows: Size=23, Orient=1.86, AvgSkin=94, RsCs0=28, RsCs1=68, RsCs2=3, RsCs3=0, Shape=1.64, Skin Probability=0. In this example, segment 1743 is correctly classified as 0 (e.g., false) and deleted from the final skin tone mask.

FIG. 17C illustrates example feature based classification of segments, arranged in accordance with at least some implementations of the present disclosure. FIG. 17C(i) illustrates an example original frame 1751, FIG. 17C(ii) illustrates an example skin mask, and FIG. 17C(iii) illustrates an example extracted segment 1753. Using the discussed techniques, extracted segment 1753 may be classified as a true skin segment and kept. For example, the features for extracted segment may be as follows: Size=22, Orient=0.72, AvgSkin=88, RsCs0=20, RsCs1=61, RsCs2=15, RsCs3=2, Shape=0.65, Skin Probability=1. In this example, segment 1753 is correctly classified as 1 (e.g., true) and kept in the final skin tone mask.

Returning to FIG. 17A, binary skin mask border refiner 1707 may perform refinement (e.g., cleanup) of bordering areas of skin segments. For example, binary skin mask border refiner 1707 may scan the block accurate binary skin mask and, if a previous value and a next value (e.g., relative to a current value) are equal, binary skin mask border refiner 1707 may set the current value to the previous/next value. In an embodiment, binary skin mask border refiner 1707 may first scan the mask horizontally and then vertically. The resultant binary skin mask may be stored in binary skin mask store 1710.

Figure 17D:
FIG. 17D illustrates example binary skin mask border refinement.
Figure 17D:
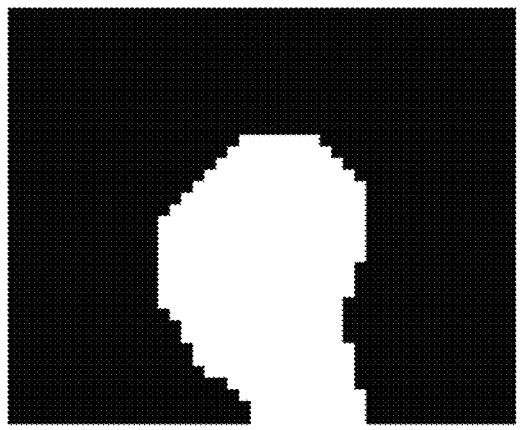
Figure 17D:
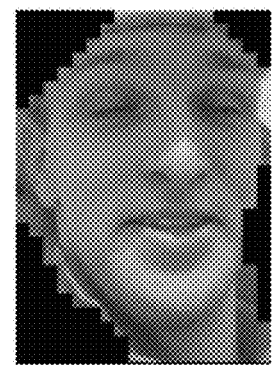
Figure 17D:
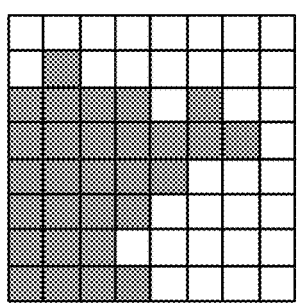
Figure 17D:
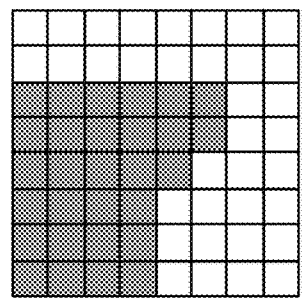

FIG. 17D illustrates example binary skin mask border refinement, arranged in accordance with at least some implementations of the present disclosure. FIG. 17D(i) illustrates an example binary mask 1761 before refinement and FIG. 17D(ii) illustrates an example binary mask 1762 after refinement. As shown, binary mask 1762 may be refined with respect to binary mask 1761 such that isolated edge or internal values are matched to adjacent values.

Returning again to FIG. 17A, in some examples, the final skin tone mask may contain small holes within segments (e.g., due to eyes area, median filtering errors, etc.). As shown, binary skin segments patcher 1708 may perform filling of such small skin tone segmentation mask holes. For example, binary skin segments patcher 1708 may fills all holes of size within 5% of the frame size (e.g., or other threshold) that are fully contained within skin a segment.

Figure 17E:
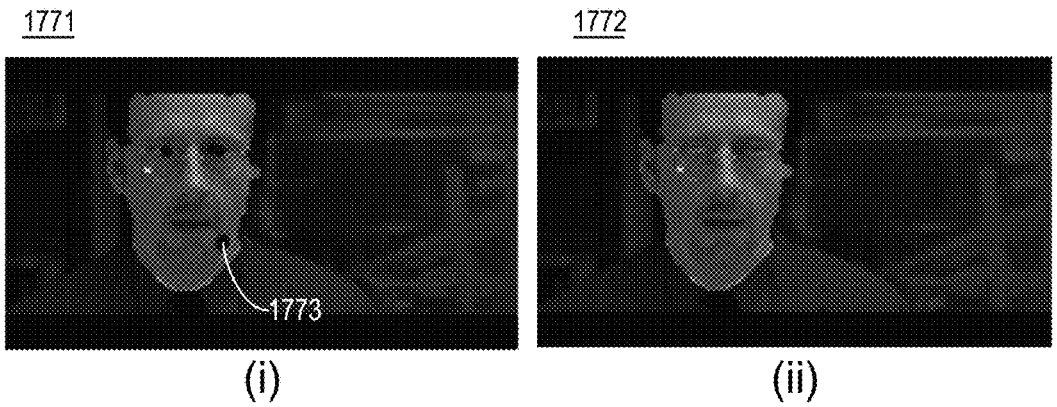
FIG. 17E illustrates example binary skin mask patching.

FIG. 17E illustrates example binary skin mask patching, arranged in accordance with at least some implementations of the present disclosure. FIG. 17E(i) illustrates an example skin mask 1771 having a hole 1773 before patching and FIG. 17E(ii) illustrates an example skin mask 1772 after patching. As shown, skin mask 1772 may have hole 1773 filled with respect to skin mask 1771 such that hole 1773 is removed.

Returning to FIG. 17A, final skin mask upsampler 1709 may scale up the block accurate binary skin probability mask to pixel accuracy and output skin tone regions mask 1029 (e.g., a final skin tone binary mask).

As discussed and with reference to FIGS. 10 and 12A, facial regions may be determined by Viola Jones face detector 1202 only at key frames and/or scene change frames. For non key frames and non scene change frames, face tracking may be provided.

Figure 18A:
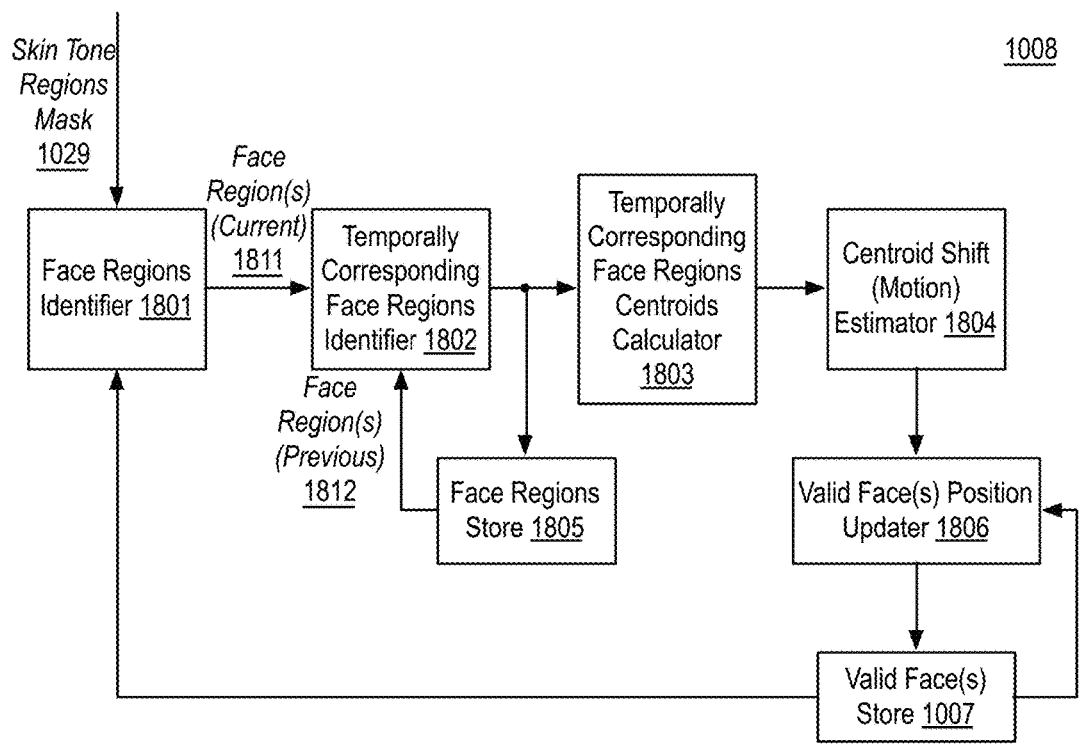
FIG. 18A illustrates an example face tracker.

FIG. 18A illustrates an example face tracker 1008, arranged in accordance with at least some implementations of the present disclosure. As shown, face tracker 1008 may include a face regions identifier 1801, a temporally corresponding face regions identifier 1802, a temporally corresponding face regions centroids calculator 1803, a centroid shift (motion) estimator 1804, a face regions store 1805, and a valid face(s) position updater 1806.

Also as shown, face regions identifier 1801 may identify face regions from among all skin tone regions available as provided by skin tone regions mask 1029 and face regions identifier 1801 may provide such regions as face region(s) (current) 1811. Since multiple faces can be within a video frame and the number of detected/tracked faces from frame to frame may not be the same, a correspondence between face regions in a current frame with face regions in a previous frame may be provided. Such a correspondence may be determined by temporally corresponding face regions identifier 1802, which may receive face region(s) (current) 1811 and face region(s) (previous) 1812 from face regions store 1805 and temporally corresponding face regions identifier 1802 may establish correspondence between face regions.

For each of the temporally corresponding face regions in the previous and current frames, using rectangle of each corresponding bounding boxes, a shift (e.g., motion) vector may be determined. For example, temporally corresponding face regions centroids calculator 1803 may determine centroids for bounding boxes around face regions in the previous and current frames. Such centroids may be provided to centroid shift (motion) estimator 1804, which may difference corresponding centroids (e.g., in previous and current frames) to generate and output the shift motion vector. The shift vector may be provided to valid face(s) position updater 1806, which may shift a face window (e.g., an inner face window or region) detected in a previous frame to a new position in the current frame. The new position of the updated face window is then stored in previously discussed valid face(s) store 1007 and may become the starting point for tracking the next frame, and so on.

To perform the previously discussed motion cue update step, faces may be tracked in all subsequent frames. Furthermore, to keep the processing speed fast, for each face region the tracker may re-use already computed basic features of segments and determine the displacement of face segments frame to frame. For example, for each face region the following operations may be performed. First, a corresponding segment may be determined (e.g., a segment the covers more than 50% of the face region). Next, the difference (e.g., in x and y direction) between the center of the segment bounding box in the current and previous frames may be determined. The difference motion vector [dx, dy] may be determined as follows: dx=Cx−Cx' (where Cx is the x-coordinate location of the centroid of the corresponding segment in the current frame and Cx' is the x-coordinate location of the centroid of the corresponding segment in the previous frame), and dy=Cy−Cy' (where Cy is the y-coordinate location of the centroid of the corresponding segment in the current frame and Cy' is the y-coordinate location of the centroid of the corresponding segment in the previous frame). Then, the face region may be updated according to the motion vector from previous step simply by adding the (dx,dy) differential motion vector to the face area bounding box.

Figure 18B:
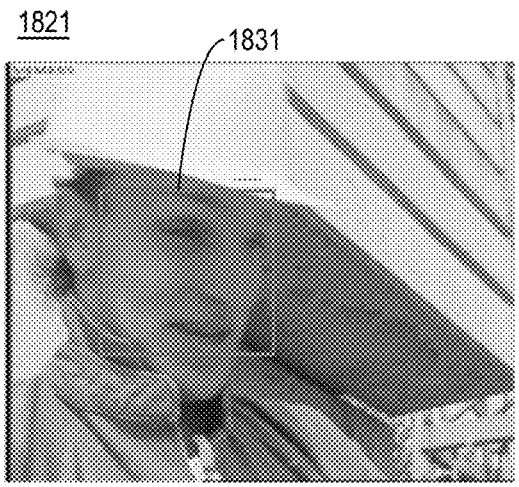
FIG. 18B illustrates example operations and partial results of face region tracking.
Figure 18B:
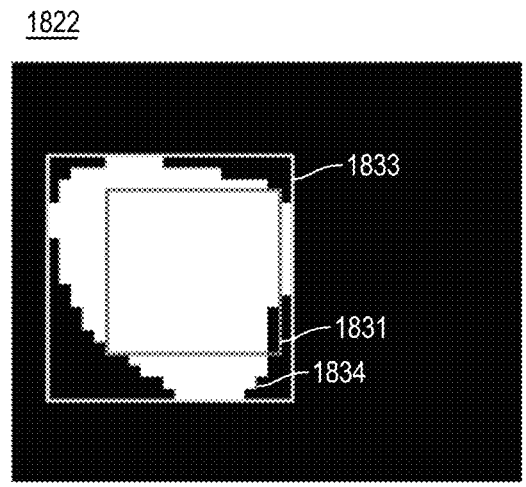
Figure 18B:
Figure 18B:
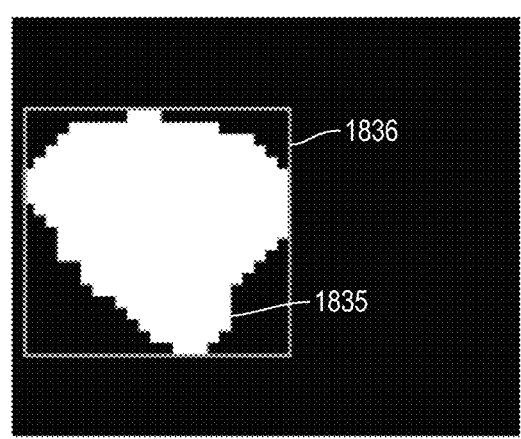
Figure 18B:
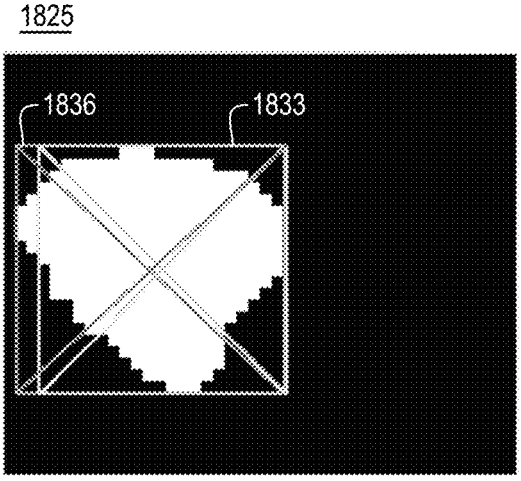
Figure 18B:
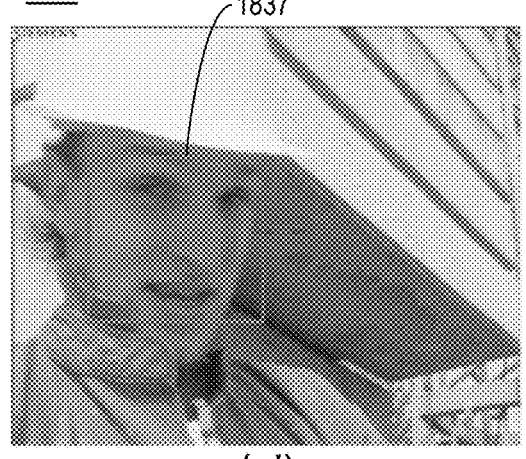

FIG. 18B illustrates example operations and partial results of face region tracking, arranged in accordance with at least some implementations of the present disclosure. For example, such operations and partial results are illustrated with respect to the Foreman sequence. FIG. 18B illustrates how a current frame face location is shifted based on a computed motion vector differential. The computation of motion vector differential is inexpensive computationally since it is obtained by simply differencing the centroids of bounding boxes of the corresponding segments which were computed earlier.

For example, FIG. 18B(i) illustrates a previous frame 1811 of the Foreman sequence with an overlaid rectangular window 1821 (e.g., a face detection window) illustrating a location of the face. FIG. 18B(ii) illustrates, for the same frame, a mask 1812 with the overlaid rectangular window 1821 showing the location of the face (e.g., the face detection window is the inner window), a segmented free-form face region boundary mask 1824 (e.g., generated using the rectangular face window and a skin-tone mask as discussed herein), an external bounding box 1823 based on segmented free-form face region boundary mask 1824.

FIG. 18B(iii) illustrates a current frame of the Foreman sequence 1813 and FIG. 18B(iv) illustrates, for the same frame, of the Foreman sequence, a skin tone based free-form face region boundary mask 1825 obtained by searching near free-form face region boundary mask 1824 from the previous frame 1811. FIG. 18B(iv) also illustrates an overlaid rectangular window 1826, which is a bounding box to the detected free-form face region boundary mask 1825.

Next, FIG. 18B(v) illustrates external bounding box 1826 (e.g., the face region and bounding box of FIG. 18B(iv) and its centroid (e.g., as the center of the X provided within the bounding box) and external bounding box 1823 (e.g., the overlaid face window bounding box from previous frame 1812 and its centroid (e.g., as the center of the X provided within the bounding box). As discussed, a shift vector (dx, dy) may be computed based on distances in the x and y directions between the two centroids (e.g., the centroids of external bounding box 1823 and external bounding box 1826). In the illustrated example, the shift vector is (−1,0). FIG. 18B(vi) illustrates, for current frame 1813, a location of an inner face window 1827 determined based on the location of overlaid rectangular window 1821 from frame 1811 (e.g., the window from the previous frame) compensated by the shift vector (e.g., moved by (−1,0) for current frame 1813. The updated location of inner window 1827 may then be used as a starting face window location for a subsequent frame, for which the face window may be similarly updated and used for the following frame, and so forth, which may provide for tracking of face window. Such tracking may be reset by a key frame as discussed herein such that face tracking is reset and a new Viola-Jones feature matching search is conducted for face detection in the key frame.

Figure 18C:
FIG. 18C illustrates skin detection without and with facial segment tracking.
Figure 18C:

FIG. 18C illustrates skin detection without and with facial segment tracking, arranged in accordance with at least some implementations of the present disclosure. FIG. 18C(i) illustrates a detected skin-tone region 1841 without facial segment tracking and FIG. 18C(ii) illustrates a detected skin-tone region 1842 with facial segment tracking. As compared to detected skin-tone region 1841, detected skin-tone region 1842 illustrates improved skin tone detection with facial segment tracking.

Figure 19:
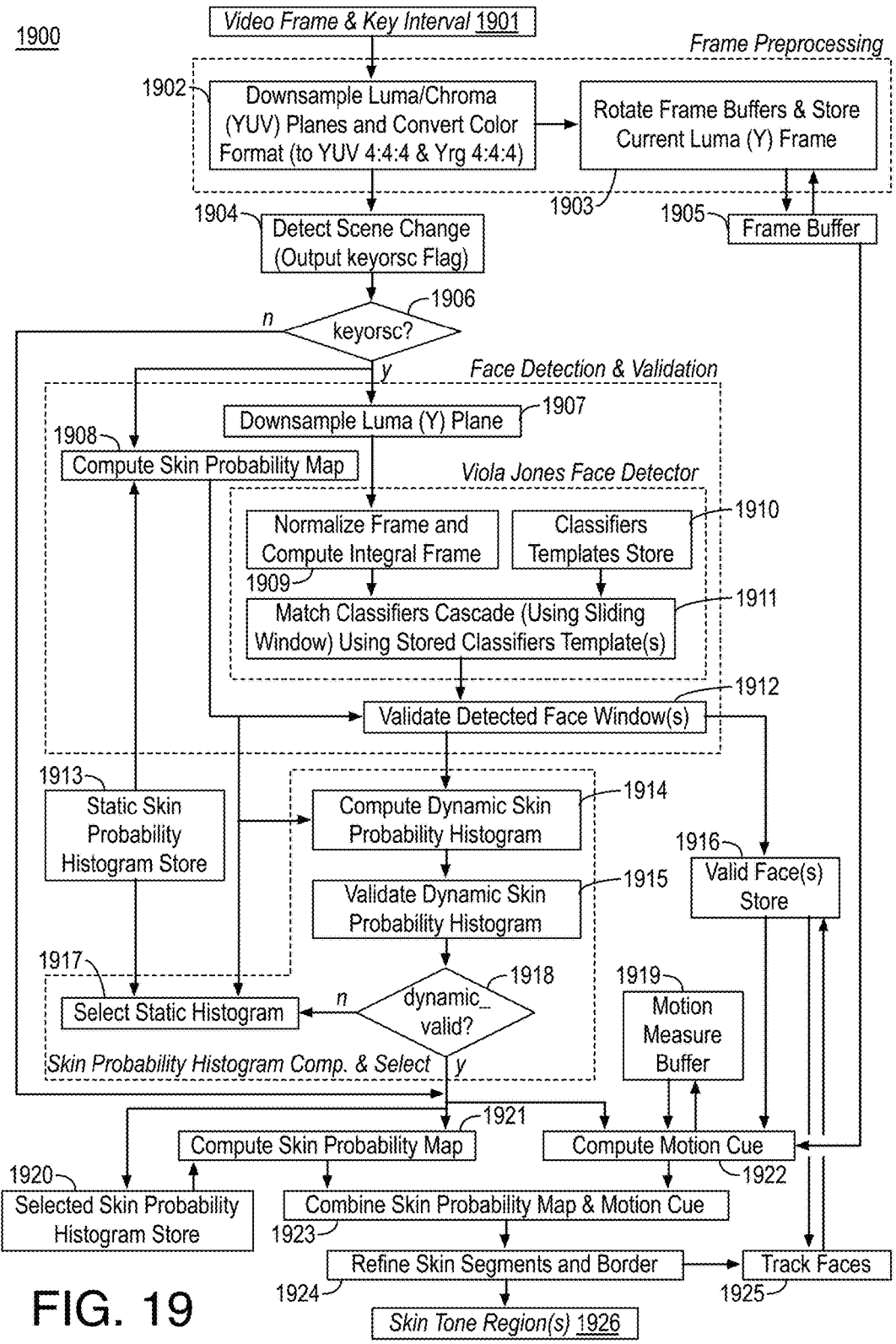
FIG. 19 is a flow diagram illustrating an example process 1900 for skin tone region detection.

FIG. 19 is a flow diagram illustrating an example process 1900 for skin tone region detection, arranged in accordance with at least some implementations of the present disclosure. Process 1900 may include one or more operations 1901-1926 as illustrated in FIG. 19. For example, process 1900 may be performed by system 1000 as discussed with respect to FIG. 10.

As shown, process 1900 may begin at operation 1901, "Video Frame & Key Interval", where an input (e.g., YUV 4:2:0) frame and a key frame interval may be received. For example, each frame of video may be full YUV 4:2:0 resolution and may be input to "Frame Preprocessing" operations that may include operation 1902, "Downsample Luma/Chroma (YUV) Planes and Convert Color Format (to YUV 4:4:4 and Yrg 4:4:4)", and operation 1903, "Rotate Frame Buffers and Store Current Luma (Y) Frame", such that outputs of a downsampled Yrg 4:4:4 frames and a downsampled YUV 4:4:4 frame may be provided and stored, as needed, in "Frame Buffer" 1905.

Optionally in parallel, the input YUV 4:2:0 frame and a past YUV 4:2:0 frame may also be input to operation 1904, "Detect Scene Change (Output keyorsc Flag)", where scene change detection may be performed. Furthermore, the received key_interval may also be input to operation 1904 such that operation 1904 may output a signal (e.g., keyorsc) with a value of true or 1 at scene changes or when key_interval is reached. At decision operation 1906, "keyorsc?", a determination may be made as to whether the current frame is a key or scene change frame or not. If so, processing may continue at a "Face Detection and Validation" operations and, if not, processing may continue at operations 1921 and 1922 as discussed below.

For key frames or scene change frames, the Yrg 4:4:4 frame determined at operation 1902 may be input to "Face Detection and Validation" operations that may search for the presence of faces and may mark face rectangles and validate them for presence of actual faces (e.g., to remove false positives). For example, "Face Detection and Validation" operations may receive the Yrg frame for key or scene change frames and the received frame may be downsampled at operation 1907, "Downsample Luma (Y) Plane". The downsampled luma plane may be normalized and an integral frame may be computed at operation 1909, "Normalize Frame and Compute Integral Frame". The integral frame determined at operation 1909 may be searched for features using stored feature templates from "Classifiers Template(s) Store" 1910 at operation 1911, "Classify Features (Using Sliding Window) Using Stored Classifiers Templates," which may provide detected face windows. As shown, operations 1909-1911 may provide "Face Detection and Validation" operations. The detected face windows may be validated at operation 1912, "Validate Detected Face Window", where valid face windows may be detected based on an initial skin probability map received from operation 1908, "Compute Initial Skin Probability Map" (e.g., computed based on a static skin probability histogram received from "Static Skin Probability Histogram Store" 1913) and stored in "Valid Face(s) Store" 1916. If no valid faces are detected at operation 1912, processing may end for the current frame.

Valid face rectangle (windows) are then input along with Yrg 4:4:4 and YUV 4:4:4 frames and static skin probability histograms (e.g., from training) as stored at 1913 to the "Skin Probability Histogram Computation and Selection" operations. When a key frame or scene change is encountered (e.g., keyorsc=1), a dynamic skin probability histogram may be generated at operation 1914, "Compute Dynamic Skin Probability Histogram", and validated at operations 1915, "Validate Dynamic Skin Probability Histogram", and 1918, "dynamic valid 1918" and otherwise (e.g., for non key or non scene change frames) the stored value of histogram from "Selected Skin Probability Histogram Store" 1920 is used based on operation 1917, "Select Static Histogram". Both the Yrg 4:4:4 frame and the YUV 4:4:4 frame as well as the skin probability histogram are used at operation 1921, "Compute Skin Probability Map".

The skin probability map at the output of operation 1921 as well as frames from "Frame Buffer" 1905, the valid face rectangles from 1916 (e.g., that for non key or scene change frame are obtained by tracking as performed at operation 1925, "Track Faces") and contents of "Motion Measure Buffer" 1919 are input to operation 1922, "Compute Motion Cue". Next, the motion cues from operation 1922 and the skin probability map from operation 1921 are input to operation 1923, "Combine Skin Probability Map and Motion Cue", the output of which is input to operation 1924, "Refine Skin Segments and Border", which may output to operation 1925 for further processing. After optional post-processing, the output of operation 1924 is the final skin-tone regions mask containing "Skin Tone Region(s)" 1926.

Figure 20:
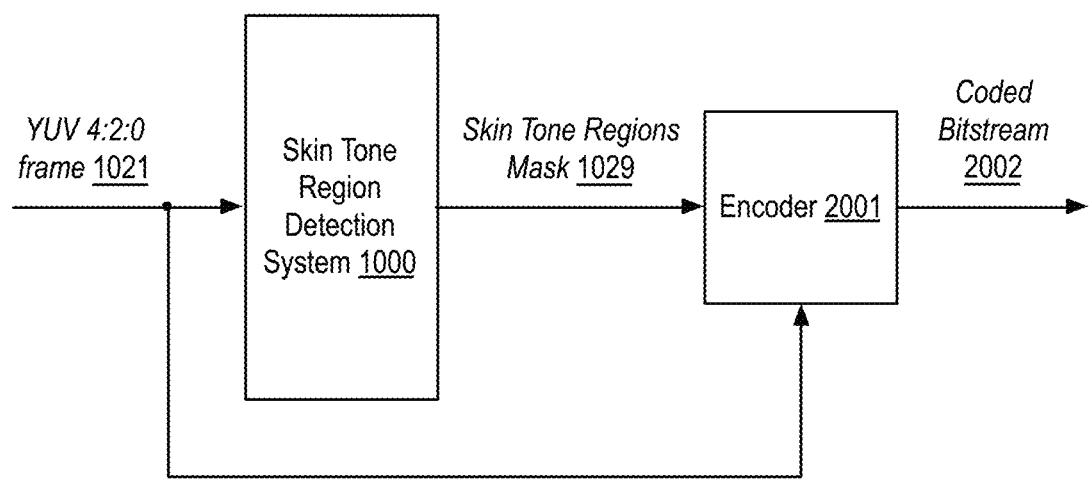
FIG. 20 is an illustrative diagram of an example system for providing improved coding based on skin tone detection.

FIG. 20 is an illustrative diagram of an example system 2000 for providing improved coding based on skin tone detection, arranged in accordance with at least some implementations of the present disclosure. As shown in FIG. 20, system 2000 may include skin tone region detection system 1000 and an encoder 2001. Skin tone region detection system 1000 may include any components, modules, or the like discussed herein with respect to system 1000 and/or as discussed in detail with respect to the components or modules of system 1000. As shown, system 1000 may provide skin tone regions mask 1029 including skin tone information such as one or more skin tone regions as discussed herein. In addition or in the alternative, system 1000 may provide other data or signals generated by system 1000. Furthermore, in addition or in the alternative, encoder 2001 may provide a signal or signals to system 1000 inducing whether YUV video frame 1021 is a key frame, a key frame interval, or the like. Also, as discussed, although illustrated with respect to YUV video frame 1021, system 2000 may receive any number of video frames, video sequences, or the like in any suitable color space.

For example, system 1000 may receive YUV video frame 1021, generate a Yrg color format and a YUV color format of the video frame (e.g., downsampling the YUV frame to 4:4:4 YUV and converting and downsampling the YUV frame to 4:4:4 Yrg), select one of multiple static skin probability histograms based on the Yrg color format video frame, generate a dynamic skin probability histogram based on the YUV color format video frame, determine whether the dynamic skin probability histogram is valid or invalid, generate a skin tone region based on the dynamic skin probability histogram when the dynamic skin probability histogram is valid or based on the selected static skin probability histogram when the dynamic skin probability histogram is invalid, and provide the skin tone region to encoder 2001, which may encode YUV video frame 1021 based on the skin tone region(s) in the video frame and to generate coded bitstream 2002.

System 1000 may determine skin tone regions mask 1029 using any techniques discussed herein. Encoder 2001 may encode YUV video frame 1021 (and other video frames) based on skin tone regions mask 1029 (including skin tone regions for such other video frames) to generate coded bitstream 2002 using any suitable technique or techniques. In an embodiment, encoding a video frame based on a skin tone region includes reducing a quantization parameter corresponding to the skin tone region. In an embodiment, encoding a video frame based on a skin tone region includes adjusting a lambda value for the skin tone region. In an embodiment, encoding a video frame based on a skin tone region includes disabling skip coding for the skin tone region. For example, such techniques may improve viewing quality of skin tone region(s) relative to other regions of the frame.

Encoder 2001 may include any suitable encoder that may encode video frames into any suitable format. For example, encoder 2001 may be a standards compliant encoder such that coded bitstream 2002 is a standards compliant bitstream. For example, coded bitstream may be an H.264/Advanced Video Coding (AVC) compliant bitstream, an H.265/High Efficiency Video Coding (HEVC) compliant bitstream, a VP9 compliant bitstream, a VP10 compliant bitstream, an Alliance for Open Media (AOM) compliant bitstream, or the like.

For example, system 1000 may provide a fast skin tone detector for coding HD content such that system 1000 may provide for high quality coding (e.g., by reducing the quantizer or adjusting the lambda value appropriately or both) of skin tone regions (Region of Interest (ROI)) in improved video coding (e.g., AVC, HEVC, VP9, VP10 or AOM video coding). For example, such skin tone regions or locations may be updated frequently to provide high quality coding. Free shape skin regions at block accuracy (e.g., 4×4 or 8×8) or pixel accuracy as provided by skin tone regions mask 1029 may be used to provide high quality coding (e.g., by reducing the quantizer or adjusting the lambda value appropriately or both) of skin tone regions (Region of Interest (ROI)) in improved video coding (e.g., AVC, HEVC, VP9, VP10 or AOM video coding). Furthermore, identifying skin regions, face regions, and face tracking may be used to update positions of face rectangles or face regions or skin tone regions to provide high quality coding (e.g., by reducing the quantizer or adjusting the lambda value appropriately or both) of face regions (Region of Interest (ROI)) in improved video coding (e.g., AVC, HEVC, VP9, VP10 or AOM video coding). Further coding improvements may be provided with respect to a skin tone region (Region of Interest (ROI)) by not enabling skipping or other means by which bit savings occur at the expense of quality degradation in video coding as per video coding based on AVC, HEVC, VP9, VP10 or AOM specifications.

Figure 21:
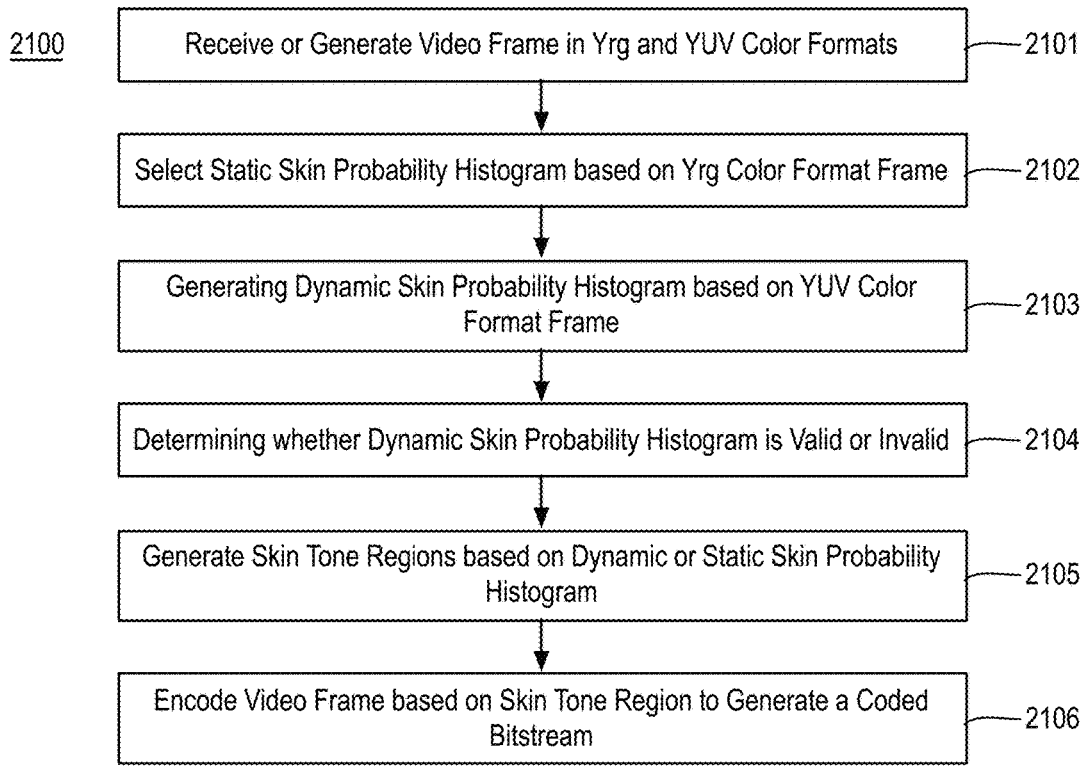
FIG. 21 is a flow diagram illustrating an example process for performing video coding based on skin tone detection.

FIG. 21 is a flow diagram illustrating an example process 2100 for performing video coding based on skin tone detection, arranged in accordance with at least some implementations of the present disclosure. Process 2100 may include one or more operations 2101-2106 as illustrated in FIG. 21. Process 2100 may form at least part of a video coding process. By way of non-limiting example, process 2100 may form at least part of a video coding process as performed by system 2100 as discussed herein. Furthermore, process 2100 will be described with reference to system 2200 of FIG. 22.

Figure 22:
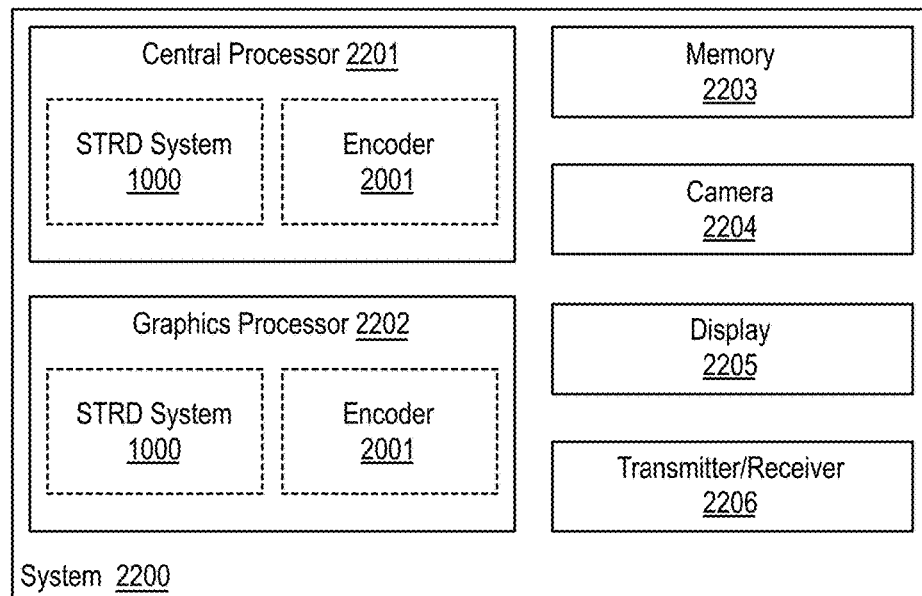
FIG. 22 is an illustrative diagram of an example for performing video coding based on skin tone detection.

FIG. 22 is an illustrative diagram of an example system 2200 for performing video coding based on skin tone detection, arranged in accordance with at least some implementations of the present disclosure. As shown in FIG. 22, system 2200 may include a central processor 2201, a graphics processor 2202, a memory 2203, a camera 2204, a display 2205, and a transmitter/receiver 2206. In some embodiments system 2200 may not include camera 2204, display 2205, and/or transmitter/receiver 2206. As shown, central processor 2201 and/or graphics processor 2202 may implement face region detection and tracking (FRDT) system 1000 and/or encoder 2001. System 1000 and encoder 2001 may include any system and encoder as discussed herein or combinations thereof. In the example of system 2200, memory 2203 may store frame data, image data, skin tone data, face recognition and/or tracking data, and/or bitstream data or any related data such as any other data discussed herein.

As shown, in some embodiments, skin tone region detection system 1000 and/or encoder 2001 may be implemented via central processor 2201. In other embodiments, one or more or portions of skin tone region detection system 1000 and/or encoder 2001 may be implemented via graphics processor 2202. In yet other embodiments, skin tone region detection system 1000 and/or encoder 2001 may be implemented by an image processing unit, an image processing pipeline, a video processing pipeline, or the like. In some embodiments, skin tone region detection system 1000 and/or encoder 2001 may be implemented in hardware as a system-on-a-chip (SoC).

Graphics processor 2202 may include any number and type of graphics processing units that may provide the operations as discussed herein. Such operations may be implemented via software or hardware or a combination thereof. For example, graphics processor 2202 may include circuitry dedicated to manipulate and/or analyze images or frames obtained from memory 2203. Central processor 2201 may include any number and type of processing units or modules that may provide control and other high level functions for system 2200 and/or provide any operations as discussed herein. Memory 2203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2203 may be implemented by cache memory. In an embodiment, one or more or portions of skin tone region detection system 1000 and/or encoder 2001 may be implemented via an execution unit (EU) of graphics processor 2202 or another processor. The EU may include, for example, programmable logic or circuitry such as a logic core or cores that may provide a wide array of programmable logic functions. In an embodiment, one or more or portions of skin tone region detection system 1000 and/or encoder 2001 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2204 may be any suitable camera or device that may obtain image or frame data for processing such as encode processing as discussed herein. Display 2205 may be any display or device that may present image or frame data such as decoded images or frames as discussed herein. Transmitter/receiver 2206 may include any suitable transmitter and/or receiver that may transmit or receive bitstream data as discussed herein.

System 2200 may implement any devices, systems, encoders, decoders, modules, units, or the like as discussed herein. Furthermore, system 2200 may implement any processes, operations, or the like as discussed herein. System 2200 may have any suitable form factor. For example, system 2200 may be implemented by a camera, a smartphone, an ultrabook, a tablet, a wearable device, a monitor, a desktop computer, a set top box, or the like.

Returning to discussion of FIG. 21, process 2100 may begin at operation 2101, where a video frame in a first color format and in a second color format may be received or generated. In an embodiment, the first color format is a Yrg color format and the second color format is a YUV color format. In an embodiment, an input video frame may be received in a YUV 4:2:0 format, the YUV 4:2:0 format video frame may be downsampled to a downsampled YUV 4:2:0 format video frame and the downsampled YUV 4:2:0 format video frame may be converted to a YUV 4:4:4 format video frame to generate the YUV color format frame. In an embodiment, the YUV 4:4:4 format video frame may be converted to a Yrg 4:4:4 format to generate the Yrg color format frame. In an embodiment, the video frame may be received and/or downsampled and color converted as needed by skin tone region detection system 1000 as implemented via central processor 2201.

Processing may continue at operation 2102, where one of multiple static skin probability histograms may be selected based at least in part on the Yrg color format video frame. In an embodiment, the multiple static skin probability histograms include a normal illumination static skin probability histogram, a red/orange/yellow illumination static skin probability histogram, and a blue/green illumination static skin probability histogram. The static skin probability histogram may be selected using any suitable technique or techniques as discussed herein. In an embodiment, the static skin probability histogram may be selected by skin tone region detection system 1000 as implemented via central processor 2201.

Processing may continue at operation 2103, where a dynamic skin probability histogram may be generated based on the YUV color format video frame and a face region in the video frame. In an embodiment, the video frame is one video frame of a video sequence and process 2100 further includes determining the video frame is a key frame of the video sequence and, responsive to the video frame being a key frame of the video sequence, performing face detection to determine the face region in the video frame. In an embodiment, process 2100 may also include determining a free form shape face region corresponding to the face region (e.g., a free form shape face region of a pixel accuracy or a small block of pixels accuracy) and determining a location of a second skin tone region in a second video frame of the video sequence based on tracking the free form shape face region. For example, for non key frames and non scene change frames, tracking may be performed. In an embodiment, the second video frame is a non key frame and tracking the form shape face region is responsive to the second video frame being a non key frame. In an embodiment, operation 2103 and/or such further operations may be generated by skin tone region detection system 1000 as implemented via central processor 2201.

Processing may continue at operation 2104, where a determination may be made as to whether the dynamic skin probability histogram is valid or invalid. The validity of the dynamic skin probability histogram may be performed using any suitable technique or techniques as discussed herein. In an embodiment, the validity determination may be made by skin tone region detection system 1000 as implemented via central processor 2201.

Processing may continue at operation 2105, where a skin tone region may be generated based on the dynamic skin probability histogram when the dynamic skin probability histogram is valid or based on the selected static skin probability histogram when the dynamic skin probability histogram is invalid. The skin tone region may be a part of a skin tone regions mask and the skin tone region may be generated using any suitable technique or techniques as discussed herein. In an embodiment, the skin tone region may be generated by skin tone region detection system 1000 as implemented via central processor 2201. In an embodiment, one or more motion cues may be used to generate the skin tone region. In an embodiment, process 2100 may further include determining a motion cue corresponding to the skin tone region based on the video frame and one or more previous video frames and combining the motion cue with a skin probability map corresponding to the video frame to generate the skin tone region. In an embodiment, process 2100 may further include determining a first motion cue and a second motion cue corresponding to the skin tone region based on the video frame and one or more previous video frames and combining the first motion cue, the second motion cue, and a skin probability map corresponding to the video frame to generate the skin tone region. For example, the first motion cue may be a maximum motion measurement corresponding to each block of the video frame such that the maximum motion measurement comprises a maximum of motion measurements for each block between temporally adjacent video frames of the previous video frames and the video frame. Furthermore, the second motion cue may be, for each block of the video frame, a combination of a motion measurement between the video frame and an adjacent video frame of the previous video frames and a motion measurement between the video frame and a non-adjacent video frame of the previous video frames.

As discussed, a skin tone region may be generated based on the dynamic skin probability histogram when the dynamic skin probability histogram is valid or based on the selected static skin probability histogram when the dynamic skin probability histogram is invalid. In an embodiment, process 2100 may further include refining the skin tone region by reducing temporal inconsistency of the skin tone region based on the skin tone region and one or more previous skin tone regions in previous video frames. In an embodiment, process 2100 may further include refining the skin tone region based on one or more of a size of the skin tone region, a texture of the skin tone region, a shape of the skin tone region, or a distance from a border of the video frame of the skin tone region. In an embodiment, process 2100 may further include detecting a hole in a skin tone region corresponding to the video frame, filling the hole in the skin tone region to provide a continuous skin tone region for efficient coding of the video frame, and encoding the video frame based at least in part on the continuous skin tone region. For example, such detecting and filling of holes prior to encoding may provide enhanced efficiency in coding. Such refinements and corrections may be performed prior to operation 2106.

Processing may continue at operation 2106, where the video frame may be encoded based at least in part on the skin tone region to generate a coded bitstream. The video frame may be encoded using any suitable technique or techniques. In an embodiment, the video frame may be encoded by encoder 2001 as implemented via central processor 2201. Encoding the video frame based on the skin tone region may include reducing a quantization parameter corresponding to the skin tone region, adjusting a lambda value for skin tone region, and/or disabling skip coding for the skin tone region. The coded bitstream may include any suitable bitstream. For example, the coded bitstream may be a standards compliant bitstream such as an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream.

Although process 2100 and system 2200 are discussed with respect to an encode use case (e.g., to improve coding quality and/or efficiency) for skin tone regions determined at operation 2105, other use cases for such skin tone regions are available. For example, a process for skin tone detection may include generating a Yrg color format version and a YUV color format version of a received video frame, selecting one of multiple static skin probability histograms based at least in part on the Yrg color format version of the video frame, generating a dynamic skin probability histogram based on the YUV color format version of the video frame and a face region in the video frame, determining whether the dynamic skin probability histogram is valid or invalid, generating a skin tone region based on the dynamic skin probability histogram when the dynamic skin probability histogram is valid or based on the selected static skin probability histogram when the dynamic skin probability histogram is invalid, as discussed with respect to operations 2101-2105, and providing the skin tone region for further processing. Such further processing may include any particular use case.

In an embodiment, the received video frame is a video frame of a sequence of surveillance video frames and processing may include performing person detection in the surveillance video frames based on the skin tone region. For example, surveillance footage may be analyzed to determine a person is either present in the surveillance video frames or not based on the skin tone region. In an embodiment, surveillance footage may be analyzed to perform person or face recognition on the surveillance video frames based on the skin tone region.

In an embodiment, the received video frame is a video frame of a sequence of video frames and processing may include adding a marker corresponding to the received video frame to search the received video frame for a person based on the skin tone region. For example, the search may include a person detection or a person or face recognition search.

In an embodiment, the received video frame is a video frame of a sequence of video frames and processing may include providing an index indicative of a person being present in the video frame based on the skin tone region. For example, the index may be used as a movie index indicating the presence of a character or actor in the movie based on the skin tone region.

In an embodiment, the received video frame is a video frame of a sequence of videoconferencing frames and processing may include encoding the video frame based at least in part on the skin tone region to generate a coded bitstream. For example, in the context of videoconferencing, only the skin tone regions or portions of the frame including skin tone regions (e.g., portions including people) may be encoded while background regions may not be encoded into the bitstream. In addition or in the alternative, the skin tone regions may be coded with improved quality in such videoconferencing contexts.

In an embodiment, the received video frame is a video frame of a sequence of video frames and processing may include encoding the video frame based at least in part on the skin tone region to generate a coded bitstream. For example, the coded bitstream may not be compliant with current standards and the coded bitstream may include metadata corresponding to the skin tone region. For example, the metadata may include an indicator of the skin tone region (e.g., that the video frame has a skin tone region), a location and/or size of the skin tone region, information indicating an outline of the skin tone region, or the like. Furthermore, at a separate device (e.g., a decoding device), the coded bitstream may be decoded to generate a decoded (or reconstructed) video frame and to determine the metadata corresponding to the skin tone region in the bitstream. At the decoder, such decoded metadata may be used to further process the video frame. For example, the skin tone region may be replaced (e.g., with a static image or the like) based on the decoded metadata, the skin tone region cropped and image data corresponding only to the skin tone region may be displayed based on the decoded metadata, or the decoded video frame may be indexed or marked for further search or the like based on the decoded metadata.

Process 2100 and/or such alternative use case processing may be performed in series or at least partially in parallel for any number of video frames, video sequences, or the like. Process 2100 may provide improved video coding based on skin tone detection such that improved compression and/or improved quality may be attained.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 23:
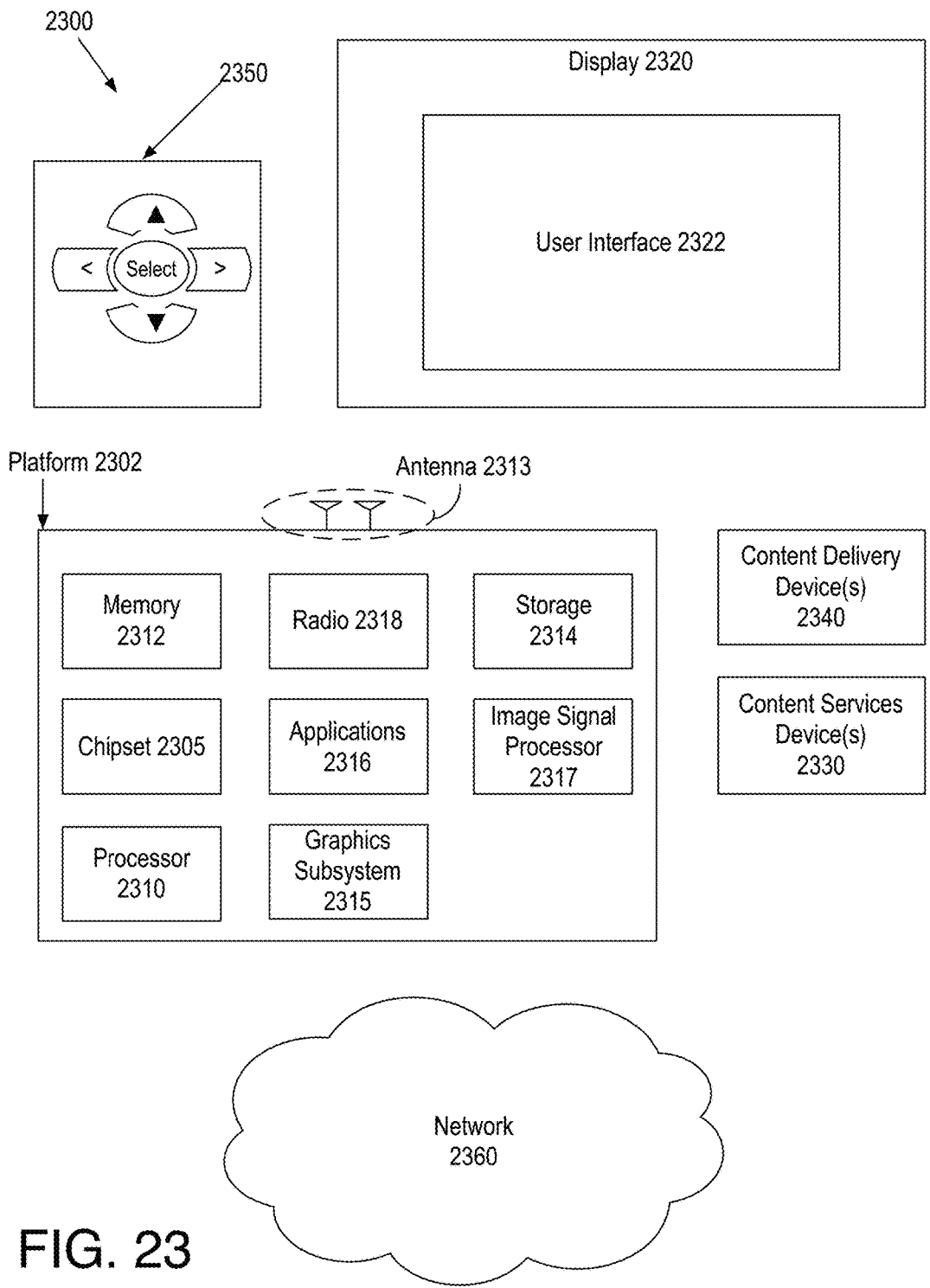
FIG. 23 is an illustrative diagram of an example system.

FIG. 23 is an illustrative diagram of an example system 2300, arranged in accordance with at least some implementations of the present disclosure. In various implementations, system 2300 may be a mobile device system although system 2300 is not limited to this context. For example, system 2300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2300 includes a platform 2302 coupled to a display 2320. Platform 2302 may receive content from a content device such as content services device(s) 2330 or content delivery device(s) 2340 or other content sources such as image sensors 2319. For example, platform 2302 may receive image data as discussed herein from image sensors 2319 or any other content source. A navigation controller 2350 including one or more navigation features may be used to interact with, for example, platform 2302 and/or display 2320. Each of these components is described in greater detail below.

In various implementations, platform 2302 may include any combination of a chipset 2305, processor 2310, memory 2311, antenna 2313, storage 2314, graphics subsystem 2315, applications 2316, image signal processor 2317 and/or radio 2318. Chipset 2305 may provide intercommunication among processor 2310, memory 2311, storage 2314, graphics subsystem 2315, applications 2316, image signal processor 2317 and/or radio 2318. For example, chipset 2305 may include a storage adapter (not depicted) capable of providing intercommunication with storage 2314.

Processor 2310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2310 may be dual-core processor(s), dual-core mobile processor(s), and so forth.

Memory 2311 may be implemented as a volatile memory device such as, but not limited to, a Random Access Memory (RAM), Dynamic Random Access Memory (DRAM), or Static RAM (SRAM).

Storage 2314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2314 may include technology to increase the storage performance enhanced protection for valuable digital media when multiple hard drives are included, for example.

Image signal processor 2317 may be implemented as a specialized digital signal processor or the like used for image processing. In some examples, image signal processor 2317 may be implemented based on a single instruction multiple data or multiple instruction multiple data architecture or the like. In some examples, image signal processor 2317 may be characterized as a media processor. As discussed herein, image signal processor 2317 may be implemented based on a system on a chip architecture and/or based on a multi-core architecture.

Graphics subsystem 2315 may perform processing of images such as still or video for display. Graphics subsystem 2315 may be a graphics processing unit (GPU) or a visual processing unit (VPU), for example. An analog or digital interface may be used to communicatively couple graphics subsystem 2315 and display 2320. For example, the interface may be any of a High-Definition Multimedia Interface, DisplayPort, wireless HDMI, and/or wireless HD compliant techniques. Graphics subsystem 2315 may be integrated into processor 2310 or chipset 2305. In some implementations, graphics subsystem 2315 may be a stand-alone device communicatively coupled to chipset 2305.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2318 may operate in accordance with one or more applicable standards in any version.

In various implementations, display 2320 may include any television type monitor or display. Display 2320 may include, for example, a computer display screen, touch screen display, video monitor, television-like device, and/or a television. Display 2320 may be digital and/or analog. In various implementations, display 2320 may be a holographic display. Also, display 2320 may be a transparent surface that may receive a visual projection. Such projections may convey various forms of information, images, and/or objects. For example, such projections may be a visual overlay for a mobile augmented reality (MAR) application. Under the control of one or more software applications 2316, platform 2302 may display user interface 2322 on display 2320.

In various implementations, content services device(s) 2330 may be hosted by any national, international and/or independent service and thus accessible to platform 2302 via the Internet, for example. Content services device(s) 2330 may be coupled to platform 2302 and/or to display 2320. Platform 2302 and/or content services device(s) 2330 may be coupled to a network 2360 to communicate (e.g., send and/or receive) media information to and from network 2360. Content delivery device(s) 2340 also may be coupled to platform 2302 and/or to display 2320.

Image sensors 2319 may include any suitable image sensors that may provide image data based on a scene. For example, image sensors 2319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2319 may include any device that may detect information of a scene to generate image data.

In various implementations, content services device(s) 2330 may include a cable television box, personal computer, network, telephone, Internet enabled devices or appliance capable of delivering digital information and/or content, and any other similar device capable of uni-directionally or bi-directionally communicating content between content providers and platform 2302 and/display 2320, via network 2360 or directly. It will be appreciated that the content may be communicated uni-directionally and/or bi-directionally to and from any one of the components in system 2300 and a content provider via network 2360. Examples of content may include any media information including, for example, video, music, medical and gaming information, and so forth.

Content services device(s) 2330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2302 may receive control signals from navigation controller 2350 having one or more navigation features. The navigation features of navigation controller 2350 may be used to interact with user interface 2322, for example. In various embodiments, navigation controller 2350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2350 may be replicated on a display (e.g., display 2320) by movements of a pointer, cursor, focus ring, or other visual indicators displayed on the display. For example, under the control of software applications 2316, the navigation features located on navigation controller 2350 may be mapped to virtual navigation features displayed on user interface 2322, for example. In various embodiments, navigation controller 2350 may not be a separate component but may be integrated into platform 2302 and/or display 2320. The present disclosure, however, is not limited to the elements or in the context shown or described herein.

In various implementations, drivers (not shown) may include technology to enable users to instantly turn on and off platform 2302 like a television with the touch of a button after initial boot-up, when enabled, for example. Program logic may allow platform 2302 to stream content to media adaptors or other content services device(s) 2330 or content delivery device(s) 2340 even when the platform is turned "off." In addition, chipset 2305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2300 may be integrated. For example, platform 2302 and content services device(s) 2330 may be integrated, or platform 2302 and content delivery device(s) 2340 may be integrated, or platform 2302, content services device(s) 2330, and content delivery device(s) 2340 may be integrated, for example. In various embodiments, platform 2302 and display 2320 may be an integrated unit. Display 2320 and content service device(s) 2330 may be integrated, or display 2320 and content delivery device(s) 2340 may be integrated, for example. These examples are not meant to limit the present disclosure.

In various embodiments, system 2300 may be implemented as a wireless system, a wired system, or a combination of both. When implemented as a wireless system, system 2300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 23.

Figure 24:
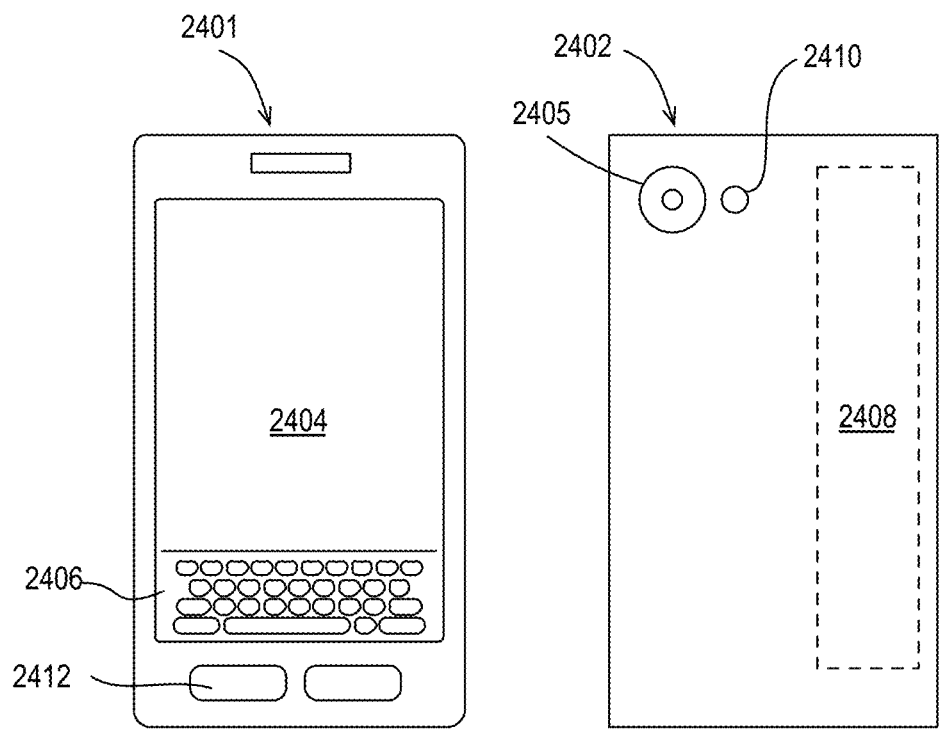
FIG. 24 illustrates an example small form factor device, all arranged in accordance with at least some implementations of the present disclosure.

As described above, system 2300 may be embodied in varying physical styles or form factors. FIG. 24 illustrates an example small form factor device 2400, arranged in accordance with at least some implementations of the present disclosure. In some examples, system 2300 may be implemented via device 2400. In various embodiments, for example, device 2400 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 24, device 2400 may include a housing with a front 2401 and a back 2402. Device 2400 includes a display 2404, an input/output (I/O) device 2406, and an integrated antenna 2408. Device 2400 also may include navigation features 2411. I/O device 2406 may include any suitable I/O device for entering information into a mobile computing device. Examples for I/O device 2406 may include an alphanumeric keyboard, a numeric keypad, a touch pad, input keys, buttons, switches, microphones, speakers, voice recognition device and software, and so forth. Information also may be entered into device 2400 by way of microphone (not shown), or may be digitized by a voice recognition device. As shown, device 2400 may include a camera 2405 (e.g., including a lens, an aperture, and an imaging sensor) and a flash 2410 integrated into back 2402 (or elsewhere) of device 2400. In other examples, camera 2405 and/or flash 2410 may be integrated into front 2401 of device 2400 and/or additional cameras (e.g., such that device 2400 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for performing video coding based on skin tone detection comprises receiving a video frame in a first color format and in a second color format, selecting one of a plurality of static skin probability histograms based at least in part on the first color format video frame, generating a dynamic skin probability histogram based on the second color format video frame and a face region in the video frame, determining whether the dynamic skin probability histogram is valid or invalid, generating a skin tone region based on the dynamic skin probability histogram when the dynamic skin probability histogram is valid or based on the selected static skin probability histogram when the dynamic skin probability histogram is invalid, and encoding the video frame based at least in part on the skin tone region to generate a coded bitstream.

Further to the first embodiments, the first color format frame is a Yrg color format frame and the second color frame is a YUV color format frame.

Further to the first embodiments, the method further comprises receiving an input video frame in a YUV 4:2:0 format, downsampling the YUV 4:2:0 format video frame to a downsampled YUV 4:2:0 format video frame and converting the downsampled YUV 4:2:0 format video frame to a YUV 4:4:4 format video frame to generate the YUV color format frame, and converting the YUV 4:4:4 format video frame to a Yrg 4:4:4 format to generate the Yrg color format frame.

Further to the first embodiments, the plurality of static skin probability histograms consist of a normal illumination static skin probability histogram, a red/orange/yellow illumination static skin probability histogram, and a blue/green illumination static skin probability histogram.

Further to the first embodiments, the video frame comprises one of a plurality of video frames of a video sequence and the method further comprises determining the video frame is a key frame of the video sequence and, responsive to the video frame being a key frame of the video sequence, performing face detection to determine the face region in the video frame.

Further to the first embodiments, the video frame comprises one of a plurality of video frames of a video sequence and the method further comprises determining the video frame is a key frame of the video sequence and, responsive to the video frame being a key frame of the video sequence, performing face detection to determine the face region in the video frame, determining a free form shape face region corresponding to the face region, wherein the free form shape face region has at least one of a pixel accuracy or a small block of pixels accuracy, and determining a location of a second skin tone region in a second video frame of the video sequence based on tracking the free form shape face region.

Further to the first embodiments, the video frame comprises one of a plurality of video frames of a video sequence and the method further comprises determining the video frame is a key frame of the video sequence and, responsive to the video frame being a key frame of the video sequence, performing face detection to determine the face region in the video frame, determining a free form shape face region corresponding to the face region, wherein the free form shape face region has at least one of a pixel accuracy or a small block of pixels accuracy, and determining a location of a second skin tone region in a second video frame of the video sequence based on tracking the free form shape face region, wherein the second video frame is a non key frame and tracking the form shape face region is responsive to the second video frame being a non key frame.

Further to the first embodiments, the method further comprises determining a motion cue corresponding to the skin tone region based on the video frame and one or more previous video frames and combining the motion cue with a skin probability map corresponding to the video frame to generate the skin tone region.

Further to the first embodiments, the method further comprises determining a first motion cue and a second motion cue corresponding to the skin tone region based on the video frame and one or more previous video frames and combining the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

Further to the first embodiments, the method further comprises refining, prior to encoding the video frame, the skin tone region by reducing temporal inconsistency of the skin tone region based on the skin tone region and one or more previous skin tone regions in previous video frames.

Further to the first embodiments, the method further comprises refining, prior to encoding the video frame, the skin tone region based on at least one of a size of the skin tone region, a texture of the skin tone region, a shape of the skin tone region, or a distance from a border of the video frame of the skin tone region.

Further to the first embodiments, the method further comprises detecting a hole in a second skin tone region corresponding to the video frame, filling the hole in the second skin tone region to provide a continuous skin tone region for efficient coding of the video frame, and encoding the video frame based at least in part on the continuous skin tone region.

Further to the first embodiments, encoding the video frame based at least in part on the skin tone region comprises at least one of reducing a quantization parameter corresponding to the skin tone region, adjusting a lambda value for the skin tone region, or disabling skip coding for the skin tone region.

Further to the first embodiments, the bitstream comprises at least one of an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream.

In one or more second embodiments, a system for performing video coding based on skin tone detection comprises a memory configured to store a video frame in a first color format and in a second color format and a processor coupled to the memory, the processor to select one of a plurality of static skin probability histograms based at least in part on the first color format video frame, to generate a dynamic skin probability histogram based on the second color format video frame and a face region in the video frame, to determine whether the dynamic skin probability histogram is valid or invalid, to generate a skin tone region based on the dynamic skin probability histogram when the dynamic skin probability histogram is valid or based on the selected static skin probability histogram when the dynamic skin probability histogram is invalid, and to encode the video frame based at least in part on the skin tone region to generate a coded bitstream.

Further to the second embodiments, the first color format frame is a Yrg color format frame and the second color frame is a YUV color format frame.

Further to the second embodiments, the plurality of static skin probability histograms consist of a normal illumination static skin probability histogram, a red/orange/yellow illumination static skin probability histogram, and a blue/green illumination static skin probability histogram.

Further to the second embodiments, the video frame comprises one of a plurality of video frames of a video sequence and the processor is further to determine the video frame is a key frame of the video sequence, to, responsive to the video frame being a key frame of the video sequence, perform face detection to determine the face region in the video frame, to determine a free form shape face region corresponding to the face region, wherein the free form shape face region has at least one of a pixel accuracy or a small block of pixels accuracy, and to determine a location of a second skin tone region in a second video frame of the video sequence based on tracking the free form shape face region.

Further to the second embodiments, the video frame comprises one of a plurality of video frames of a video sequence and the processor is further to determine the video frame is a key frame of the video sequence, to, responsive to the video frame being a key frame of the video sequence, perform face detection to determine the face region in the video frame, to determine a free form shape face region corresponding to the face region, wherein the free form shape face region has at least one of a pixel accuracy or a small block of pixels accuracy, and to determine a location of a second skin tone region in a second video frame of the video sequence based on tracking the free form shape face region, wherein the second video frame is a non key frame and tracking the form shape face region is responsive to the second video frame being a non key frame.

Further to the second embodiments, the processor is further to determine a motion cue corresponding to the skin tone region based on the video frame and one or more previous video frames and to combine the motion cue with a skin probability map corresponding to the video frame to generate the skin tone region.

Further to the second embodiments, the processor is further to determine a first motion cue and a second motion cue corresponding to the skin tone region based on the video frame and one or more previous video frames and to combine the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

Further to the second embodiments, the processor is further to refine, prior to encoding the video frame, the skin tone region by reducing temporal inconsistency of the skin tone region based on the skin tone region and one or more previous skin tone regions in previous video frames.

Further to the second embodiments, the processor is further to refine, prior to encoding the video frame, the skin tone region based on at least one of a size of the skin tone region, a texture of the skin tone region, a shape of the skin tone region, or a distance from a border of the video frame of the skin tone region.

Further to the second embodiments, the processor is further to detect a hole in a second skin tone region corresponding to the video frame, to fill the hole in the second skin tone region to provide a continuous skin tone region for efficient coding of the video frame, and to encode the video frame based at least in part on the continuous skin tone region.

Further to the second embodiments, to encode the video frame based at least in part on the skin tone region comprises the processor to reduce a quantization parameter corresponding to the skin tone region, adjust a lambda value for the skin tone region, or disable skip coding for the skin tone region.

In one or more third embodiments, a system comprises means for receiving a video frame in a first color format and in a second color format, means for selecting one of a plurality of static skin probability histograms based at least in part on the first color format video frame, means for generating a dynamic skin probability histogram based on the second color format video frame and a face region in the video frame, means for determining whether the dynamic skin probability histogram is valid or invalid, means for generating a skin tone region based on the dynamic skin probability histogram when the dynamic skin probability histogram is valid or based on the selected static skin probability histogram when the dynamic skin probability histogram is invalid, and means for encoding the video frame based at least in part on the skin tone region to generate a coded bitstream.

Further to the third embodiments, the plurality of static skin probability histograms consist of a normal illumination static skin probability histogram, a red/orange/yellow illumination static skin probability histogram, and a blue/green illumination static skin probability histogram.

Further to the third embodiments, the video frame comprises one of a plurality of video frames of a video sequence and the system further comprises means for determining the video frame is a key frame of the video sequence and, responsive to the video frame being a key frame of the video sequence, means for performing face detection to determine the face region in the video frame, means for determining a free form shape face region corresponding to the face region, wherein the free form shape face region has at least one of a pixel accuracy or a small block of pixels accuracy, and means for determining a location of a second skin tone region in a second video frame of the video sequence based on tracking the free form shape face region.

Further to the third embodiments, the system further comprises means for determining a first motion cue and a second motion cue corresponding to the skin tone region based on the video frame and one or more previous video frames and means for combining the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

Further to the third embodiments, the system further comprises means for refining, prior to encoding the video frame, the skin tone region based on at least one of a size of the skin tone region, a texture of the skin tone region, a shape of the skin tone region, or a distance from a border of the video frame of the skin tone region.

Further to the third embodiments, the system further comprises means for detecting a hole in a second skin tone region corresponding to the video frame, means for filling the hole in the second skin tone region to provide a continuous skin tone region for efficient coding of the video frame, and means for encoding the video frame based at least in part on the continuous skin tone region.

Further to the third embodiments, the means for encoding the video frame based at least in part on the skin tone region comprise at least one of means for reducing a quantization parameter corresponding to the skin tone region, means for adjusting a lambda value for the skin tone region, or means for disabling skip coding for the skin tone region.

In one or more fourth embodiments, at least one machine readable medium comprises a plurality of instructions that, in response to being executed on a device, cause the device to perform video coding based on skin tone detection by receiving a video frame in a first color format and in a second color format, selecting one of a plurality of static skin probability histograms based at least in part on the first color format video frame, generating a dynamic skin probability histogram based on the second color format video frame and a face region in the video frame, determining whether the dynamic skin probability histogram is valid or invalid, generating a skin tone region based on the dynamic skin probability histogram when the dynamic skin probability histogram is valid or based on the selected static skin probability histogram when the dynamic skin probability histogram is invalid, and encoding the video frame based at least in part on the skin tone region to generate a coded bitstream.

Further to the fourth embodiments, the plurality of static skin probability histograms consist of a normal illumination static skin probability histogram, a red/orange/yellow illumination static skin probability histogram, and a blue/green illumination static skin probability histogram.

Further to the fourth embodiments, the video frame comprises one of a plurality of video frames of a video sequence and the machine readable medium comprises further instructions that, in response to being executed on the device, cause the device to perform video coding based on skin tone detection by determining the video frame is a key frame of the video sequence and, responsive to the video frame being a key frame of the video sequence, performing face detection to determine the face region in the video frame, determining a free form shape face region corresponding to the face region, wherein the free form shape face region has at least one of a pixel accuracy or a small block of pixels accuracy, and determining a location of a second skin tone region in a second video frame of the video sequence based on tracking the free form shape face region.

Further to the fourth embodiments, the machine readable medium comprising further instructions that, in response to being executed on the device, cause the device to perform video coding based on skin tone detection by determining a first motion cue and a second motion cue corresponding to the skin tone region based on the video frame and one or more previous video frames and combining the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

Further to the fourth embodiments, the machine readable medium comprising further instructions that, in response to being executed on the device, cause the device to perform video coding based on skin tone detection by refining, prior to encoding the video frame, the skin tone region based on at least one of a size of the skin tone region, a texture of the skin tone region, a shape of the skin tone region, or a distance from a border of the video frame of the skin tone region.

Further to the fourth embodiments, encoding the video frame based at least in part on the skin tone region comprises at least one of reducing a quantization parameter corresponding to the skin tone region, adjusting a lambda value for the skin tone region, or disabling skip coding for the skin tone region.

In one or more fifth embodiments, a computer implemented method for performing skin tone detection comprises generating a first color format version and a second color format version of a received video frame, selecting one of a plurality of static skin probability histograms based at least in part on the first color format version of the video frame, generating a dynamic skin probability histogram based on the second color format version of the video frame and a face region in the video frame, determining whether the dynamic skin probability histogram is valid or invalid, generating a skin tone region based on the dynamic skin probability histogram when the dynamic skin probability histogram is valid or based on the selected static skin probability histogram when the dynamic skin probability histogram is invalid, and providing the skin tone region for further processing.

Further to the fifth embodiments, the received video frame comprises a video frame of a sequence of surveillance video frames and the method further comprises performing person detection in the surveillance video frames based on the skin tone region.

Further to the fifth embodiments, the received video frame comprises a video frame of a sequence of decoded video frames and the method further comprises adding a marker corresponding to the received video frame to search the received video frame for a person based on the skin tone region.

Further to the fifth embodiments, the received video frame comprises a video frame of a sequence of decoded video frames and the method further comprises providing an index indicative of a person being present in the video frame based on the skin tone region.

Further to the fifth embodiments, the received video frame comprises a video frame of a sequence of video frames received during a device login attempt and the method further comprises performing face recognition based on the skin tone region and allowing access to the device if a secured face is recognized.

Further to the fifth embodiments, the received video frame comprises a video frame of a sequence of videoconferencing frames and the method further comprises encoding the video frame based at least in part on the skin tone region to generate a coded bitstream.

Further to the fifth embodiments, the received video frame comprises a video frame of a sequence of videoconferencing frames and the method further comprises encoding the video frame based at least in part on the skin tone region to generate a coded bitstream, wherein encoding the video frame comprises not encoding a background region of the video frame into the bitstream.

Further to the fifth embodiments, the method further comprises encoding the video frame based at least in part on the skin tone region to generate a coded bitstream, wherein encoding the video frame comprises including metadata corresponding to the skin tone region in the bitstream.

Further to the fifth embodiments, the method further comprises encoding the video frame based at least in part on the skin tone region to generate a coded bitstream, wherein encoding the video frame comprises including metadata corresponding to the skin tone region in the bitstream, and decoding the coded bitstream to generate a decoded video frame and to determine the metadata corresponding to the skin tone region in the bitstream.

Further to the fifth embodiments, the method further comprises encoding the video frame based at least in part on the skin tone region to generate a coded bitstream, wherein encoding the video frame comprises including metadata corresponding to the skin tone region in the bitstream, decoding the coded bitstream to generate a decoded video frame and to determine the metadata corresponding to the skin tone region in the bitstream, and at least one of replacing the skin tone region based on the decoded metadata, cropping and displaying image data corresponding only to the skin tone region based on the decoded metadata, or indexing the decoded video frame based on the decoded metadata.

In one or more sixth embodiments, a system for performing skin tone detection comprises a memory configured to store a received video frame and a processor coupled to the memory, the processor to generate a first color format version and a second color format version of the received video frame, to select one of a plurality of static skin probability histograms based at least in part on the first color format version of the video frame, to generate a dynamic skin probability histogram based on the second color format version of the video frame and a face region in the video frame, to determine whether the dynamic skin probability histogram is valid or invalid, to generate a skin tone region based on the dynamic skin probability histogram when the dynamic skin probability histogram is valid or based on the selected static skin probability histogram when the dynamic skin probability histogram is invalid, and to provide the skin tone region for further processing.

Further to the sixth embodiments, the received video frame comprises a video frame of a sequence of surveillance video frames and the processor is further to perform person detection in the surveillance video frames based on the skin tone region.

Further to the sixth embodiments, the received video frame comprises a video frame of a sequence of decoded video frames and the processor is further to add a marker corresponding to the received video frame to search the received video frame for a person based on the skin tone region or to provide an index indicative of a person being present in the video frame based on the skin tone region.

Further to the sixth embodiments, the received video frame comprises a video frame of a sequence of video frames received during a device login attempt and the processor further to perform face recognition based on the skin tone region and to allow access to the device if a secured face is recognized.

Further to the sixth embodiments, the received video frame comprises a video frame of a sequence of videoconferencing frames and the processor is further to encode the video frame based at least in part on the skin tone region to generate a coded bitstream, wherein to encode the video frame the processor is to not encode a background region of the video frame into the bitstream.

Further to the sixth embodiments, the processor is further to encode the video frame based at least in part on the skin tone region to generate a coded bitstream, wherein to encode the video frame the processor is to include metadata corresponding to the skin tone region in the bitstream, to decode the coded bitstream to generate a decoded video frame and to determine the metadata corresponding to the skin tone region in the bitstream, and to replace the skin tone region based on the decoded metadata, to crop and display image data corresponding only to the skin tone region based on the decoded metadata, or to index the decoded video frame based on the decoded metadata.

In one or more seventh embodiments, a system comprises means for generating a first color format version and a second color format version of a received video frame, means for selecting one of a plurality of static skin probability histograms based at least in part on the first color format version of the video frame, means for generating a dynamic skin probability histogram based on the second color format version of the video frame and a face region in the video frame, means for determining whether the dynamic skin probability histogram is valid or invalid, means for generating a skin tone region based on the dynamic skin probability histogram when the dynamic skin probability histogram is valid or based on the selected static skin probability histogram when the dynamic skin probability histogram is invalid, and means for providing the skin tone region for further processing.

Further to the seventh embodiments, the received video frame comprises a video frame of a sequence of surveillance video frames and the system further comprises means for performing person detection in the surveillance video frames based on the skin tone region.

Further to the seventh embodiments, the received video frame comprises a video frame of a sequence of decoded video frames and the system further comprises means for adding a marker corresponding to the received video frame to search the received video frame for a person based on the skin tone region or means for providing an index indicative of a person being present in the video frame based on the skin tone region.

Further to the seventh embodiments, the received video frame comprises a video frame of a sequence of video frames received during a device login attempt and the system further comprises means for performing face recognition based on the skin tone region and means for allowing access to the device if a secured face is recognized.

Further to the seventh embodiments, the received video frame comprises a video frame of a sequence of videoconferencing frames and the system further comprises means for encoding the video frame based at least in part on the skin tone region to generate a coded bitstream, wherein the means for encoding the video frame comprise means for not encoding a background region of the video frame into the bitstream.

Further to the seventh embodiments, the system further comprises means for encoding the video frame based at least in part on the skin tone region to generate a coded bitstream, wherein the means for encoding the video frame comprise means for including metadata corresponding to the skin tone region in the bitstream, means for decoding the coded bitstream to generate a decoded video frame and to determine the metadata corresponding to the skin tone region in the bitstream, and at least one of means for replacing the skin tone region based on the decoded metadata, means for cropping and displaying image data corresponding only to the skin tone region based on the decoded metadata, or means for indexing the decoded video frame based on the decoded metadata.

In one or more eighth embodiments, at least one machine readable medium comprises a plurality of instructions that, in response to being executed on a device, cause the device to perform skin tone detection by generating a first color format version and a second color format version of a received video frame, selecting one of a plurality of static skin probability histograms based at least in part on the first color format version of the video frame, generating a dynamic skin probability histogram based on the second color format version of the video frame and a face region in the video frame, determining whether the dynamic skin probability histogram is valid or invalid, generating a skin tone region based on the dynamic skin probability histogram when the dynamic skin probability histogram is valid or based on the selected static skin probability histogram when the dynamic skin probability histogram is invalid, and providing the skin tone region for further processing.

Further to the eighth embodiments, the received video frame comprises a video frame of a sequence of surveillance video frames and the machine readable medium comprises further instructions that, in response to being executed on the device, cause the device to perform skin tone detection by performing person detection in the surveillance video frames based on the skin tone region.

Further to the eighth embodiments, the received video frame comprises a video frame of a sequence of decoded video frames and the machine readable medium comprises further instructions that, in response to being executed on the device, cause the device to perform skin tone detection by adding a marker corresponding to the received video frame to search the received video frame for a person based on the skin tone region or providing an index indicative of a person being present in the video frame based on the skin tone region.

Further to the eighth embodiments, the received video frame comprises a video frame of a sequence of video frames received during a device login attempt and the machine readable medium comprises further instructions that, in response to being executed on the device, cause the device to perform skin tone detection by performing face recognition based on the skin tone region and allowing access to the device if a secured face is recognized.

Further to the eighth embodiments, the received video frame comprises a video frame of a sequence of videoconferencing frames and the machine readable medium comprises further instructions that, in response to being executed on the device, cause the device to perform skin tone detection by encoding the video frame based at least in part on the skin tone region to generate a coded bitstream, wherein encoding the video frame comprises not encoding a background region of the video frame into the bitstream.

Further to the eighth embodiments, the machine readable medium comprises further instructions that, in response to being executed on the device, cause the device to perform skin tone detection by encoding the video frame based at least in part on the skin tone region to generate a coded bitstream, wherein encoding the video frame comprises including metadata corresponding to the skin tone region in the bitstream, decoding the coded bitstream to generate a decoded video frame and to determine the metadata corresponding to the skin tone region in the bitstream, and at least one of replacing the skin tone region based on the decoded metadata, cropping and displaying image data corresponding only to the skin tone region based on the decoded metadata, or indexing the decoded video frame based on the decoded metadata.

In one or more ninth embodiments, at least one machine readable medium may include a plurality of instructions that in response to being executed on a computing device, causes the computing device to perform a method according to any one of the above embodiments.

In one or more tenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for performing video coding based on skin tone detection comprising:
    receiving a video frame in a first color format and in a second color format;
    selecting one of a plurality of static skin probability histograms based at least in part on the first color format video frame;
    generating a dynamic skin probability histogram based on the second color format video frame and a face region in the video frame;
    determining whether the dynamic skin probability histogram is valid or invalid;
    generating a skin tone region based on the dynamic skin probability histogram when the dynamic skin probability histogram is valid or based on the selected static skin probability histogram when the dynamic skin probability histogram is invalid; and
    encoding the video frame based at least in part on the skin tone region to generate a coded bitstream.

2. The method of claim 1, wherein the first color format frame is a Yrg color format frame and the second color frame is a YUV color format frame.

3. The method of claim 2, further comprising:
    receiving an input video frame in a YUV 4:2:0 format;
    downsampling the YUV 4:2:0 format video frame to a downsampled YUV 4:2:0 format video frame and converting the downsampled YUV 4:2:0 format video frame to a YUV 4:4:4 format video frame to generate the YUV color format frame; and
    converting the YUV 4:4:4 format video frame to a Yrg 4:4:4 format to generate the Yrg color format frame.

4. The method of claim 1, wherein the plurality of static skin probability histograms consist of a normal illumination static skin probability histogram, a red/orange/yellow illumination static skin probability histogram, and a blue/green illumination static skin probability histogram.

5. The method of claim 1, wherein the video frame comprises one of a plurality of video frames of a video sequence, the method further comprising:
    determining the video frame is a key frame of the video sequence and, responsive to the video frame being a key frame of the video sequence, performing face detection to determine the face region in the video frame.

6. The method of claim 5, further comprising:
    determining a free form shape face region corresponding to the face region, wherein the free form shape face region has at least one of a pixel accuracy or a small block of pixels accuracy; and
    determining a location of a second skin tone region in a second video frame of the video sequence based on tracking the free form shape face region.

7. The method of claim 6, wherein the second video frame is a non key frame and tracking the form shape face region is responsive to the second video frame being a non key frame.

8. The method of claim 1, further comprising:
    determining a motion cue corresponding to the skin tone region based on the video frame and one or more previous video frames; and
    combining the motion cue with a skin probability map corresponding to the video frame to generate the skin tone region.

9. The method of claim 1, further comprising:
    determining a first motion cue and a second motion cue corresponding to the skin tone region based on the video frame and one or more previous video frames; and
    combining the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

10. The method of claim 1, further comprising:
    refining, prior to encoding the video frame, the skin tone region by reducing temporal inconsistency of the skin tone region based on the skin tone region and one or more previous skin tone regions in previous video frames.

11. The method of claim 1, further comprising:
    refining, prior to encoding the video frame, the skin tone region based on at least one of a size of the skin tone region, a texture of the skin tone region, a shape of the skin tone region, or a distance from a border of the video frame of the skin tone region.

12. The method of claim 1, further comprising:
    detecting a hole in a second skin tone region corresponding to the video frame;
    filling the hole in the second skin tone region to provide a continuous skin tone region for efficient coding of the video frame; and
    encoding the video frame based at least in part on the continuous skin tone region.

13. The method of claim 1, wherein encoding the video frame based at least in part on the skin tone region comprises at least one of reducing a quantization parameter corresponding to the skin tone region, adjusting a lambda value for the skin tone region, or disabling skip coding for the skin tone region.

14. The method of claim 1, wherein the bitstream comprises at least one of an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream.

15. A computer implemented method for performing skin tone detection comprising:
generating a first color format version and a second color format version of a received video frame;
selecting one of a plurality of static skin probability histograms based at least in part on the first color format version of the video frame;
generating a dynamic skin probability histogram based on the second color format version of the video frame and a face region in the video frame;
determining whether the dynamic skin probability histogram is valid or invalid;
generating a skin tone region based on the dynamic skin probability histogram when the dynamic skin probability histogram is valid or based on the selected static skin probability histogram when the dynamic skin probability histogram is invalid; and
providing the skin tone region for further processing.

16. The method of claim 15, wherein the received video frame comprises a video frame of a sequence of surveillance video frames, the method further comprising:
performing person detection in the surveillance video frames based on the skin tone region.

17. The method of claim 15, wherein the received video frame comprises a video frame of a sequence of decoded video frames, the method further comprising:
adding a marker corresponding to the received video frame to search the received video frame for a person based on the skin tone region.

18. The method of claim 15, wherein the received video frame comprises a video frame of a sequence of video frames, the method further comprising:
providing an index indicative of a person being present in the video frame based on the skin tone region.

19. The method of claim 15, wherein the received video frame comprises a video frame of a sequence of video frames received during a device login attempt, the method further comprising:
performing face recognition based on the skin tone region; and
allowing access to the device if a secured face is recognized.

20. The method of claim 15, wherein the received video frame comprises a video frame of a sequence of videoconferencing frames, the method further comprising:
encoding the video frame based at least in part on the skin tone region to generate a coded bitstream.

21. The method of claim 20, wherein encoding the video frame comprises not encoding a background region of the video frame into the bitstream.

22. The method of claim 15, further comprising:
encoding the video frame based at least in part on the skin tone region to generate a coded bitstream, wherein encoding the video frame comprises including metadata corresponding to the skin tone region in the bitstream.

23. The method of claim 22, further comprising:
decoding the coded bitstream to generate a decoded video frame and to determine the metadata corresponding to the skin tone region in the bitstream.

24. The method of claim 23, further comprising at least one of replacing the skin tone region based on the decoded metadata, cropping and displaying image data corresponding only to the skin tone region based on the decoded metadata, or indexing the decoded video frame based on the decoded metadata.

25. A system for performing video coding based on skin tone detection comprising:
a memory configured to store a video frame in a first color format and in a second color format; and
a processor coupled to the memory, the processor to select one of a plurality of static skin probability histograms based at least in part on the first color format video frame, to generate a dynamic skin probability histogram based on the second color format video frame and a face region in the video frame, to determine whether the dynamic skin probability histogram is valid or invalid, to generate a skin tone region based on the dynamic skin probability histogram when the dynamic skin probability histogram is valid or based on the selected static skin probability histogram when the dynamic skin probability histogram is invalid, and to encode the video frame based at least in part on the skin tone region to generate a coded bitstream.

26. The system of claim 25, wherein the plurality of static skin probability histograms consist of a normal illumination static skin probability histogram, a red/orange/yellow illumination static skin probability histogram, and a blue/green illumination static skin probability histogram.

27. The system of claim 25, wherein the video frame comprises one of a plurality of video frames of a video sequence, the processor further to determine the video frame is a key frame of the video sequence, to, responsive to the video frame being a key frame of the video sequence, perform face detection to determine the face region in the video frame, to determine a free form shape face region corresponding to the face region, wherein the free form shape face region has at least one of a pixel accuracy or a small block of pixels accuracy, and to determine a location of a second skin tone region in a second video frame of the video sequence based on tracking the free form shape face region.

28. The system of claim 25, wherein the processor is further to determine a first motion cue and a second motion cue corresponding to the skin tone region based on the video frame and one or more previous video frames and to combine the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

29. The system of claim 25, wherein the processor is further to refine, prior to encoding the video frame, the skin tone region based on at least one of a size of the skin tone region, a texture of the skin tone region, a shape of the skin tone region, or a distance from a border of the video frame of the skin tone region.

30. The system of claim 25, wherein the processor is further to detect a hole in a second skin tone region corresponding to the video frame, to fill the hole in the second skin tone region to provide a continuous skin tone region for efficient coding of the video frame, and to encode the video frame based at least in part on the continuous skin tone region.

31. The system of claim 25, wherein to encode the video frame based at least in part on the skin tone region comprises the processor to reduce a quantization parameter corresponding to the skin tone region, adjust a lambda value for the skin tone region, or disable skip coding for the skin tone region.

32. At least one non-transitory machine readable medium comprising a plurality of instructions that, in response to being executed on a device, cause the device to perform video coding based on skin tone detection by: receiving a video frame in a first color format and in a second color format; selecting one of a plurality of static skin probability histograms based at least in part on the first color format video frame; generating a dynamic skin probability histogram based on the second color format video frame and a face region in the video frame; determining whether the dynamic skin probability histogram is valid or invalid; generating a skin tone region based on the dynamic skin probability histogram when the dynamic skin probability histogram is valid or based on the selected static skin probability histogram when the dynamic skin probability histogram is invalid; and encoding the video frame based at least in part on the skin tone region to generate a coded bitstream.

33. The non-transitory machine readable medium of claim 32, wherein the plurality of static skin probability histograms consist of a normal illumination static skin probability histogram, a red/orange/yellow illumination static skin probability histogram, and a blue/green illumination static skin probability histogram.

34. The non-transitory machine readable medium of claim 32, wherein the video frame comprises one of a plurality of video frames of a video sequence and the machine readable medium comprises further instructions that, in response to being executed on the device, cause the device to perform video coding based on skin tone detection by: determining the video frame is a key frame of the video sequence and, responsive to the video frame being a key frame of the video sequence, performing face detection to determine the face region in the video frame; determining a free form shape face region corresponding to the face region, wherein the free form shape face region has at least one of a pixel accuracy or a small block of pixels accuracy; and determining a location of a second skin tone region in a second video frame of the video sequence based on tracking the free form shape face region.

35. The non-transitory machine readable medium of claim 32, the machine readable medium comprising further instructions that, in response to being executed on the device, cause the device to perform video coding based on skin tone detection by: determining a first motion cue and a second motion cue corresponding to the skin tone region based on the video frame and one or more previous video frames; and combining the first motion cue, the second motion cue, and a skin probability map corresponding to the video frame to generate the skin tone region, wherein the first motion cue comprises a maximum motion measurement corresponding to each block of the video frame, wherein the maximum motion measurement comprises a maximum of motion measurements for each block between temporally adjacent video frames of the previous video frames and the video frame, and the second motion cue comprises, for each block of the video frame, a combination of a motion measurement between the video frame and an adjacent video frame of the previous video frames and a motion measurement between the video frame and a non-adjacent video frame of the previous video frames.

36. The non-transitory machine readable medium of claim 32, the machine readable medium comprising further instructions that, in response to being executed on the device, cause the device to perform video coding based on skin tone detection by: refining, prior to encoding the video frame, the skin tone region based on at least one of a size of the skin tone region, a texture of the skin tone region, a shape of the skin tone region, or a distance from a border of the video frame of the skin tone region.

37. The non-transitory machine readable medium of claim 32, wherein encoding the video frame based at least in part on the skin tone region comprises at least one of reducing a quantization parameter corresponding to the skin tone region, adjusting a lambda value for the skin tone region, or disabling skip coding for the skin tone region.

\* \* \* \* \*